US009055475B2

(12) United States Patent
Lacatus et al.

(10) Patent No.: US 9,055,475 B2
(45) Date of Patent: Jun. 9, 2015

(54) POWER OPTIMIZATIONS FOR CHALLENGING WAN SERVICE CONDITIONS

(71) Applicant: QUALCOMM Incorporated, San Diego, CA (US)

(72) Inventors: Catalin Lacatus, San Diego, CA (US); Harleen K. Gill, Del Mar, CA (US); Eric C. Rosen, Solana Beach, CA (US); Hemish K. Parikh, San Diego, CA (US); Thomas F. Doyle, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 179 days.

(21) Appl. No.: 13/831,722

(22) Filed: Mar. 15, 2013

(65) Prior Publication Data
US 2014/0274225 A1 Sep. 18, 2014

(51) Int. Cl.
*H04W 4/00* (2009.01)
*H04W 24/08* (2009.01)
*H04W 52/02* (2009.01)

(52) U.S. Cl.
CPC .......... *H04W 24/08* (2013.01); *H04W 52/0241* (2013.01); *Y02B 60/50* (2013.01)

(58) Field of Classification Search
CPC ....... H04W 4/18; H04W 4/008; H04W 36/08; H04W 48/16; H04W 48/18; H04W 4/021; H04W 52/0229; H04W 64/00; H04W 36/32; H04W 36/36; H04W 4/06; H04W 4/16; H04W 52/0206; H04W 52/0216; H04W 52/0258; H04W 84/18; H04W 24/04; H04L 67/04; H04L 43/062; H04L 67/2819; H04L 67/2876; H04L 12/5692; H04L 43/065; H04L 43/0876; H04L 43/10; H04L 67/2842; H04L 12/2668; H04L 29/08099; H04L 43/0811
USPC ...................... 370/230.1, 235, 252, 255, 311, 370/327–332, 338, 350, 384, 395.62, 445; 455/343.1, 404.2, 408, 41.2, 410, 455/414.1, 418, 419, 421, 423, 517, 435.2, 455/426.1
See application file for complete search history.

(56) References Cited

U.S. PATENT DOCUMENTS

| | | | |
|---|---|---|---|
| 8,019,340 B2 | 9/2011 | Welnick et al. | |
| 2010/0235007 A1* | 9/2010 | Constien et al. | 700/291 |
| 2010/0322126 A1 | 12/2010 | Krishnaswamy et al. | |
| 2011/0003590 A1 | 1/2011 | Yoon et al. | |
| 2011/0151866 A1 | 6/2011 | Zhao | |
| 2011/0183726 A1* | 7/2011 | Deng | 455/574 |

FOREIGN PATENT DOCUMENTS

WO 2010138587 A1 12/2010

OTHER PUBLICATIONS

International Search Report and Written Opinion—PCT/US2014/025927—ISA/EPO—Aug. 1, 2014.

\* cited by examiner

*Primary Examiner* — Golam Sorowar
(74) *Attorney, Agent, or Firm* — The Marbury Law Group, PLLC

(57) ABSTRACT

A method for a tracking device optimizing power to remain reachable for a desired period based on evaluated wide-area-network conditions. The tracking device may communicate via a power-intensive long-range transceiver and may continually measure service conditions related to network communications. The tracking device may periodically calculate statistical information describing the service conditions, such as a percentage of time in which the tracking device was out-of-network-service. Based on the statistics, the tracking device may operate in an optimization mode to conserve power when out-of-network-service. In an embodiment, the tracking device may calculate the statistics based on evaluation periods defined by predefined numbers of out-of-network-service occurrences, predefined time periods, and/or a hybrid of both. In an embodiment, the tracking device may conserve power in a power save state that alternates with another operating state in which the tracking device periodically evaluates criteria before either continuing to conserve power or utilize network resources.

48 Claims, 24 Drawing Sheets

GPS: On
WAN: On

GPS:    On
WAN:    On/ Power Optimization Mode

POWER OPTIMIZATIONS FOR CHALLENGING WAN SERVICE CONDITIONS

FIELD OF THE INVENTION

The present application relates generally to radio resource control of a connection state between a wireless communication device and a network, and more particularly to methods and devices for controlling power save modes to optimize battery service life of the mobile device and network overhead for the network.

BACKGROUND

Conventionally, when a wireless device is in an out-of-network-service condition, the wireless wide area network (WAN) radio of a wireless device may be configured to reacquire service by continually searching for available WAN coverage for many minutes. When service cannot be reestablished, the wireless device may sleep for a number of minutes before waking to search again. Each time coverage is lost, even after only short periods of resumed communications, the same searching procedure may be executed by the wireless device as soon as another out-of-network-service condition is experienced.

While operating in regions with poor WAN coverage, the wireless device may experience a severe impact to battery service life, as the wireless device may consume significant power when constantly utilizing a long-range transceiver to re-establish WAN communications. For example, the wireless device may consume a high amount of power when searching for cellular network coverage. The battery service life of a wireless device may be shortened the longer the period of poor WAN conditions, as the wireless device may continually and repeatedly expend power to acquire and reacquire WAN service.

SUMMARY

The various embodiments include methods and systems for a mobile device, such as a wireless tracking device, to manage power consumption when it is periodically unable to communicate with a wide-area network (WAN). The mobile device may determine when conditions are met to begin performing a power optimization algorithm, such as when the mobile device has operated for a certain period of time and/or when WAN coverage has been lost for a period exceeding a predefined threshold. When the conditions are met, the mobile device may operate in a WAN connected mode during which statistics may be generated that indicate the network service conditions. Based on generated statistics, the mobile device may evaluate current WAN conditions (e.g., intermittent service signals, duration of lost WAN coverage, etc.) and determine whether to operate in a low-power mode that utilizes reduced power consumption (i.e., a power optimization mode).

When configured to operate in the power optimization mode, the mobile device may operate in cycles of alternating power save states and idle states. In an embodiment, the number of cycles and the duration of the power save state may be calculated and adjusting by the mobile device based on evaluations of WAN conditions, WAN power consumption information (e.g., power required to perform a WAN search, etc.), GPS power consumption information (e.g., power required to exchange GPS signals, current GPS environment, etc.), and reachability cost information (e.g., current battery capacity, desired reachability parameters, etc.). For example, based on a recent period of consecutively poor WAN coverage and a pre-defined period of time a user desires that the device should remain reachable via cellular network communications, the mobile device may operate in a power saving mode for a certain number of seconds for a certain number of cycles.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
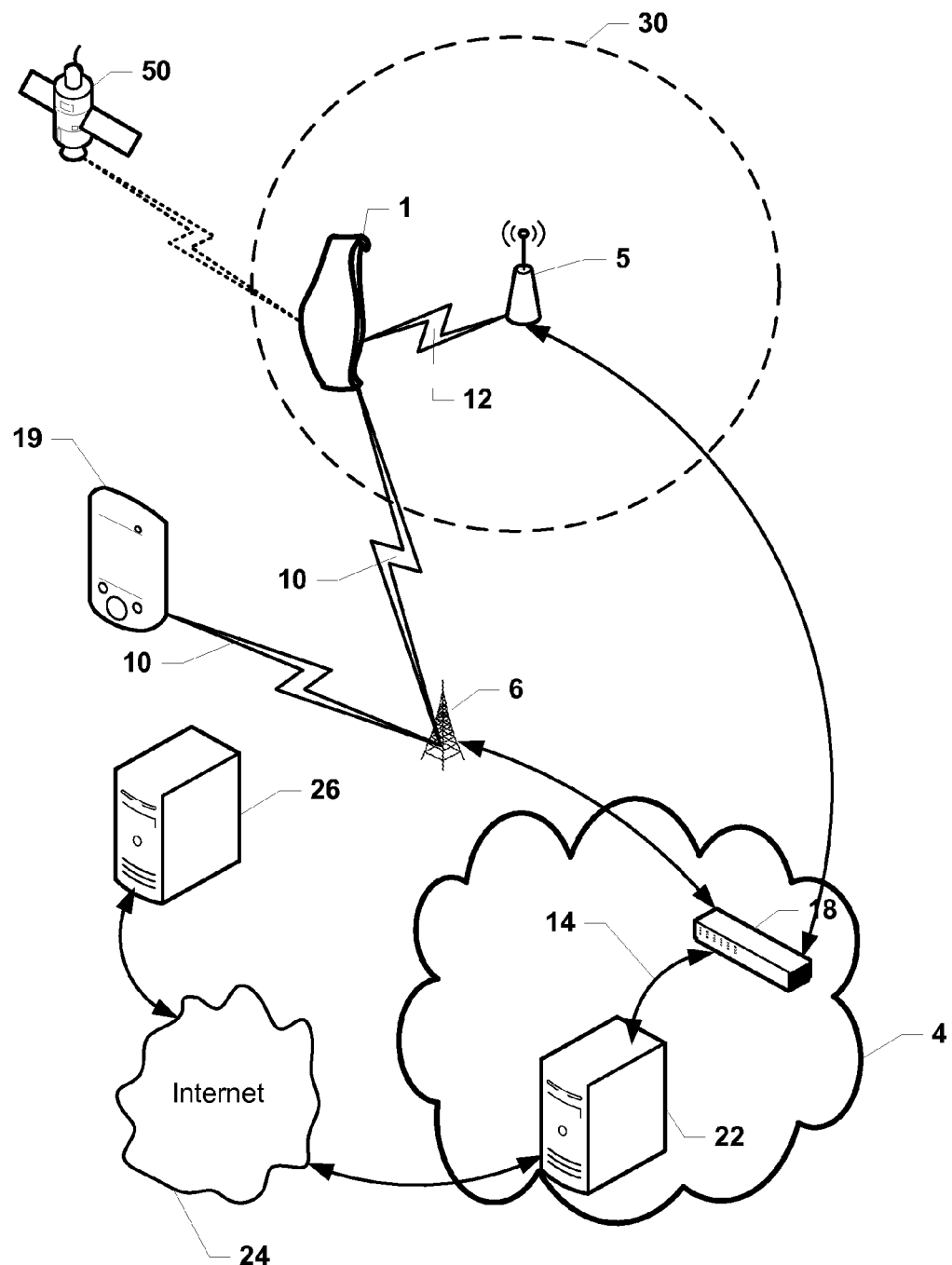
FIG. 1 is a communication system block diagram of a communication network that includes a tracking device linked to local wireless communication networks according to an embodiment.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "tracking device" is used herein to refer to a mobile device that may be deployed with regards to a tracked asset such that the tracking device is connected to, worn by, or otherwise physically moves along with the tracked asset. In various embodiments, tracking devices may be placed on tracked assets such as pets, children, humans, equipment, vehicles, possessions, and any other tangible asset. Tracking devices may contain various radios and/or transceivers for receiving wireless signals. For example, tracking devices may include short-range radio transceivers (e.g., transceivers for Bluetooth®, Zigbee®, and Peanut® protocols) configured to receive short-range broadcast signals. Tracking devices may also include long-range transceivers and/or radios for exchanging transmissions via a wide area network (or "WAN"). For example, tracking devices may include cellular modems configured to communicate with cellular networks and/or WiFi transceivers configured to communicate with various networks. In various embodiments, tracking devices may activate (and de-activate) included long-range transceivers based on the availability of WAN access.

The term "base safe-zone" is used herein to refer to a predefined physical region in which a particular tracking device may be considered safe and/or controlled by a user. For example, a base safe-zone may be the home or regular surroundings of a tracked asset wearing a tracking device. Base safe-zones may be associated with controlled areas, such as houses, office buildings, backyards, etc. The term "base safe-zone beacon" is used herein to refer to a transmitter device associated with a base safe-zone that periodically broadcasts signals configured to be received by tracking devices within the broadcast range. For example, a base safe-zone beacon may broadcast short-range radio signals that may be received and processed by a tracking device via a short-range transceiver. The base safe-zone associated with a base safe-zone beacon may be defined by the range of the base safe-zone beacon's broadcast signals.

The term "geofence area" is used herein to refer to another predefined physical region in which a particular tracking device may be considered safe or controlled by a user. In various embodiments, geofence areas may be defined by a set (or sets) of physical locations that define the perimeter and/or boundaries of an area. For example, a geofence area may be defined by GPS coordinates of locations around the perimeter of a yard, business installation, construction site, etc. A geofence area may encompass one or more base safe-zones. For example, several base safe-zones may be located within a construction site geofence area.

The terms "out-of-network-service" or "out-of-network-service condition" are used herein to refer to a condition of a tracking device in which the tracking device does not have access to a wide area network ("WAN"). In other words, a tracking device may be out-of-network-service when there is no WAN coverage. For example, when a tracking device, configured to communicate via a long-range transceiver over a cellular network, is outside of the signal range of all associated cell towers, the tracking device may be considered out-of-network-service (or experiencing an out-of-network-service condition). The term "out-of-network-service event" is used herein to refer to a period during which a tracking device is out-of-network-service. For example, a tracking device may experience an out-of-network-service event during a period when the tracking device cannot communicate with a cellular network. Out-of-network-service events may be periods when the tracking device has no WAN coverage between periods of the tracking device having WAN coverage.

The term "reachability" is used herein to refer to the tracking device's ability to communicate via the WAN. In other words, reachability is the ability of the tracking device to provide position information to a user. In particular, the reachability of the tracking device may be defined by the amount of time the tracking device may maintain battery service life sufficient to communicate over the WAN. For example, a tracking device may have reachability for a few weeks when the tracking device is configured to operate in a power optimization mode (e.g., the tracking device's long-range transceiver is configured to use little battery power).

The various embodiments include methods and systems for a tracking device to maintain reachability by optimizing power consumption based on measured wide-area network (WAN) service conditions. The tracking device may utilize a limited battery to power various operations, such as communicating via a long-range transceiver over the WAN (e.g., a cellular network, etc.). Due to location, such as being in an area with little reception, in between cellular towers, and/or in environments that preclude communications (e.g., buildings, underground, etc.), the tracking device may experience variable WAN conditions that affect connectivity. For example, in various time periods, the tracking device may experience suboptimal WAN conditions, such as rapid or slow loss and regain of WAN service (i.e., ping-ponging) and/or prolonged periods of being completely out-of-network-service.

Conventionally, when WAN service is lost (i.e., the tracking device is "out-of-network-service"), the tracking device may expend significant battery power to reacquire WAN service. In particular, the tracking device may search for recently used WAN communication channels (e.g., channels in a most recently used list, channels in a preferred roaming list, etc.) for a predefined period. For example, when out-of-network-service, the tracking device may continually evaluate WAN connectivity on each of the communication channels indicated in a stored preferred roaming list for fifteen minutes. During such a search during out-of-network-service conditions, a typical power consumption rate by the tracking device may be approximately 68 mA. If no WAN service is acquired, the tracking device may sleep for a predefined period (e.g., three minutes), after which the tracking device may continually perform searching operations using a set of possible WAN communication channels. For example, the tracking device may continually evaluate service conditions on a most recently used channel (e.g., the most recently used WAN), a random channel from the preferred roaming list, and a channel based on an all-channel in-band power measurement. Such searching for available WAN coverage may consume significant battery power (e.g., a possible rate of 68 mA for approximately 0.6 seconds) and may require additional tracking device operations (e.g., cellular modem activation, system determination operations, etc.).

As the tracking device may be used to monitor the location of an asset with respect to predefined safe-zones (e.g., a pet may be tracked when outside of an owner's backyard), a user may desire to employ a power optimization algorithm that minimizes the power consumed by the tracking device during periods of poor WAN coverage in order to maximize battery life. In such applications, it may be desire to operate the tracking device in power efficient states when WAN coverage is spotty so that the tracking device may be reachable for a longer period of time (i.e., maintain reachability). Performing the various embodiment methods, the tracking device may evaluate current WAN conditions (e.g., intermittent service signals), determine when it is unable to connect to the WAN (i.e., WAN out-of-network-service conditions), and operate in cycles of low power or power saving modes for certain durations based on the WAN conditions, WAN power consumption information, the current battery state (e.g., charge remaining or relative charge state), GPS power consumption, and desired reachability parameters. For example, the tracking device may operate in a power saving mode for a time period for a certain number of cycles based on a recent period of consecutively poor WAN coverage and the user's desire for the tracking device to be reachable via cellular network communications for several days.

In the various embodiments, the tracking device may perform power optimization algorithm operations once initial entry conditions (or criteria) are met. For example, the tracking device may evaluate current operating conditions before executing power optimization routines. The entry criteria (or entry conditions) may include the elapsed time since the tracking device was powered-on, the longest period of time the tracking device has experienced an out-of-network-service condition, whether a communication session (e.g., a cellular telephone communication) is active, and the elapsed time since the tracking device received an on-demand-localization message.

When the tracking device determines that the entry criteria have been met, the tracking device may begin executing power optimization operations by generating or otherwise measuring statistics regarding recent WAN conditions. The tracking device may evaluate the WAN conditions, such as whether the tracking device had WAN coverage or was out-of-network-service, for certain periods of time to determine whether the power optimization operations should be performed to conserve battery power. In an embodiment, the tracking device may evaluate WAN conditions for an evaluation period that is defined by a particular number of WAN out-of-network-service occurrences. For example, the tracking device may evaluate WAN conditions for a period corresponding to the tracking device losing and regaining WAN service a certain number of times. In another embodiment, the tracking device may evaluate WAN conditions for an evaluation period that is defined by a predefined duration. For example, the tracking device may evaluate WAN conditions for a period of a few seconds, minutes, etc. In another embodiment, the tracking device may evaluate WAN conditions for an evaluation period that is defined by either a particular number of out-of-network-service occurrences or a predefined duration. The tracking device may adjust the evaluation periods over the course of operating based on WAN conditions. For example, the tracking device may utilize an evaluation period based on a number of out-of-network-service occurrences when the tracking device determines WAN conditions are rapidly ping-ponging.

The tracking device may generate statistics based on the WAN conditions. In particular, the tracking device may determine the percentage (or a percentage value) of time the tracking device was out-of-network-service over an evaluation period, as well as the length of time the tracking device experienced an ongoing out-of-network-service condition. The tracking device may compare the generated statistics to threshold values to determine whether to operate in a power optimization mode. For example, if the percentage of time the tracking device was out-of-network-service in the evaluation period exceeds a predefined percentage threshold, the tracking device may be configured to operate in the power optimization mode.

In the various embodiments, when operating in the power optimization mode, the tracking device may operate in alternating states of minimal power consumption (i.e., "power save" state) and testing (i.e., "idle" state). During the power save state, the tracking device may shut-down operations and components, such as a long-range transceiver, that may diminish battery service life. During the idle state, the tracking device may determine whether the tracking device has WAN coverage. The tracking device may also evaluate other conditions that, if met, may enable the tracking device to exit the power optimization mode. For example, during the idle state, the tracking device may evaluate whether the tracking device has been removed from the tracked asset (e.g., a tracking device collar has been removed from a tracked pet). In addition, the tracking device may determine the number of times (or cycles) during the operation of the power optimization mode that the power save and idle states may be executed. In various embodiments, the tracking device may continually adjust the duration of the power save state and the idle state, as well as the number of cycles, based on recently experienced WAN conditions. In an embodiment, the number of cycles and the durations of the power save and idle states may be based on the generated statistics of the WAN conditions, the desired reachability of the tracking device, and/or the power consumption requirements of the tracking device (e.g., power consumption related to global positioning systems, power consumption information to communicating over a WAN, etc.). For example, the tracking device may calculate how much power may be required for the long-range transceiver to receive and transmit messages for testing the existence of WAN coverage, compare the calculation to the remaining battery service life and the desired reachability, and determine the length of time for power save states when operating in power optimization mode.

In an embodiment, the tracking device may store data that describes attributes, characteristics, and previous behavior patterns of the tracked asset. For example, the tracking device may store information that indicates the tracked asset is a pet, a child, a bulldozer, or a piece of equipment. In particular, the tracking device may store the data as movement profiles that may include information of the typical rate of travel, gait information, and historical location information of the tracked asset. The tracking device may utilize such stored information when estimated or otherwise generating reachability cost information. For example, the tracking device may compare the age, typical speed, and historical movements/locations of the tracked asset to current network conditions to estimate a probability that the tracking device may enter a period of poor WAN coverage. In another embodiment, the stored information related to the tracked asset may indicate urgency levels associated with the tracked asset, such as "high urgency" when the tracked asset is a child. Based on such urgency information, the tracking device may adjust calculated power save state durations and/or the maximum (or threshold) number of cycles to operate in the power optimization mode. For example, if the stored information indicates the tracking device is worn by a small child, the tracking device may re-check network conditions more persistently during idle states.

In another embodiment, the tracking device may also store local network almanac data that corresponds to areas (e.g., geofence areas, base safe-zones, etc.) historically traveled to or within by the tracked asset. The stored almanac data may indicate whether various areas the tracking device typically travels to is urban with dense WAN coverage and/or users, rural with dispersed WAN coverage. The almanac data may indicate general characteristics of the WAN coverage in a particular area, such as whether the area has generally ubiquitous or spotty WAN coverage. The tracking device may utilize such stored almanac data to estimate WAN coverage and other network conditions (e.g., access point availability) and may determine whether future locations may correspond to favorable network conditions. For example, the tracking device may evaluate recent movement information, such as GPS coordinates over a period, execute dead reckoning routines to determine a likely next location for the tracked asset, and compare this likely location to stored almanac data to estimate how long power save states should persist. In an embodiment, the tracking device may download almanac data from a central server, a device associated with an access point, and/or a base safe-zone beacon. Alternatively, the tracking device may build the almanac data over time from previous experiences. For example, the tracking device may store GPS coordinates, timestamp information, and WAN coverage information for all locations the tracked asset visited for a certain period during the week, month, and/or year.

In a further embodiment, the tracking device may store additional network information, such as statistics and WAN characteristics of regions, areas, or locations in which the tracking device typically travels. For example, the tracking device may store information showing areas that have overlapping multiple access points or cell towers, indicating dense network availability. The tracking device may utilize the additional network information when generating WAN statistics and/or calculating power save state durations and maximum number of cycles. For example, the tracking device may determine the number of channels available in an area the tracking device may soon enter when calculating the power save state duration. In an embodiment, when performing power optimization algorithm routines, the tracking device may evaluate additional network information stored in response to recent history (e.g., signals received by the tracking device within the last day, etc.) to conclude or estimate network conditions in upcoming areas. For example, based on signals received recently, the tracking device may determine an upcoming area corresponds to dense network coverage based on multiple proximate cellular network towers, and may thus calculate a shorter power save state duration, thereby enabling the tracking device to attempt WAN communications after a short period of movement or elapsed time.

In an embodiment, the tracking device may store additional network information indicating proximity of various cellular network towers, and may indicate the density of WAN coverage as a function of time and/or distance between such towers. The tracking device may store information indicating the numbers of channels available, and may store characteristics information that describes areas as urban or rural based on the availability of channels in the areas. Further, the tracking device may monitor signal strengths in areas and may store signal strength statistics or trending data with connection to the location and/or presence of access points or cellular network towers. For example, the tracking device may store data that indicates signal strength degrades to a certain quality of service within a certain distance between two cellular network towers. In an embodiment, the additional network information may also include indicators of the types of technologies (e.g., 1×, EVDO, LTE, etc.) available in certain geographic areas and/or associated with particular cellular network towers. The additional network information may also include data that indicates the probability that such characteristics exist. For example, the additional network information may store information that indicates the probability of the tracking device having access to multiple available channels when within a particular region.

In an embodiment, the tracking device may monitor sensor data detected by sensors, such as accelerometers, to detect whether movement occurs or is likely. For example, the tracking device may utilize accelerometer data indicating movement in addition to GPS sensor data to determine the tracked asset is moving out of a geofence area. Sensor data may indicate likelihood of movement or other activity. In an embodiment, the tracking device may adjust power save state durations, idle state durations, the maximum number of cycles to operate in power optimization mode, and the frequency to generate WAN statistics based on detected sensor data. For example, the tracking device may modify whether or when to generate WAN statistics (i.e., evaluate current network conditions) based on whether accelerometer data indicates a high amount of movement by the tracked asset. In an embodiment, the tracking device may also determine whether tracked asset movement is likely based on detected changes in short-range radio signals, such as frequency of receipt and/or content of Bluetooth broadcasts.

FIG. 1 illustrates an embodiment communication network for a tracking device 1 to receive safe-zone broadcasts and transmit messages to various devices. The tracking device 1 may be placed on an asset, such as a pet, equipment, vehicles, children, or property. For example, a pet owner may place an embodiment tracking device 1 on his/her dog as a collar. As another example, the tracking device 1 may be placed on a bulldozer at a construction site. The tracking device 1 may exchange wireless communications with a base safe-zone beacon 5 via a short-range wireless link 12. The wireless communications via short-range wireless link 12 may be short-range radio transmissions (e.g., base safe-zone broadcasts, portable safe-zone broadcasts, etc.), and may utilize radio protocols, such as Bluetooth®, Bluetooth® LE, Zigbee®, Peanut®, etc.

The short-range wireless link 12 range about which the base safe-zone beacon 5 may transmit short-range radio transmissions (i.e., base safe-zone broadcasts) may define the perimeter of a base safe-zone 30. If the tracking device 1 is within the range of base safe-zone broadcasts, the tracking device 1 may be considered to be within the base safe-zone 30. Example base safe-zones 30 include the backyard of a pet owner's house, a warehouse, a store, a construction site, a school, a farm or ranch, or any other enclosed area in which an asset is to be stored and/or tracked. In other words, if the tracking device 1 is within range of receiving wireless transmissions via the short-range wireless link 12, the tracking device 1 may be presumed for tracking purposes to be within the base safe-zone 30.

The tracking device 1 may also include a long-range radio or wireless transceiver capable of exchanging data with a cellular tower 6 via a long-range data link 10. For example, the tracking device 1 may be equipped with a cellular network modem and an antenna capable of transmitting data transmissions to a 3G, 4G or LTE cellular network. As described below, as the long-range (or high-power) data link 10 may require increased power consumption, the tracking device 1 may selectively use the long-range radio. For example, when receiving safe-zone broadcasts via the short-range wireless link 12, the tracking device 1 may de-activate, turn off, or configure the long-range radio to "sleep" (or be configured to operate in a sleep mode). In various embodiments, the tracking device 1 may utilize the long-range data link 10 (e.g., long-range radio data link) to transmit alarm messages (e.g., when outside of base safe-zone 30). In an embodiment, the tracking device 1 may also include a global positioning system (GPS) chip and exchange location data with a GPS satellite 50.

Using the long-range data link 10 or the short-range wireless link 12, the tracking device 1 may exchange data with a cellular tower 6 or the base safe-zone beacon 5, respectively, and establish communications with a data network 4. For example, the tracking device 1 may transmit data through the cellular tower 6 to a cellular telephone system. The data network 4 may include switching centers 18 that are coupled in network connections 14 to Internet gateway servers 22 to enable data connections to the Internet 24. The data network 4 may also enable telephone calls to be made to a mobile computing device 19, such as smartphones, tablet devices, and feature phones. For example, a smartphone mobile computing device 19 may exchange phone calls and/or SMS text messages with the cellular tower 6 via the long-range data link 10. Through the Internet 24, messages may be sent to remote servers 26 configured to provide asset monitoring services, such as alarm message handling and other tracking device 1 data processing. In an embodiment, the data network 4 may also communicate data, telephone calls, and other information to landline telephones (not shown).

In an embodiment, assets carrying (or connected to) the tracking device 1 may be larger than the range of the short-range radio transmissions from the base safe-zone beacon 5. For example, the asset may be a yacht or ship with a length exceeding short-range transmission ranges. In this case, the base safe-zone 30 may exceed the areas within short-range radio transmissions range from the base safe-zone beacon 5. For example, the base safe-zone 30 may be defined by a geofence or virtual fence (as may be determined by a GPS receiver or cellular telephone tower IDs). That is, virtual fences may be programmed by use of GPS coordinates to set the boundaries of the base safe-zone 30. In an alternative embodiment, a base safe-zone 30 may include more than one base safe-zone beacon 5 spaced apart so as to provide broadcast coverage of the entire base safe-zone 30.

FIGS. 2A-2D illustrate a tracking device 1 positioned at various physical locations with respect to a geofence area 52. Dependent upon whether the tracking device 1 is within or outside of the geofence area 52, the tracking device 1 may be configured to utilize a short-range radio transceiver (e.g., a Bluetooth, Zigbee, Peanut, RF, etc.), a long-range transceiver (e.g., cellular network modem with connected antenna), and/or a GPS chip for exchanging wireless transmissions with a cell tower 6, a base safe-zone beacon 5, and/or a GPS satellite 50 respectively. As the various communication techniques and equipment may require differing power consumption, the tracking device 1 may be configured to operate in power optimization modes based on physical location.

Figure 2A:
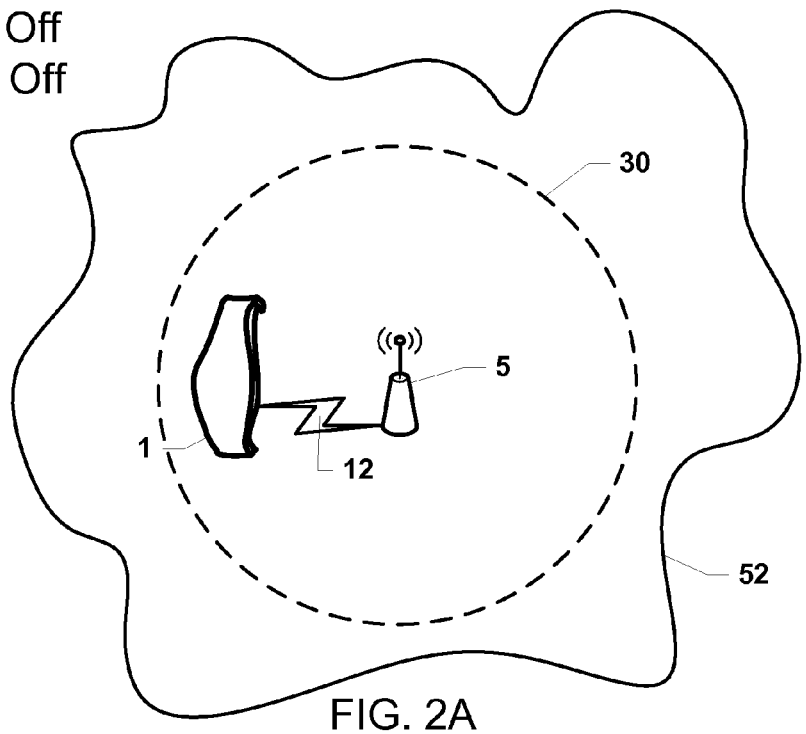
FIGS. 2A-2D are communication system block diagrams that illustrate a tracking device positioned at various physical locations with respect to a geofence area according to various embodiments.

FIG. 2A illustrates the tracking device 1 located within a base safe-zone 30. As described above, the tracking device 1 may be associated with a base safe-zone 30 defined by the broadcast range of a base safe-zone beacon 5. For example, the tracking device 1 may be within the base safe-zone 30 when communicating via short-range wireless link 12 with a base safe-zone beacon 5 associated with the base safe-zone 30. The base safe-zone 30 may be partially or completely within a geofence area 52. For example, the broadcast range of the base safe-zone beacon 5 may be within the geofence area 52 defining a pet owner's property. The geofence area 52 may be predefined GPS coordinates that define a particular place, such as an installation, site, grounds, and/or building. For example, the geofence area 52 may be defined by a set of GPS coordinates corresponding to locations around the perimeter of a yard, construction site, building, or campus.

While the tracking device 1 receives broadcasts from the base safe-zone beacon 5, the tracking device 1 may be within the base safe-zone 30 and thus may be configured to be in a low-power consumption mode. In other words, the tracking device 1 may de-activate or otherwise configure certain components to use little or no power when in the base safe-zone 30. For example, the tracking device 1 may de-activate a long-range transceiver when receiving broadcasts from the base safe-zone beacon 5. As another example, the tracking device 1 may also de-activate a GPS chip when receiving base safe-zone beacon 5 broadcasts as the tracking device 1 must be within the base safe-zone 30 to receive the broadcasts. In an embodiment, the tracking device 1 may receive GPS coordinates from the base safe-zone beacon 5. For example, the base safe-zone beacon 5 may broadcast GPS coordinates that indicate the general location of the base safe-zone 30 (i.e., locations within the broadcast range).

Figure 2B:
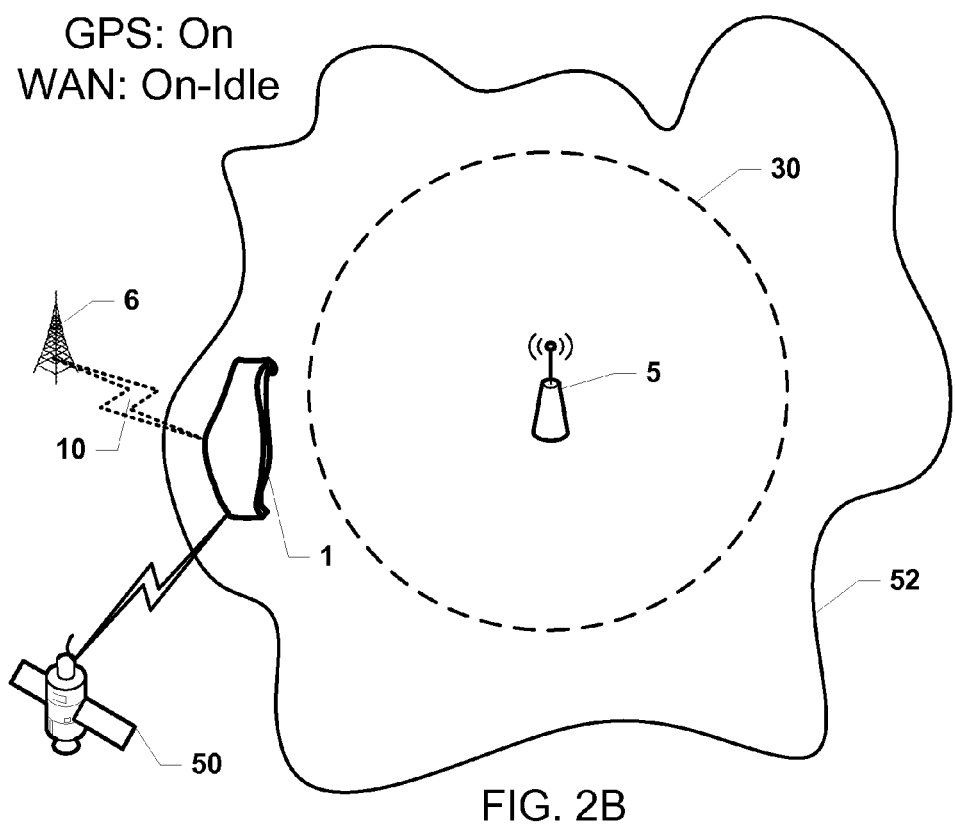

FIG. 2B illustrates the tracking device 1 located outside of the base safe-zone 30 and within the geofence area 52. In an embodiment, the geofence area 52 may include locations outside of the broadcast range of the base safe-zone beacon 5. In such a scenario, when the tracking device 1 fails to receive broadcasts from the base safe-zone beacon 5, the tracking device 1 may activate a GPS chip to receive signals from the GPS satellite 50. Based on received signals from the GPS satellite 50, the tracking device 1 may determine the GPS coordinates of the tracking device 1 and compare those coordinates to stored information describing the geofence area 52. For example, the tracking device 1 may compare the GPS coordinates defining the current location of the tracking device 1 to stored GPS coordinates of the geofence area 52. In an embodiment, the tracking device 1 may utilize tolerance threshold values to determine whether the tracking device 1 is within the geofence area 52. For example, the tracking device 1 may determine that the tracking device 1 is outside of the geofence area 52 when the GPS coordinates of the tracking device 1 indicate that it is located a certain distance from the GPS coordinates defining the geofence area 52.

In an embodiment, the tracking device 1 may also activate a long-range transceiver (e.g., cellular network modem) and communicate with the cell tower 6 and receive assisted GPS (e.g., A-GPS) information. For example, when the GPS chip is active but the tracking device 1 receives suboptimal signals from the GPS satellite 50 (e.g., the signals are missing, weak, unclear, and/or incomplete), the tracking device 1 may transmit assisted-GPS requests to the cell tower 6 via the long-range data link 10. In response, the cell tower 6 may relay the requests to a central (or remote) server for furtherance and return information indicating the GPS coordinates of the tracking device 1. For example, the cell tower 6 may relay the GPS request to the server 26 described above with reference to FIG. 1. In an embodiment, the cell tower 6 may relay the GPS requests to the base safe-zone beacon 5 for processing by a computing device associated with the base safe-zone 30 and/or the geofence area 52. For example, the cell tower 6 may relay the GPS request to a computing device within the base safe-zone 30 that stores the GPS coordinates defining the geofence area 52. The cell tower 6 may return precise GPS coordinates and/or information indicating whether the tracking device 1 is within the geofence area 52. Alternatively, the cell tower 6 may return information that enables the tracking device 1 to determine its own location with greater accuracy, such as GPS signal timing corrections, GPS-like time and position data, and rough location information that enables the GPS receiver to more quickly acquire GPS satellite signals. In an embodiment, when the assisted-GPS information relayed from the cell tower 6 indicates the tracking device 1 is within the geofence area 52, the tracking device 1 may de-activate the long-range transceiver. In various embodiments, the tracking device 1 may configure its long-range transceiver (or other wide area network capabilities) to operate in an idle state (i.e., "On-Idle") when the tracking device 1 located outside of the base safe-zone 30 and within the geofence area 52. For example, the long-range transceiver of the tracking device 1 may be "on", but the tracking device 1 may perform sleep/wake-up cycles or operations to minimize power consumption while monitoring or maintaining a minimum connection with the network (i.e., idle).

Figure 2C:
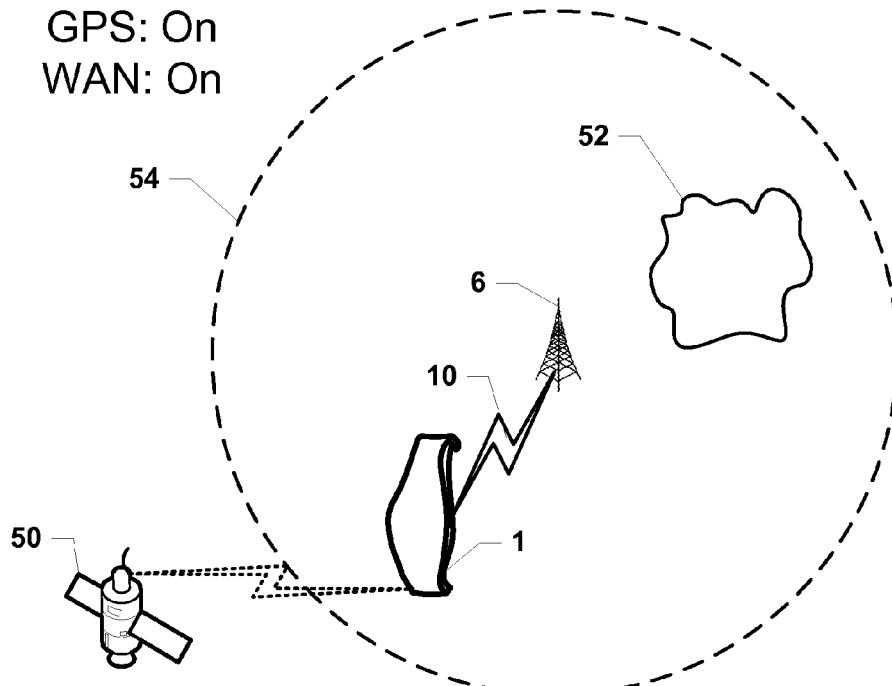

FIG. 2C illustrates the tracking device 1 located outside of the geofence area 52 but within a cellular network service area 54. Connected to or carried by assets, such as equipment, pets, and people, the tracking device 1 may be moved outside of the geofence area 52. For example, a dog wearing the tracking device 1 (e.g., on a collar) may walk out of the geofence area 52 corresponding to the dog's owner's backyard. As another example, a bulldozer having an attached tracking device 1 may be driven out of the construction site corresponding to a geofence area 52 for the bulldozer. As described above, the tracking device 1 may determine that it is outside of the geofence area 52 based on GPS coordinates received from the GPS satellite 50 and/or through assisted-GPS via the cell tower 6. When outside of the geofence area 52 but within the cellular network service area 54, the tracking device 1 may transmit alert messages and otherwise communicate with a cellular network via a data link 10 to the cell tower 6. For example, the tracking device 1 worn by a runaway dog may transmit an SMS message to the dog's owner's smartphone providing its location information. As another example, the tracking device 1 affixed to a bulldozer that has been removed from a construction site may transmit an automated voice message to a corporate headquarters hotline and/or the police indicating the bulldozer may have been stolen and providing live tracking reports.

Figure 2D:
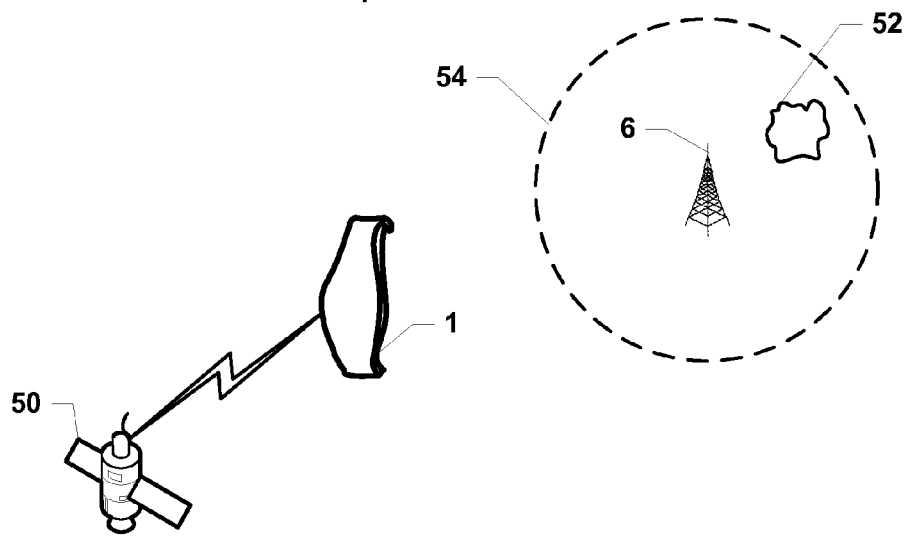

FIG. 2D illustrates a tracking device 1 located outside of the geofence area 52 and the cellular network service area 54. As described above with reference to FIG. 2C, the tracking device 1 may be removed from the predefined geofence area 52, such as a backyard, at which time, the tracking device 1 may activate a long-range transceiver and begin to transmit alert messages received by the cell tower 6 and relayed to the cellular network. However, as shown in FIG. 2D, the tracking device 1 may be moved to a location outside of cellular network service (or coverage). For example, a dog wearing the tracking device 1 may walk into a desert or mountainous area having no accessible cell tower 6. Alternatively, the tracking device 1 may be moved into areas with transient or inconsistent cellular network service or through areas where cellular network service is continually impacted and/or lost for periods of time. Without consistent cellular network service, the tracking device 1 may deactivate the long-range transceiver and/or perform power optimization routines, as described below with reference to FIG. 3B. In other words, the tracking device 1 may be configured to operate in a power optimization (or power save) mode. For example, the tracking device 1 may perform power saving operations but not turn "off" its long-range transceiver (i.e., the WAN capabilities may still be "on" but performing sleep/wakeup cycles when in a power optimization mode). However, the tracking device 1 may continue to poll the GPS satellite 50 to determine the geographic coordinates of the tracking device 1.

Figure 2E:
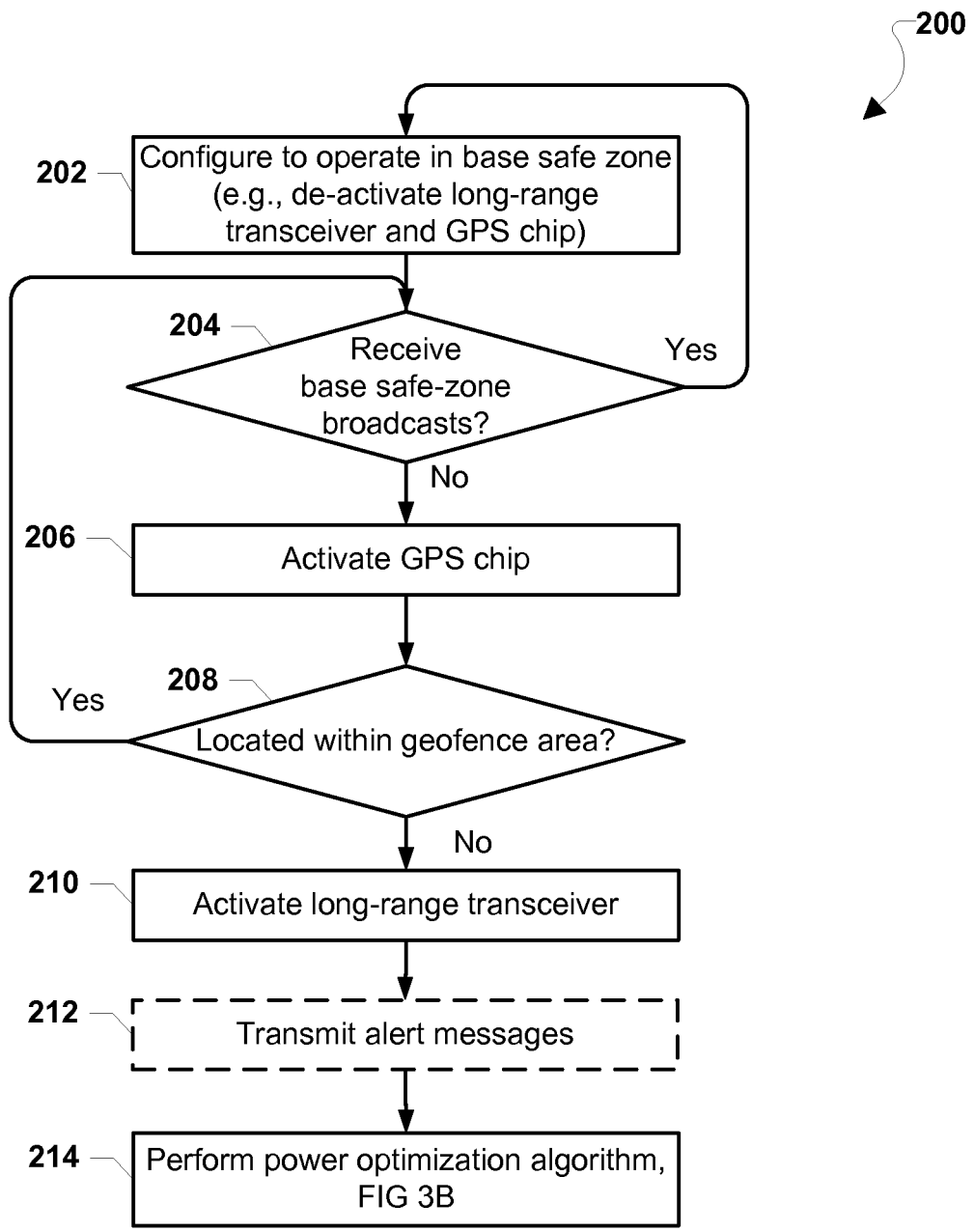
FIG. 2E is a process flow diagram illustrating an embodiment method for a tracking device being configured to operate based on relative locations regarding a base safe-zone.

FIG. 2E illustrates an embodiment method 200 for a tracking device configured to operate based on physical locations relative to a base safe-zone. As described above with reference to FIGS. 2A-2D, the tracking device may be configured to operate differently when outside of a base safe-zone. For example, the tracking device may be configured to transmit periodic alert messages via a cellular network only when outside of the base safe-zone. As another example, the tracking device may not activate the GPS receiver while receiving base safe-zone broadcast signals.

In block 202, the tracking device may be configured to operate in a base safe-zone. When operating in the base safe-zone, the tracking device may be configured to consume low power. The tracking device may de-activate components that may periodically utilize power to communicate via long-range transmissions, such as the long-range transceiver and GPS chip. The tracking device may also activate a short-range transceiver, such as a Bluetooth® or Zigbee® radio, that is configured to receive broadcast signals from a base safe-zone beacon.

In determination block 204, the tracking device may determine whether base safe-zone broadcasts are received, such as signals from a base safe-zone beacon. In an embodiment, the tracking device may determine whether base safe-zone broadcast signals are received within a predefined period of time. For example, the tracking device may maintain a timer, reset the timer when a base safe-zone broadcast is received, and determine base safe-zone broadcast signals are not received when the timer expires. If base safe-zone broadcast signals are received (i.e., determination block 204="Yes"), the tracking device may remain in this operating mode and continue with the operations in block 202. For example, when a base safe-zone broadcast signal is received, the tracking device may leave the long-range transceiver in the deactivated state.

If base safe-zone broadcast signals are not received (i.e., determination block 204="No"), in block 206, the tracking device may activate the GPS chip. With the activated GPS chip, the tracking device may begin receiving GPS signals to determine the coordinates of the tracking device's location. As discussed above, the tracking device may receive GPS signals from a GPS satellite and/or the cellular network via assisted-GPS techniques. In determination block 208, the tracking device may determine whether the tracking device is located within the geofence. In particular, the tracking device may determine whether it is within the geofence area based on a comparison of GPS-determined coordinates of the tracking device's location with stored coordinates defining the perimeter of the geofence area. In an embodiment, the tracking device may transmit its GPS-determined coordinates to a central server that stores the coordinates describing the geofence area, and the server may determine whether the tracking device is within the geofence area.

If the tracking device is within the geofence area (i.e., determination block 208="Yes"), the tracking device may continue with the operations in determination block 204. For example, the tracking device may be temporarily out of range of the base safe-zone broadcast signals but still within the geofence area, and so the tracking device may continue to listen for and determine whether base safe-zone broadcast signals area received. However, if the tracking device determines that it is not within the geofence area (i.e., determination block 208="No"), in block 210 the tracking device may activate the long-range transceiver. In an embodiment, the tracking device may have previously activated the long-range transceiver with the operations in block 206 when base safe-zone broadcast signals are not received. In optional block 212, the tracking device may transmit alert messages, such as messages that indicate the tracking device is outside of the base safe-zone and the geofence area. For example, the tracking device may transmit email alerts to a list of contacts stored on the tracking device immediately upon determining the tracking device is outside of the geofence area.

In block 214, the tracking device may perform power consumption optimization algorithm operations, such as described below with reference to FIG. 3B. In an embodiment, the tracking device may perform the operations in block 214 for a predefined period of time, for a predefined number of iterations, or a combination of time and iterations. For example, the tracking device may perform power consumption optimization algorithm operations for a period of time based on the current battery power of the tracking device and then perform the operations of determination block 208.

In another embodiment, the tracking device may perform the operations in block 214 whenever the long-range transceiver is active. For example, if the tracking device activates the long-range transceiver when outside of the base safe-zone but within the geofence area, the tracking device may perform power optimization operations.

Figure 3A:
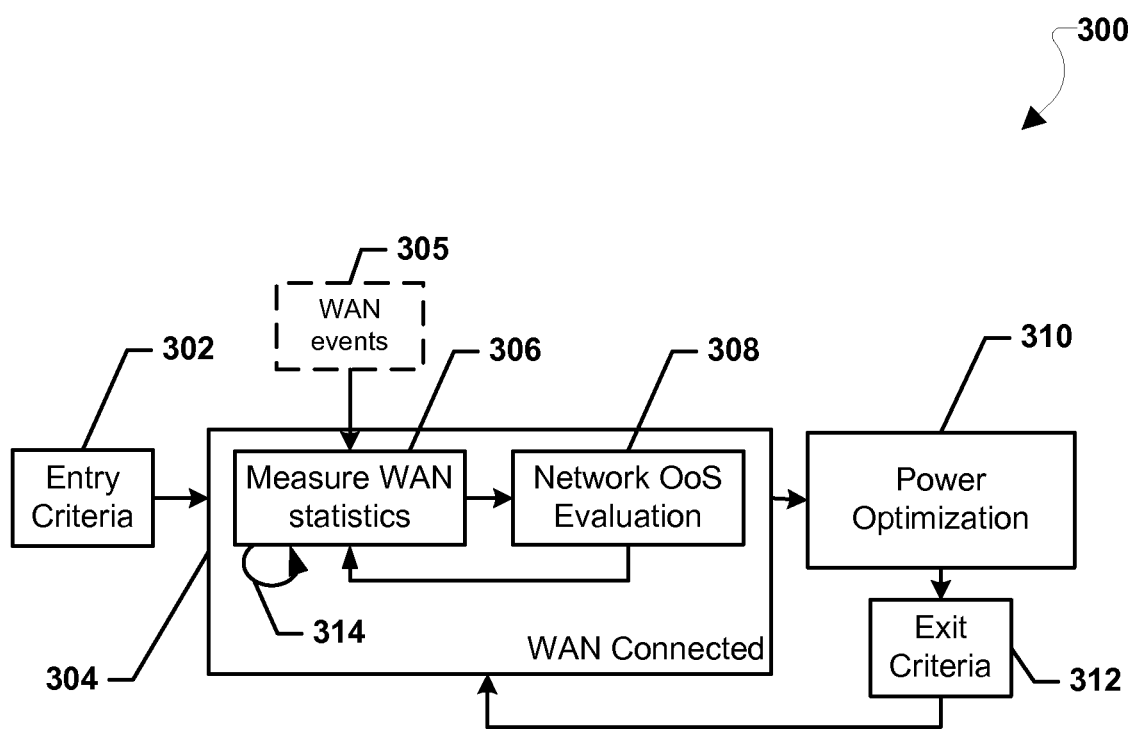
FIG. 3A is a logical block diagram of a tracking device's power optimization algorithm that may be used with various embodiments.

FIG. 3A illustrates a functional block diagram of a tracking device configured to perform an optimization algorithm that may be used with various embodiments. The tracking device may include various software modules and/or hardware circuits to perform the operations described below with reference to FIG. 3B. In particular, the tracking device may include an entry criteria module 302 that may determine whether the tracking device may be configured to perform the operations in a WAN Connected module 304. The tracking device may include a measure WAN statistics module 306 for evaluating information regarding the tracking device's recent communications via the WAN (i.e., evaluate WAN conditions), and a refresh mechanism 314 for initiating use of the measure WAN statistics module 306 with a predefined periodicity. In an embodiment, the measure WAN statistics module 306 may receive information about WAN events from a WAN events module 305. For example, the measure WAN statistics module 306 may receive signals (e.g., BREW messages) from the WAN events module 305 that indicate that cellular network coverage has been lost or resumed, and/or the signal strength of a network. In various embodiments, the WAN events module 305 may transmit signals that correspond to operating system threads, detected user inputs, and various software events that may be generated by the tracking device. The WAN Connected module 304 may also include a network out-of-network-service evaluation module 308 for determining whether measured WAN statistics indicate the tracking device is out of the service area (or connectivity) of the WAN. The tracking device may also include a Power optimization module 310 for performing operations when the tracking device is configured to operate in a power optimization mode and an exit criteria module 312 for determining whether the tracking device may perform the operations of the WAN Connected module 304.

Figure 3B:
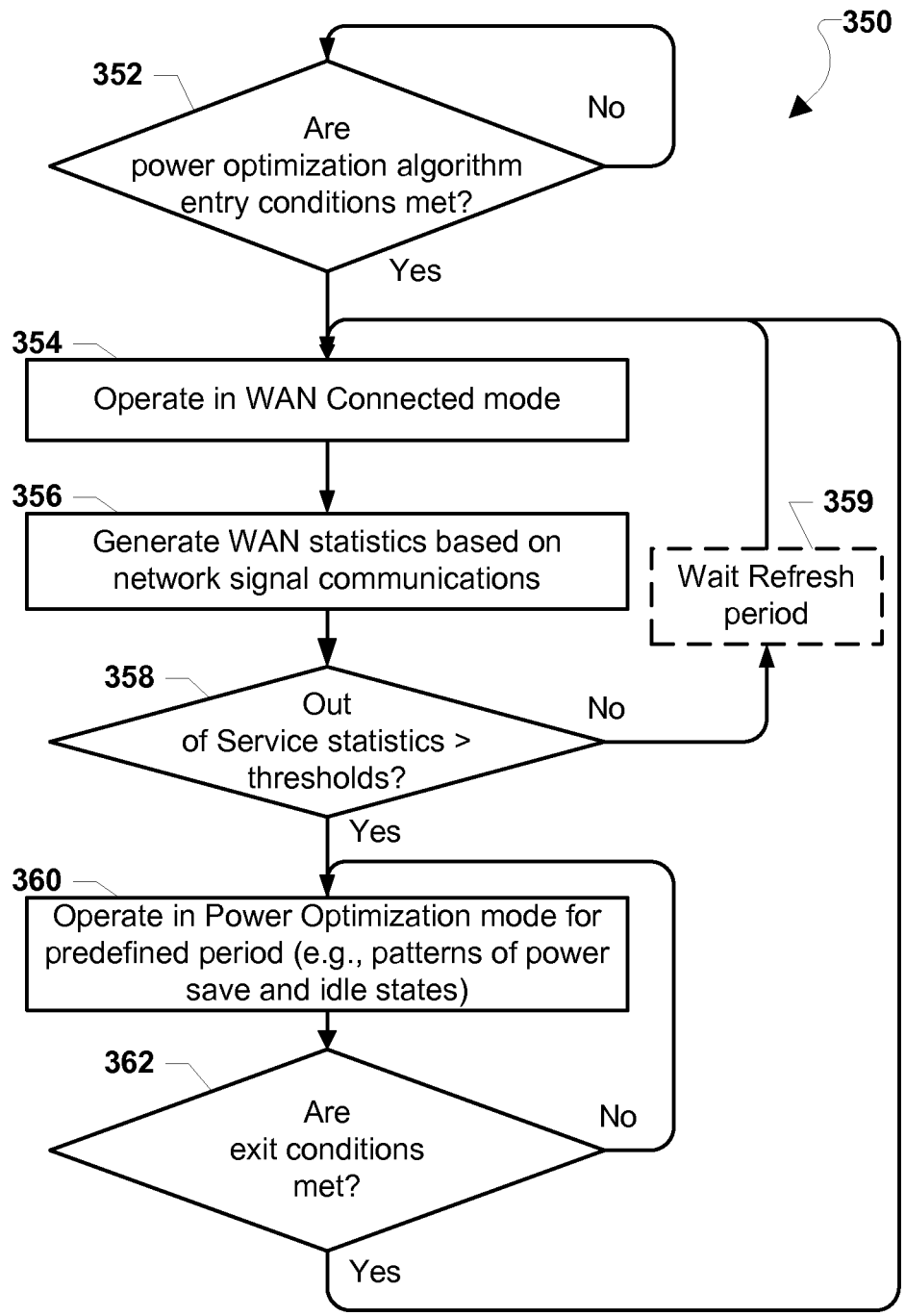
FIG. 3B is a process flow diagram illustrating an embodiment method for a tracking device executing a power optimization algorithm.

FIG. 3B illustrates an embodiment method 350 for a tracking device performing a power optimization algorithm. As described above, based on whether the tracking device has activated a long-range transceiver (e.g., the tracking device is located outside of a geofence area), the tracking device may adjust power consumption as the tracking device communicates with a WAN. For example, when outside the geofence area, the tracking device may take more GPS fixes and/or use a long-range transceiver to request assisted-GPS information from a central server across the WAN. In other words, when outside of the geofence area, the tracking device may be configured to determine its location with greater precision and be more reachable and capable of communicating with the WAN. However, when in areas of suboptimal WAN connectivity, the tracking device may be configured to conserve power by periodically de-activating components, such as the long-range transceiver. The tracking device may perform the operations of the method 350 to efficiently utilize the tracking device's battery charge while maintaining reachability for the tracking device via the WAN so long as the tracking device is outside of the geofence area.

In determination block 352, the tracking device may determine whether the power optimization algorithm entry conditions are met. In other words, the tracking device may determine whether to perform power optimization algorithm operations based on an evaluation of predefined conditions. For example, the tracking device may determine whether the long-range transceiver has been activated for a predefined period. The operations of determination block 352 are described below with reference to FIG. 4. If the entry criteria have not been met (i.e., determination block 352="No"), the tracking device may continue to perform the operations of determination block 352. In an embodiment, the tracking device may re-evaluate entry criteria at a regular, predefined interval. Alternatively, the tracking device may re-evaluate entry criteria at a time based on previous evaluations of the entry criteria. For example, the tracking device may re-evaluate the entry criteria in a certain period of time such that the time since the tracking device has been activated exceeds a predefined threshold for performing the optimization algorithm operations. In an embodiment, the operations in determination block 352 may be performed by the tracking device via an "entry criteria" module, software instructions, or circuitry, as described above with reference to FIG. 3A.

If the entry criteria have been met (i.e., determination block 352="Yes"), in block 354 the tracking device may be configured to operate in a WAN Connected mode. In particular, the tracking device may operate such that the tracking device may exchange transmissions with the WAN, gather GPS coordinate fixes from the WAN (assisted-GPS) or a GPS satellite, and perform various other communications without delimiting the amount of power consumed from the tracking device battery. The tracking device may continually evaluate WAN communications, available battery power, and whether the tracking device is within or outside of the geofence area while in WAN connected mode. For example, the tracking device may evaluate the available battery power to determine whether a long-range transceiver may remain activated. In an embodiment, the tracking device may activate included GPS chips, long-range transceivers and other communication components when in WAN Connected mode. In an embodiment, the operations in block 354 may be performed by the tracking device via a "WAN connected" module, software instructions, or circuitry, as described above with reference to FIG. 3A.

In block 356, the tracking device may generate WAN statistics based on network signal communications. The tracking device may evaluate and/or measure WAN signals for a period of recent activity to generate statistics indicating WAN conditions. For example, based on recorded connectivity information with the WAN over a period of time, the tracking device may tabulate the percentage of time the tracking device was without network service. The various measurements and evaluations of WAN statistics are described in detail below with reference to FIG. 5A-7B. In an embodiment, the operations in block 356 may be performed by the tracking device via a "measure WAN statistics" module, software instructions, or circuitry, as described above with reference to FIG. 3A.

In determination block 358, the tracking device may determine whether the out-of-network-service statistics exceed thresholds. In particular, the tracking device may evaluate the measured WAN statistics and determine whether the statistics indicate a period of inconsistent or non-existent network service (i.e., a predefined out-of-network-service condition). For example, the tracking device may determine that over the previous period (or time interval), the tracking device was out of cellular network service for a certain percentage of the time. The network out-of-network-service evaluation is described in detail below with reference to FIG. 8. In an embodiment, the operations in determination block 358 may be performed by the tracking device via a "network out-of-network-service evaluation" module, software instructions, or circuitry, as described above with reference to FIG. 3A.

If the network is determined not to have been out-of-network-service more than a predefined tolerance threshold (i.e., determination block 358="No"), in optional block 359 the tracking device may wait for a refresh period and continue with the operations in block 354. For example, the tracking device may employ the refresh mechanism described above with reference to FIG. 3A to configure the tracking device to operate in an idle state for the refresh period. This refresh period may enable the tracking device to only evaluate WAN statistics with a certain periodicity to ensure a sufficient sample of WAN signals and related communication data are available for each evaluation. If the network is determined to be out-of-network-service in excess of the predefined threshold duration (i.e., determination block 358="Yes"), in block 360 the tracking device may be configured to operate in a "Power Optimization" mode for a predefined period. In an embodiment, the operations in block 360 may be performed by the tracking device via a "Power Optimization" module, software instructions, or circuitry, as described above with reference to FIG. 3A.

In general, while operating in "power optimization mode", the tracking device may be configured to operate in an alternating pattern of "power save" states and "idle" states. The power save state may be a system configuration in which the tracking device minimizes, decreases, or otherwise diminishes power consumption of tracking device components and operations executed by the tracking device. For example, the tracking device may operate with lower power consumption by de-activating a long-range transceiver (e.g., cellular modem) and reducing power to other components. In an embodiment, the tracking device may be able to reduce its power consumption rate to about 0.69 mA or less. In particular, while in the power save state, the tracking device may deactivate, shut-down, or otherwise power-off the cellular network modem, temperature-compensated crystal oscillators (i.e., TCXO's), demodulator/modulator routines, RF radios (e.g., Bluetooth®, Zigbee®, Peanut®, etc.), the call manager, firmware, and/or and firmware updating routines. Additionally, unlike conventional sleep modes in mobile devices, the tracking device may discontinue polling a subscriber identity module ("SIM") and discontinue maintenance of a WAN state variable. In an embodiment, the tracking device may not de-activate the GPS chip and may continue to obtain GPS coordinate fixes. The tracking device may be configured to operate in the power save state for a period of time based on whether the tracking device is within the geofence area. For example, the power save state duration may be different when the tracking device is within or outside of the geofence area. As another example, the power save state duration may be five minutes when the tracking device is within the geofence area but three minutes when outside of the geofence area.

Regarding the idle state, the tracking device may be configured to periodically awake from the power save state for a predefined period of time. For example, the tracking device may operate in the idle state for a short period of seconds, such as ten seconds. While operating in the idle state, the tracking device may search for WAN signals (e.g., evaluate whether any cellular network transmissions are received via the long-range transceiver) and evaluate exit criteria (or exit conditions) for exiting the power optimization mode, as described below with reference to FIG. 11. For example, while in the idle state, the tracking device may determine whether the tracking device is detached from a tracked asset (e.g., a tracked pet or piece of equipment).

In an embodiment, the tracking device may operate in power optimization mode for a period of time defined by a number of cycles of operating in the power save state and the idle state. For example, the tracking device may utilize a counter (i.e., loopCounter) that increments once for every cycle of the tracking device operating in the power save and idle states. This counter mechanism is described further below with reference to FIG. 12. The tracking device may adaptively set the duration of the power save state, the duration of the idle state, and the number of cycles to perform (e.g., the number of times to operate in the power save and idle states) based on the WAN statistics generated with reference to the operations of block 356. For example, if the gathered information regarding the current WAN conditions shows that the tracking device has been consistently out-of-network-service for a period, the tracking device may set a longer power save state duration and/or idle state duration. As another example, the tracking device may determine that the number of cycles to perform power save and idle states while in power optimization mode should be longer than during a previous iteration based on the latest WAN statistics generated, events detected by the tracking device's operating system (e.g., low-level events, such as operating system events), and/or the amount of time currently required for the tracking device to determine GPS coordinates via a GPS satellite.

In an embodiment, the tracking device may perform calculations that evaluate the current power consumption (or cost of operating) of the tracking device in light of the desired period of reachability of the tracking device. For example, the user (e.g., the owner of the tracked asset) may desire a long period of time in which the battery of the tracking device may have service life, as represented in a configuration file and/or setting within the tracking device. Accordingly the tracking device may continually compare the remaining discharge time of the battery against projected power consumption for the tracking device to determine whether the tracking device may remain powered and stay reachable for the period of time desired by the user. When the tracking device determines that the power consumption is too great in view of the current battery charge state to maintain the reachability desired by the user, the tracking device may define operating parameters for the power optimization mode that may enable the tracking device to be reachable for the desired reachability time period. For example, if current power consumption based on out-of-network-service conditions is especially high, the tracking device may use the consumption information to determine the duration and number of cycles that the tracking device may operate in power save and idle states during the power optimization mode. As another example, when the tracking device's battery has a high level of available power (i.e., is in a high charge condition), the tracking device may determine that the tracking device may operate in the power optimization mode for a short period and may be more aggressive with using power-consuming resources, such as the long-range receiver. In the various embodiments, the tracking device may make calculations based on simulations, stored tables (e.g., average power consumption rates for the tracking device for various activities, etc.), and/or user input. For example, the tracking device may determine a duration to operate in the power save state based on a recommended duration value in a table related to the current WAN coverage (e.g., fast ping-pong, slow ping-pong, consistent out-of-network-service, etc.), a simulation of how the tracking device's power consumption may vary based on various power save state durations, and/or a user preference file stored on the tracking device.

Returning to FIG. 3B, in determination block 362, the tracking device may determine whether exit conditions are met. For example, the tracking device may determine whether conditions, such as executing in a power save state for a maximum number of cycles, are currently present. In an embodiment, the tracking device may evaluate exit conditions while configured to operate in the idle state. For example, during the idle state, the tracking device may determine whether an on-demand localization (or "ODL") communication is received by the tracking device. The exit conditions evaluation is described below with reference to FIG. 10. If exit conditions are not met (i.e., determination block 362="No"), the tracking device may continue to perform the operations in block 360. However, if exit conditions are met (i.e., determination block 362="Yes"), the tracking device may be configured to operate in WAN Connected mode and perform the operations in block 354. In an embodiment, the operations in determination block 362 may be performed by the tracking device via a "exit criteria" module, software instructions, or circuitry, as described above with reference to FIG. 3A.

Figure 4:
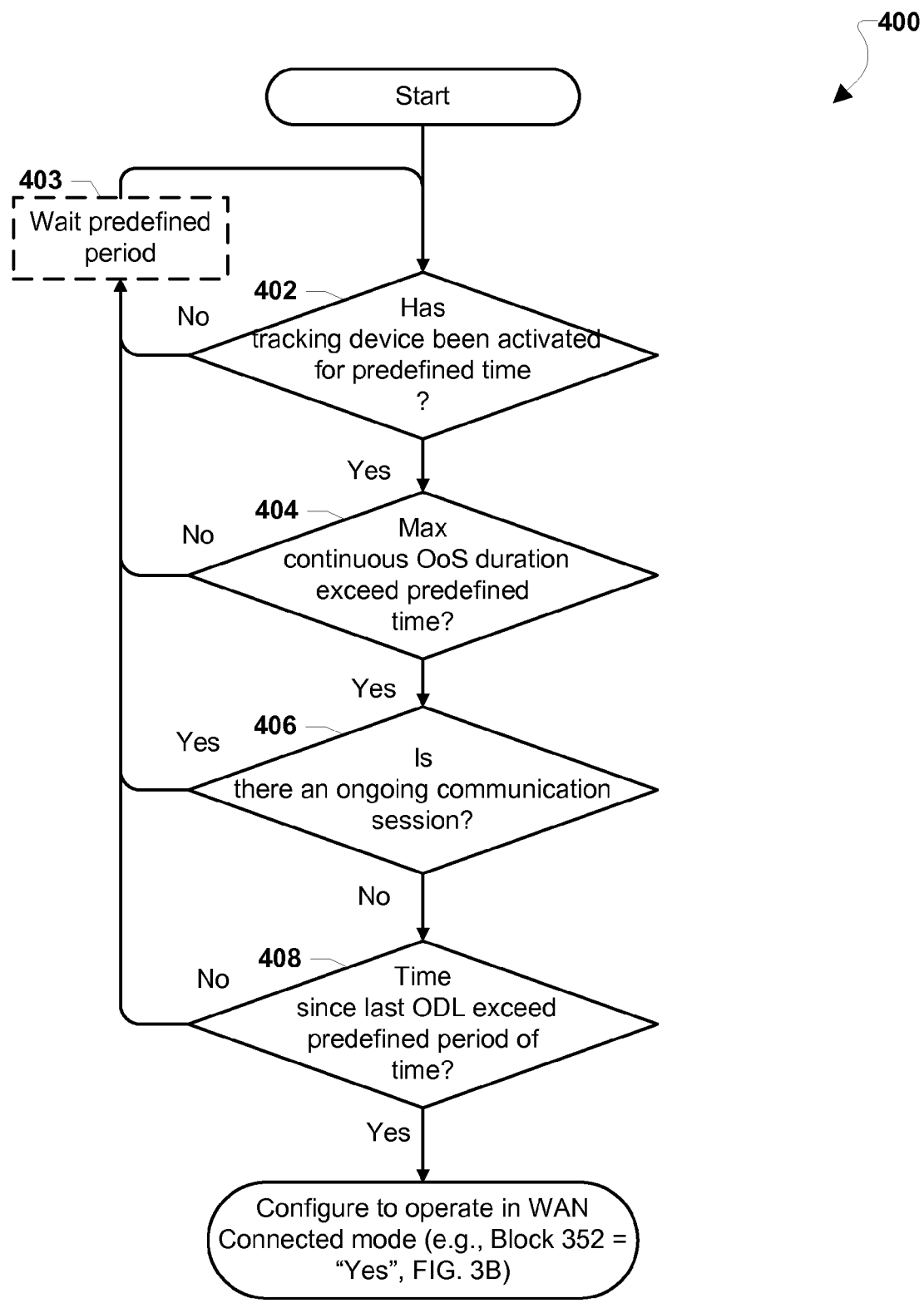
FIG. 4 is a process flow diagram illustrating an embodiment method for a tracking device determining whether entry conditions exist for performing a power optimization algorithm.

FIG. 4 illustrates an embodiment method 400 for a tracking device determining whether entry conditions exist for performing an optimization algorithm. As described above, the tracking device may only perform the optimization operations when various operating requirements, activities, and/or conditions are met. The tracking device may periodically perform the evaluations of the method 400 until all conditions have been met and the tracking device is eligible to perform the optimization algorithm.

In determination block 402, the tracking device may determine whether the tracking device has been activated for a predefined time. In other words, the tracking device may determine whether it has been "on" for a minimum period of time. The tracking device may compare the time since activation of the tracking device (i.e., activation time) to a threshold value. For example, the minimum time since activation may be required to exceed a fifteen minute threshold, for example. In an embodiment, the threshold value may represent a period of time needed for the tracking device to gather enough information regarding recent WAN conditions (via communication signals exchanged with the WAN) to enable adequate WAN statistics evaluations with reference to the operations in FIGS. 5A-7C.

In an embodiment, the threshold value may represent a period of time of operation needed for the tracking device to gather information required to perform system determination calculations. In general, system determination calculations may involve the tracking device utilizing a set of data structures and algorithms to identify the best system on which the tracking device may operate. For example, system determination calculations may be used by the tracking device to determine that the tracking device may be configured to operate in a power save state based on an evaluation of available cellular network service. System determination calculations may involve the evaluation of sets of data tables (or preferred roaming lists) that contain lists of preferred systems (and frequencies) on which the tracking device may operate and/or communicate. Such preferred roaming lists may be provided by WAN service providers, such as cellular network carriers, and may be downloaded into non-volatile memory of the tracking device. System determination calculations may also include user preference information, such as a user's preferred configurations for the tracking device's operating parameters (e.g., how often to retrieve GPS coordinate fixes, etc.).

The tracking device may also perform system determination calculations using available wireless systems information (or "over-the-air" system information), such as radio frequency and communication protocol conditions. For example, system determination calculations may include data related to the tracking device's communications with available systems, including data indicating a failure to acquire a particular system, a loss of a system or forward link failure, a denial of service, an authentication failure, network congestion, etc. System determination calculations may also evaluate user activity data, such as data representing specific activities initiated by the user (e.g., initiating a voice call), specific activities ended by the user (e.g., ending a voice call), and system selection preferences adjusted by the user. With such information, the tracking device may perform system determination calculations to generate data that may indicate that the tracking device may continue to utilize a system (e.g., stay on a particular access network), that the tracking device should communicate with a specific system (e.g., transmit messages with an accessible access network), and that the tracking device should enter or exit a power save state. In various embodiments, the tracking device may continually gather data for storage in a systems database and subsequent use in subsequent system determination calculations. For example, the tracking device may record cellular network signal strength changes over time and update a system determination database as long as the tracking device is activated.

In an embodiment, preferred roaming lists may also be stored within the tracking device's systems database. Additionally, the systems database may store and update record tables that include information indicating all known systems related to system determination operations, such as any unique set of mode, band and/or channel (CDMA). For example, a record table maintained within the systems database may be updated when the tracking device is placed in a power-off or offline operating state.

Returning to FIG. 4, if the tracking device has not been active for the predefined time (i.e., determination block 402="No"), in optional block 403 the tracking device may wait a predefined period before continuing with the operations in determination block 402. If the tracking device has been active for the predefined time (i.e., determination block 402="Yes"), in determination block 404 the tracking device may determine whether the maximum continuous out-of-network-service (referred to as "OoS" in FIG. 4) duration exceeds a predefined time. The predefined time may be a predefined threshold value. For example, based on recorded data regarding wireless communications since activation, the tracking device may identify continuous periods during which the tracking device had no cellular network service and determine the period of the longest duration. In an embodiment, the tracking device may determine that the tracking device is out-of-network-service when there is no network coverage and/or when network communication signals do not exceed a minimum strength. In other words, being out-of-network-service may mean that the tracking device has substandard or suboptimal service. If the maximum continuous out-of-network-service period does not exceed the predefined time (i.e., determination block 404="No"), the tracking device may continue with the operations in optional block 403 and determination block 402. In an embodiment, the maximum continuous out-of-network-service predefined time or threshold value may be a number of hours, such as three hours.

If the maximum continuous out-of-network-service period exceeds the predefined time (i.e., determination block 404="Yes"), in determination block 406 the tracking device may determine whether the tracking device is engaged in an ongoing communication session, such as a cellular network communication session. For example, the tracking device may be performing a firmware software download from a central server. If there is an ongoing communication session (i.e., determination block 406="Yes"), the tracking device may continue with the operations in optional block 403 and determination block 402.

If there is not an ongoing communication session (i.e., determination block 406="No"), in determination block 408 the tracking device may determine whether the time since the tracking device last exchanged an on-demand localization communication (referred to as "ODL" in FIG. 4) exceeds a predefined period of time, for instance a threshold value. The on-demand localization communication may be a page, ping, request, or other message that may be received and processed by the tracking device for the purpose of determining and reporting location information of the tracking device. For example, a central server may transmit an on-demand localization page to the tracking device requesting the tracking device to transmit current location information via a cellular network. In an embodiment, the tracking device may calculate a threshold value based on evaluations of quality of service of available communication systems, measurement system analysis ("MSA"), and times required for retrying on-demand localization communications. If the time since the last on-demand localization communication has not exceeded the predefined period of time (i.e., determination block="No"), the tracking device may continue with the operations in optional block 403 and determination block 402. However, if the time since the last on-demand localization communication has exceeded the predefined period of time (i.e., determination block="Yes"), the tracking device may execute the optimization algorithm operations in block 354 with reference to FIG. 3B. In an embodiment, the time since the first on-demand localization communication threshold value may be a number of minutes, such as five minutes.

In an embodiment, the tracking device may employ a weighting scheme when evaluating the various conditions such that the fulfillment of certain conditions may outweigh the failure to fulfill other conditions. For example, the tracking device may be configured such that the optimization algorithm may be performed when a majority of the conditions are met. As another example, the tracking device may perform the optimization algorithm when a few of important conditions are met and other less important conditions are not met.

Figure 5A:
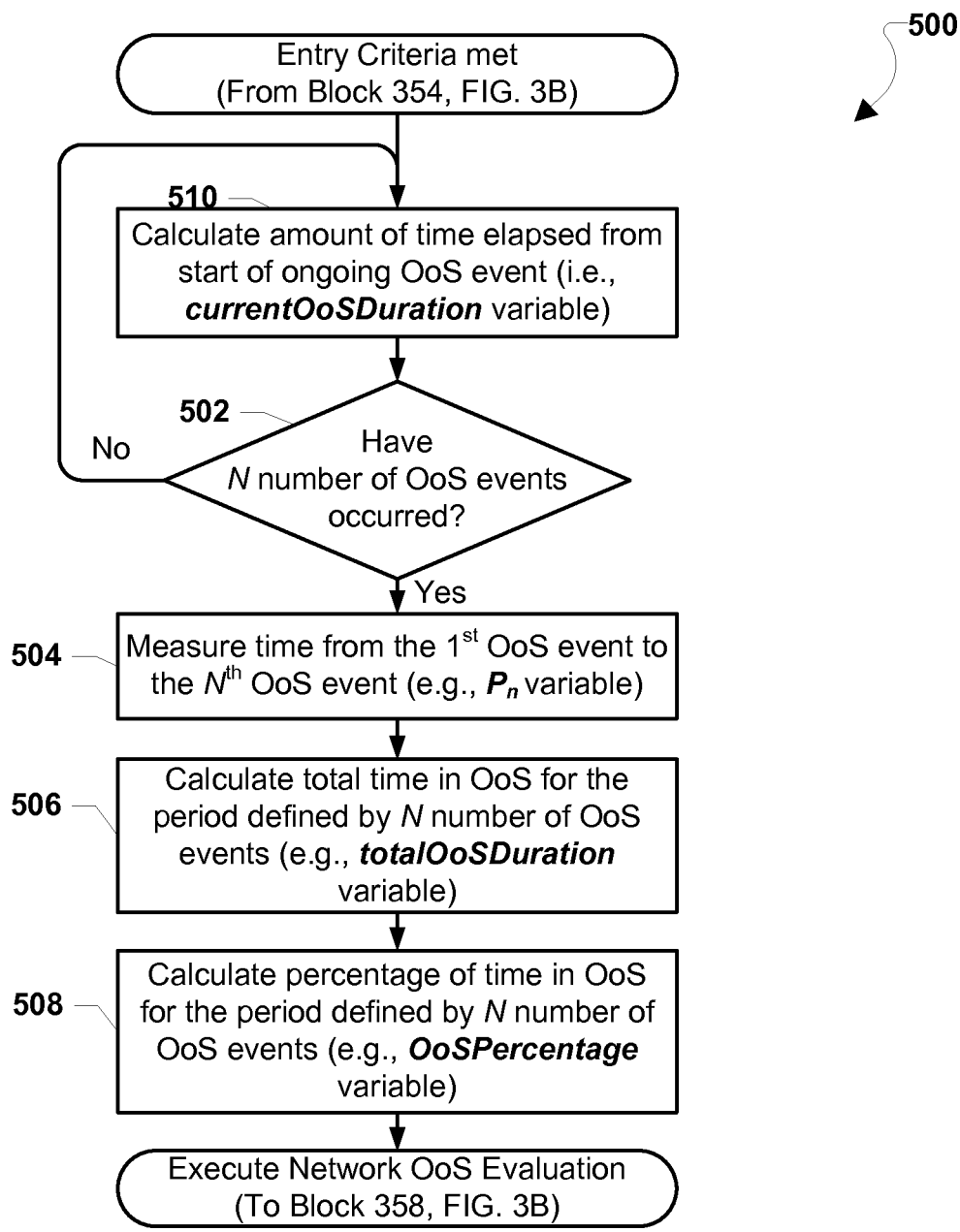
FIG. 5A is a process flow diagram illustrating an embodiment method for a tracking device measuring statistics in an event-based power optimization algorithm.
Figure 5B:
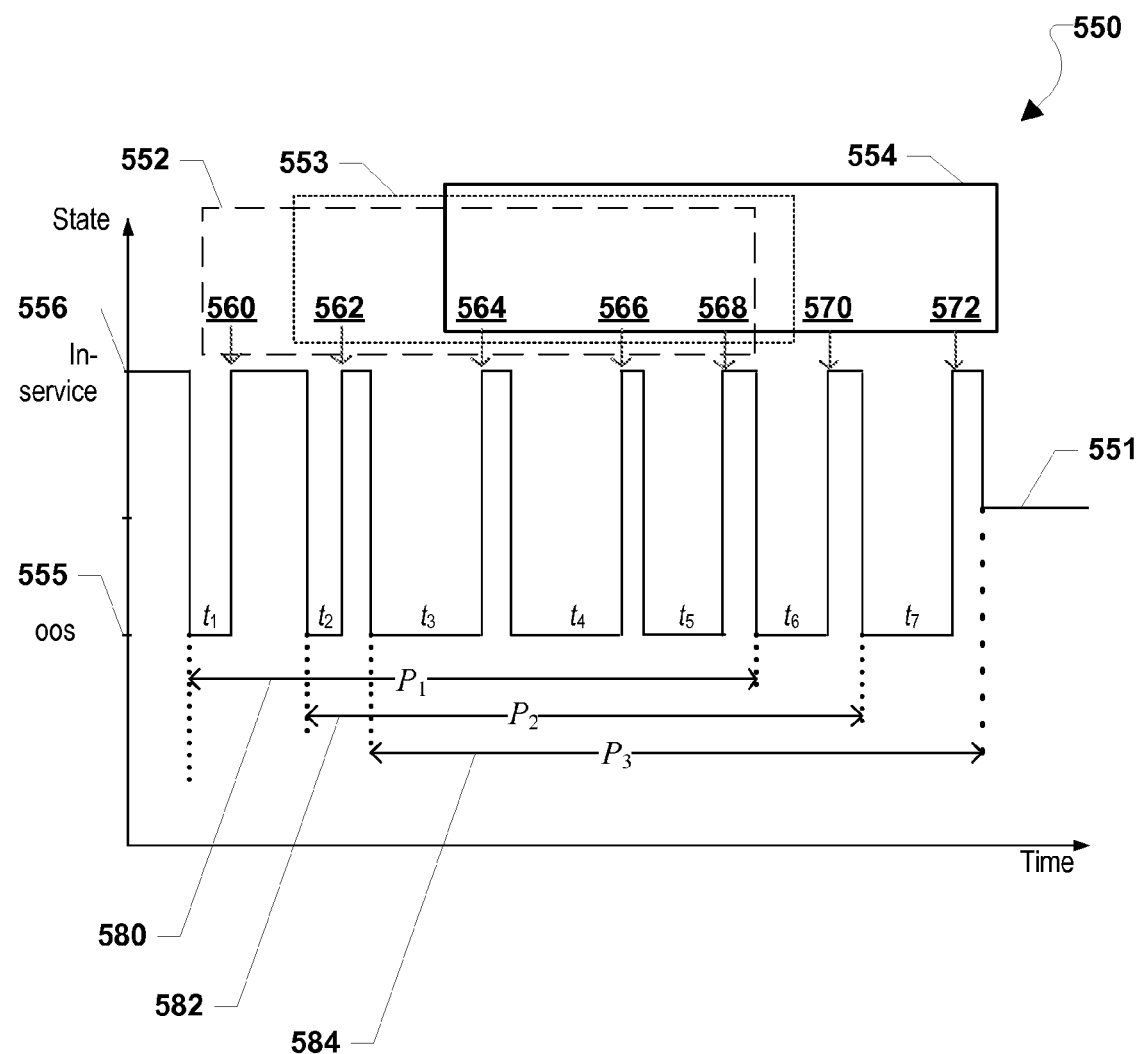
FIG. 5B is a time-line diagram illustrating measured events occurring over various time periods during execution of an event-based power optimization algorithm embodiment.
Figure 6A:
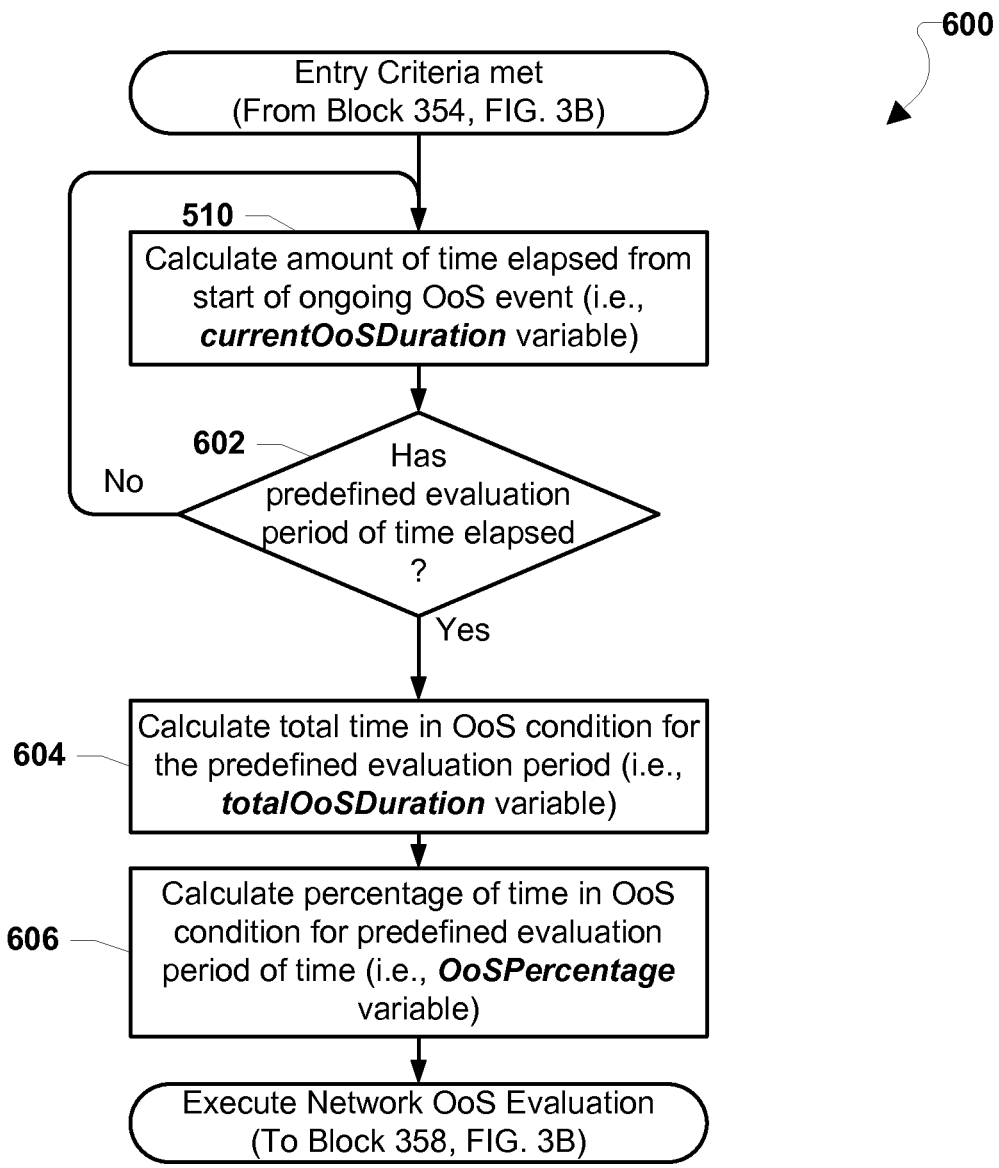
FIG. 6A is a process flow diagram illustrating an embodiment method for a tracking device measuring statistics in a time-based power optimization algorithm.
Figure 6B:
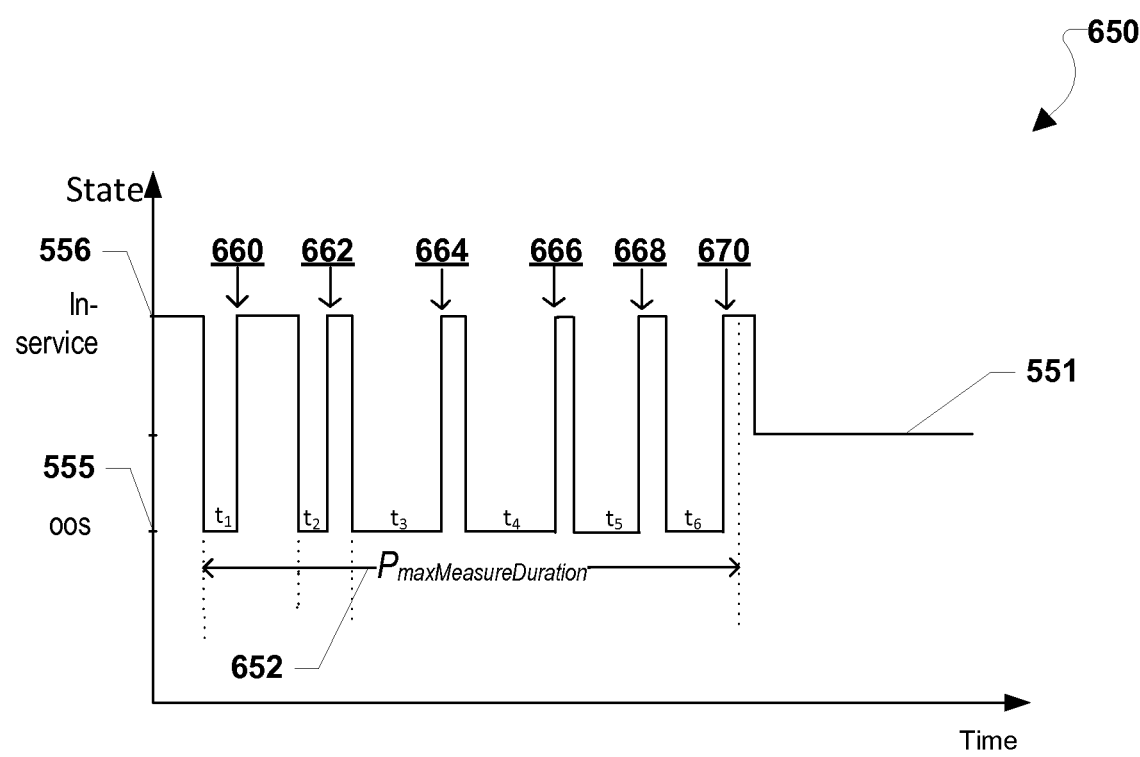
FIG. 6B is a time-line diagram illustrating events occurring over a time period during execution of a time-based power optimization algorithm embodiment.
Figure 7A:
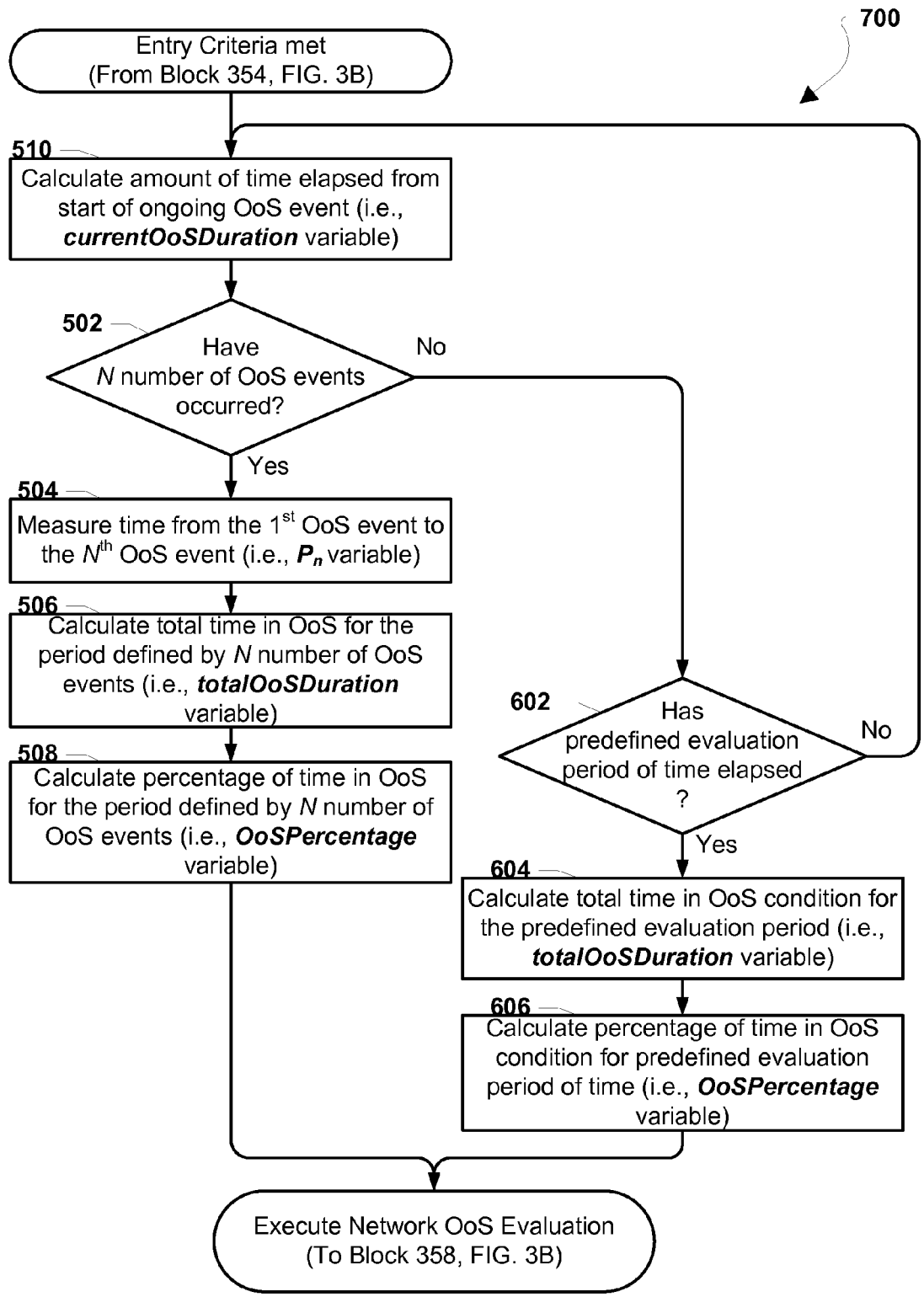
FIG. 7A is a process flow diagram illustrating an embodiment method for a tracking device measuring statistics in a hybrid power optimization algorithm.

FIGS. 5A, 6A, and 7A illustrate embodiment methods 500, 600, and 700 for a tracking device measuring WAN statistics for use during the execution of a power optimization algorithm. Each of the methods 500, 600, and 700 may be performed by a processor within the tracking device to generate information for evaluating whether the tracking device should enter a power-optimization mode. In particular, the methods may use various data to calculate the variables OoSPercentage and currentOoSDuration that may be used by the tracking device during execution of the operations described below with reference to FIG. 8. The OoSPercentage variable may be a numerical representation of the percentage of time the tracking device is in an out-of-network-service condition for an evaluation period. The evaluation period may be a predefined period of time, such as the maxMeasureDuration period used in the operations in FIG. 6A-6B, or an arbitrary period of time that corresponds with the identifying of a certain number of out-of-network-service events, such as the $P_n$ period used in the operations in FIG. 5A-5B. With the various methods, the tracking device may calculate the OoSPercentage variable by dividing the combined amount of time the tracking device is out-of-network-service for a period (or totalOoSDuration) by the total time in the evaluation period. The OoSPercentage variable may be represented as the following equation:

$$OoSPercentage = \frac{totalOoSDuration}{evaluation\ period}$$

The currentOoSDuration variable may be a numerical representation of an amount of time the tracking device was out-of-network-service for an out-of-network-service event during the evaluation period. In other words, the currentOoSDuration variable may be the amount of time elapsed from the starting of an ongoing out-of-network-service event. For example, the currentOoSDuration may represent the amount of time corresponding to an out-of-network-service condition the tracking device experiences at the end of an evaluation period.

In the various embodiments, the tracking device may utilize network activity statistics, such as the number of times the tracking device loses service during a certain period, from lower-level routines executing on the tracking device. For example, the tracking device may perform operating system routines via the operating system software executing on the tracking device's processor. In an embodiment, the lower-level routines may generate indicators representing whether the tracking device is currently out of network service, and may present the indicators to the tracking device via the tracking device's operating system. For example, operating system WAN events may be detected by the tracking device processor and evaluated determine whether the tracking device has lost or regained cellular network WAN service. Such indicators may further indicate the signal strength of WAN signals or alternatively may simply indicate whether or not WAN coverage exists for the tracking device.

FIG. 5A illustrates an embodiment method 500 for a tracking device measuring WAN statistics in an event-based power optimization algorithm. When the tracking device is configured to operate in a WAN Connected mode (e.g., the tracking device has an activated long-range transceiver and performs operations to communicate via a cellular network, etc.), statistics may be generated based on the tracking device's exchanges with a wide area network. For example, the tracking device may determine statistics describing the percentage of an evaluation period of time in which the tracking device had cellular network coverage. Executing operations to perform the method 500, the tracking device may generate WAN statistics based on information gathered during an evaluation period defined by the occurrence of a predefined number of out-of-network-service events. For example, the tracking device may compute WAN statistics using data gathered during the evaluation period in which N number of out-of-network-service events are identified.

In an embodiment, the tracking device may utilize a counter to determine the period for gathering data for generating WAN statistics. The counter may be a variable the tracking device increments each time an out-of-network-service event is identified. Alternatively, the counter may be a variable set to a default value that is decremented each time the tracking device identifies an out-of-network-service event. When the counter is incremented (or decremented) such that the counter value indicates that the predetermined number of out-of-network-service events has been identified by the tracking device, the counter may be reset. For example, with an incrementing counter, the tracking device may reset the counter to a zero value. As another example, with a decrementing counter, the tracking device may set the counter to the default value when the counter is decremented to a zero value.

In block 510, the tracking device may calculate the amount of time elapsed from the start of an ongoing out-of-network-service event, such as an ongoing out-of-network-service event occurring during the evaluation period. In an embodiment, the amount of time elapsed from the start of an ongoing out-of-network-service event may be represented by a currentOoSDuration variable. For example, the tracking device may compare the duration of an ongoing out-of-network-service event in the evaluation period and set the duration as the currentOoSDuration variable value.

In determination block 502, the tracking device may determine whether a predefined number (i.e., N variable) of out-of-network-service events have occurred. For example, the tracking device may determine whether N out-of-network-service events have been identified. As described above, the tracking device may utilize a counter variable to monitor the number of out-of-network-service events identified. The predefined number of out-of-network-service events (and the corresponding counter mechanism) may be defined by the tracking device based on previous iterations of performing the method 500, user input or user preferences, data gathered by the tracking device during previous communications with the WAN, instructions from a central server, or a combination of any of these. For example, based on a previous performance of the method 500, the tracking device may set the predefined number (or default counter value) as one more than the previous performance's predefined number (or default counter value). If the predefined number of out-of-network-service events have not occurred (i.e., determination block 502="No"), the tracking device may continue to perform the operations in block 510.

If the predefined number of out-of-network-service events have occurred (i.e., determination block 502="Yes"), in block 504 the tracking device may measure the time from the first out-of-network-service event to the $N^{th}$ out-of-network-service event. In other words, the tracking device may measure the total time elapsed in the evaluation period in which the tracking device detected the occurrence of the predefined number (i.e., N) of out-of-network-service events. For example, the total time elapsed, or evaluation period (i.e., $P_n$), may be the amount of time from the beginning of the first identified out-of-network-service event until the end of the tracking device identified the N out-of-network-service event.

In block 506, the tracking device may calculate the total amount of time the tracking device was in an out-of-network-service condition for the period defined by N number of out-of-network-service events. In other words, the tracking device may calculate the totalOoSDuration variable for the evaluation period. For example, the tracking device may combine the durations of each of the N number of individual out-of-network-service events to calculate the totalOoSDuration variable.

In block 508, the tracking device may calculate the percentage of time in an out-of-network-service condition during the period defined by N number of out-of-network-service events. In other words, the tracking device may calculate the OoSPercentage variable for the evaluation period. For example, the tracking device may divide the value calculated in the operations in block 506 by the $P_n$ value measured in the operations in block 504. In an embodiment, the tracking device may calculate the OoSPercentage variable using the following equation:

$$OoSPercentage = \frac{totalOoSDuration}{P_n}$$

The tracking device may continue with the network out-of-network-service evaluation operations in determination block 358 with reference to FIG. 3B.

FIG. 5B illustrates an exemplary graph 550 of measured out-of-network-service events 560-572 occurring over various evaluation periods 580-584 during a tracking device's execution of an event-based power optimization algorithm. As described above, the tracking device may be configured to generate WAN statistics based on out-of-network-service events detected during the operation of the tracking device. For example, the tracking device may gather information for generating WAN statistics during a predefined number of times the tracking device resumes cellular network service after periods of no WAN coverage.

The line 551 may represent the availability of WAN service to the tracking device over time. For example, in the exemplary graph 550, the line 551 may modulate between representing periods of the tracking device being out-of-network-service 555 (i.e., having no WAN coverage) and periods of the tracking device being in-service 556 (i.e., having WAN coverage). The tracking device may identify distinct out-of-network-service events 560-572 that are each comprised of periods of time of no WAN service (e.g., $t_1$, $t_2$, $t_3$, $t_4$, $t_5$, $t_6$, and $t_7$) and end when WAN service is reestablished.

As out-of-network-service events 560-572 are identified, the tracking device may update a counter, as described above with reference to FIG. 5A. As an illustrative example, the counter may be set to a value of five to indicate that a data gathering period for generating WAN statistics may encompasses the period of time for the tracking device to identify five out-of-network-service events. Accordingly, out-of-network-service events 560-568 may be within a first set 552, out-of-network-service events 562-568 may be within a second set 553, and out-of-network-service events 564-572 may be within a third set 554.

The sets 552, 553, and 554 may correspond to evaluation periods 580, 582, and 584, respectively. For example, the first set 552 may correspond with a first evaluation period 580 (referred to as "$P_1$" in FIG. 5B), the second set 553 may correspond with a second evaluation period 582 (referred to as "$P_2$" in FIG. 5B), and the third set 554 may correspond with a third evaluation period 584 (referred to as "$P_3$" in FIG. 5B). The tracking device may determine the amount of time the tracking device is out-of-network-service and in-service of the WAN for each of the sets 552-554 and evaluation periods 580, 582, and 584.

As an illustrative example, the tracking device may determine the amount of time the tracking device was out-of-network-service for the first set 552 by combing the duration of each of the out-of-network-service events for the first evaluation period 580 (e.g., $t_1+t_2+t_3+t_4+t_5$). The tracking device may further calculate the OoSPercentage for the first evaluation period 580 by dividing the combined duration of out-of-network-service events for the first set 552 by the time value of the first evaluation period 580 (i.e., OoSPercentage= $(t_1+t_2+t_3+t_4+t_5)/P_1$).

FIG. 6A illustrates an embodiment method 600 for a tracking device measuring WAN statistics in a time-based power optimization algorithm. The method 600 is similar to the method 500 described above with reference to FIG. 5A, except that when executing the method 600, the tracking device may utilize a predefined evaluation period for gathering information for generating WAN statistics, as opposed to gathering information for a period defined by the occurrence of a predefined number of out-of-network-service events. For example, executing the method 600, the tracking device may compute WAN statistics using data gathered during an evaluation period of a predefined duration. The number of out-of-network-service events included in the evaluation period when executing the method 600 may be different or the same as the number of out-of-network-service events included in the evaluation period when executing the method 500.

Similar to the methods described above, in block 510, the tracking device may calculate the amount of time elapsed from the start of an ongoing out-of-network-service event (i.e., the currentOoSDuration variable). For example, at the end of the evaluation period, the tracking device may determine the value of currentOoSDuration as the length of time elapsed since the start of the current on-going out-of-network-service event.

In determination block 602, the tracking device may determine whether a predefined evaluation period of time has elapsed. The predefined evaluation period may have a duration represented by the variable maxMeasureDuration. For example, the tracking device may gather information for WAN statistics for an evaluation period $P_{maxMeasureDuration}$, and maxMeasureDuration may represent several milliseconds, seconds, or minutes (e.g., five minutes). During this evaluation period, the tracking device may identify an arbitrary number of out-of-network-service events. For example, the tracking device may not lose WAN service for the evaluation period, or alternatively, may lose and regain WAN service several times during the evaluation period. If the evaluation period of time has not elapsed (i.e., determination block 602="No"), the tracking device may continue to perform the operations in block 510.

If the evaluation period of time has elapsed (i.e., determination block 602="Yes"), in block 604 the tracking device may calculate the total time in an out-of-network-service condition for the predefined evaluation period. In other words, the tracking device may set the totalOoSDuration variable value as the amount of time the tracking device was in an out-of-network-service condition during the evaluation period. For example, the tracking device may combine the durations of any identified out-of-network-service events that occurred during the evaluation period.

In block 606, the tracking device may calculate the percentage of time in an out-of-network-service condition for the predefined evaluation period of time. In other words, the tracking device may calculate the OoSPercentage variable. For example, the tracking device may divide the value calculated in the operations in block 604 by the evaluation period. In an embodiment, the tracking device may calculate the OoSPercentage variable using the following equation:

$$OoSPercentage = \frac{totalOoSDuration}{P_{maxMeasureDuration}}$$

The tracking device may continue with the network out-of-network-service evaluation operations in determination block 358 described above with reference to FIG. 3B. In an embodiment, a new evaluation period may occur after the elapse of a predefined refresh period. For example, the tracking device may begin gathering information for generating WAN statistics in a new evaluation period thirty seconds after the end of the preceding evaluation period.

FIG. 6B illustrates an exemplary graph 650 of out-of-network-service events 660-670 occurring during a tracking device's execution of a time-based power optimization algorithm. As described above, the tracking device may be configured to measure WAN statistics for a predefined evaluation period 652, during which the tracking device may identify an arbitrary number of out-of-network-service events 660-670. The line 551 may represent the availability of WAN service to the tracking device over time. For example, in the exemplary graph 550, the line 551 may modulate between representing periods of the tracking device being out-of-network-service 555 (i.e., having no WAN coverage) and periods of the tracking device being in-service 556 (i.e., having WAN coverage).

As an illustrative example, the tracking device may determine the amount of time the tracking device was out-of-network-service for the evaluation period 652 by combing the duration of each of the out-of-network-service events for the evaluation period 652 (e.g., $t_1+t_2+t_3+t_4+t_5+t_6$). For example, the evaluation period 652 may have a duration of five minutes. The tracking device may further calculate the OoSPercentage for the evaluation period 652 by dividing the combined duration of out-of-network-service events 660-670 by the evaluation period 652 (i.e., OoSPercentage=$(t_1+t_2+t_3+t_4+t_5+t_6)/P_{maxMeasureDuration}$).

FIG. 7A illustrates an embodiment method 700 for a tracking device measuring WAN statistics in a hybrid optimization algorithm. The method 700 is similar to the methods 500 and 600 described above with reference to FIGS. 5A and 6A, except that when executing the method 700, the tracking device may gather information for generating WAN statistics in an evaluation period that is based on either identifying a predefined number of out-of-network-service events (i.e., N variable) or a predefined duration (i.e., maxMeasureDuration variable). In other words, the method 700 may utilize the operations of either of the methods 500, 600. For example, executing the method 600, the tracking device may utilize a predefined duration and a predefined number of out-of-network-service events (i.e., N events). When executing the method 700, the tracking device may determine the evaluation period continues until either the predefined duration elapses or the tracking device identifies the predefined number of out-of-network-service events. In an embodiment, the tracking device may calculate the OoSPercentage variable based on the operations of the method 500 when the tracking device identifies the predefined number of out-of-network-service events prior to the predefined duration elapsing and, inversely, may calculate the OoSPercentage variable based on the operations of the method 600 when the predefined duration elapses prior to the tracking device identifying the predefined number of out-of-network-service events.

As described above, in block 510, the tracking device may calculate the amount of time elapsed from the start of an ongoing out-of-network-service event, such as an ongoing out-of-network-service event occurring during the evaluation period represented by the variable currentOoSDuration. In determination block 502, the tracking device may determine whether a predefined number (i.e., N variable) of out-of-network-service events have occurred. For example, the tracking device may determine whether N out-of-network-service events have been identified. If the predefined number of out-of-network-service events have occurred (i.e., determination block 502="Yes"), the evaluation period may be considered completed. In block 504, the tracking device may measure the time from the first out-of-network-service event to the $N^{th}$ out-of-network-service event (i.e., $P_n$ variable).

In block 506, the tracking device may calculate the total amount of time the tracking device was in an out-of-network-service condition for the period defined by N number of out-of-network-service events (i.e., the totalOoSDuration variable). For example, the tracking device may combine the durations of each of the N number of individual out-of-network-service events to calculate the totalOoSDuration variable. In block 508, the tracking device may calculate the percentage of time in an out-of-network-service condition during the period defined by N number of out-of-network-service events. In other words, the tracking device may calculate the OoSPercentage variable. For example, the tracking device may divide the value calculated in the operations in block 506 by the $P_n$ value measured in the operations in block 504.

However, if the predefined number of out-of-network-service events have not occurred (i.e., determination block 502="No"), in determination block 602 the tracking device may determine whether a predefined evaluation period of time has elapsed. In other words, the tracking device may determine whether the duration represented by the variable maxMeasureDuration has elapsed. In an embodiment, the maxMeasureDuration variable may represent a number of minutes, such as five minutes. If the evaluation period of time has not elapsed (i.e., determination block 602="No"), the tracking device may continue to perform the operations in block 510. If the evaluation period of time has elapsed (i.e., determination block 602="Yes"), the evaluation period may be considered completed. In block 604 the tracking device may calculate the total time in an out-of-network-service condition for the predefined evaluation period (i.e., the totalOoSDuration variable). For example, the tracking device may combine the durations of any identified out-of-network-service events that occurred during the evaluation period. In block 606, the tracking device may calculate the percentage of time in an out-of-network-service condition for the predefined evaluation period of time (i.e., calculate the OoSPercentage variable). For example, the tracking device may divide the value calculated in the operations in block 604 by the evaluation period.

The tracking device may continue with the network out-of-network-service evaluation operations in determination block 358 with reference to FIG. 3B. In an embodiment, a new evaluation period may occur after the elapse of a predefined refresh period. For example, the tracking device may begin gathering information for generating WAN statistics in a new evaluation period an arbitrary number of seconds, minutes, etc. after the end of the preceding evaluation period. In another embodiment, a new evaluation period may begin at the occurrence of any event, such as an out-of-network-service event identified after the completion of the evaluation period.

Figure 7B:
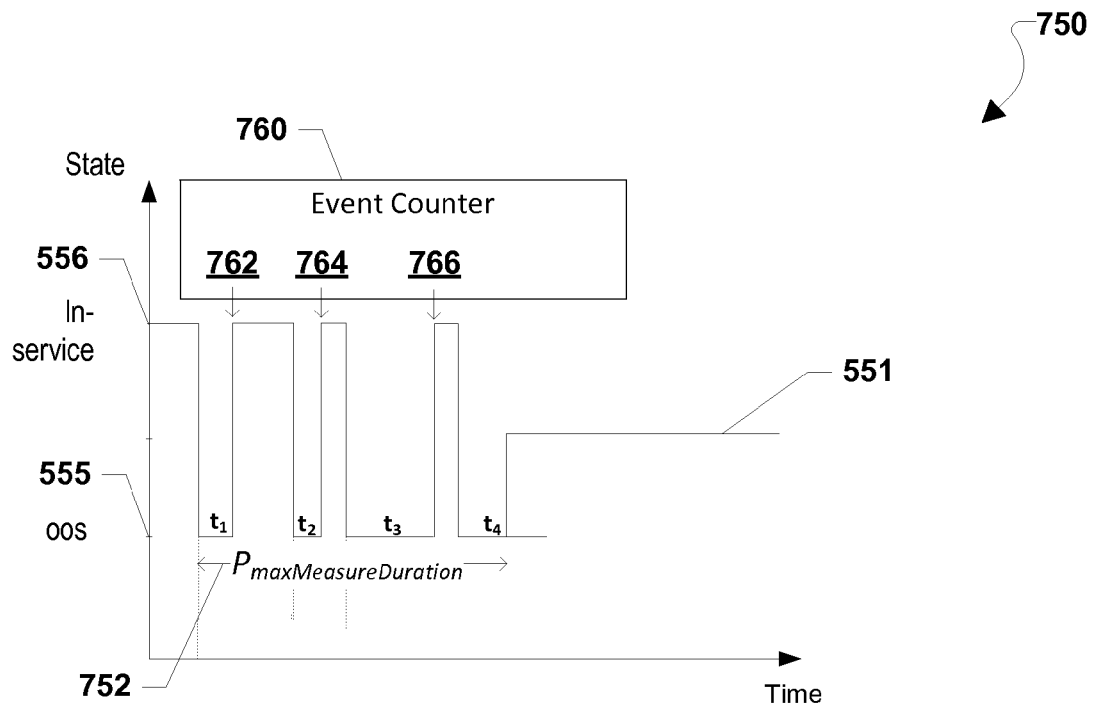
FIGS. 7B and 7C are time-line diagrams illustrating events occurring over a period during execution of a hybrid power optimization algorithm embodiment.

FIG. 7B illustrates an exemplary graph 750 of out-of-network-service events 762-766 occurring during a tracking device's execution of a hybrid-based power optimization algorithm. The tracking device may be configured to measure WAN statistics for an evaluation period 752 that may be based on a predefined duration or the occurrence of a predefined number of out-of-network-service events 762-766 of a set 760. As described above, the line 551 may represent the availability of WAN service to the tracking device over time and may modulate between representing periods of the tracking device being out-of-network-service 555 (i.e., having no WAN coverage) and periods of the tracking device being in-service 556 (i.e., having WAN coverage).

The graph 750 shows that the tracking device may determine that the predefined duration has elapsed before identifying a predefined number of out-of-network-service events 762-766. For example, the tracking device may determine that the predefined duration represented by the variable maxMeasureDuration elapsed before the tracking device identified the predefined number of four out-of-network-service events 762-766 of the set 760. Thus, the evaluation period 752 may be based on the predefined duration, and the tracking device may further calculate the OoSPercentage by dividing the combined duration of out-of-network-service events 762-766 and ongoing out-of-network-service conditions (i.e., $t_1$, $t_2$, $t_3$, and $t_4$) by the evaluation period 752 (i.e., OoSPercentage=$(t_1+t_2+t_3+t_4)/P_{maxMeasureDuration}$). Unlike as described above with reference to FIGS. 5B and 6B, the evaluation period 752 may elapse while the tracking device is in an out-of-network-service condition. In other words, the evaluation period 752 may elapse during an ongoing out-of-network-service condition and before the tracking device regains WAN service. In this case, the tracking device may determine that the currentOoSDuration variable for the evaluation period may have a value that corresponds to the duration of the ongoing out-of-network-service condition at the time the evaluation period elapsed (i.e., $t_4$).

Figure 7C:
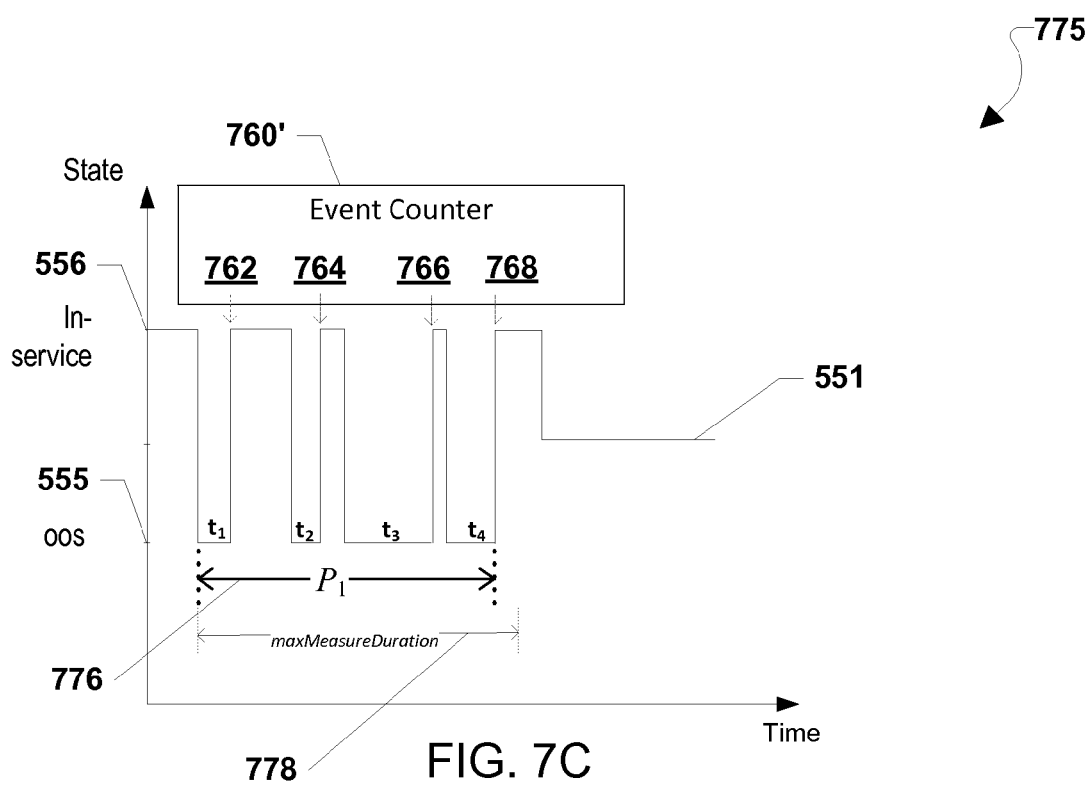

FIG. 7C illustrates another exemplary graph 775 of out-of-network-service events 762-768 occurring during a tracking device's execution of a hybrid-based power optimization algorithm. FIG. 7C is similar to the graph 750 described above with reference to FIG. 7B, except in this scenario, the tracking device may identify a predefined number of out-ofnetwork-service events 762-768 of a set 760' prior to a predefined duration 778 elapsing. As described above, the line 551 may represent the availability of WAN service to the tracking device over time and may modulate between representing periods of the tracking device being out-of-network-service 555 (i.e., having no WAN coverage) and periods of the tracking device being in-service 556 (i.e., having WAN coverage).

As shown in graph 775, before the predefined duration 778 elapses (i.e., maxMeasureDuration), the tracking device may identify the predefined number of out-of-network-service events 762-768. Thus, the evaluation period 776 (i.e., $P_1$) may be based on the time elapsed during which the tracking device identified the out-of-network-service events 762-768, and the tracking device may further calculate the OoSPercentage by dividing the combined duration of out-of-network-service events 762-768 (i.e., $t_1$, $t_2$, $t_3$, and $t_4$) by the evaluation period 776 (i.e., OoSPercentage=$(t_1+t_2+t_3+t_4)/P_1$).

In various embodiments, based on gathered information regarding network availability over a period of time, the tracking device may evaluate and characterize current network conditions. In particular, gathered information of the tracking device's WAN connectivity and/or communications may be evaluated by the tracking device to characterize WAN service as having prolonged out-of-network-service periods, rapid "ping-ponging" out-of-network-service periods (i.e., back and forth between in-service and out-of-network-service), and slow "ping-ponging" out-of-network-service periods. As the tracking device may experience beneficial and suboptimal consequences when executing the methods 500, 600, and 700 in the various network conditions, the tracking device may interchangeably execute the methods 500, 600, and 700 to measure WAN statistics in response to determined WAN conditions. For example, during WAN conditions characterized as having prolonged out-of-network-service periods, the execution of methods 500, 600, and 700 may each cause similar battery life conservation, and thus the tracking device may execute any. As another example, during WAN conditions characterized as having rapid out-of-network-service ping-ponging, the execution of either method 500 or method 700 may result in prematurely initiating power optimization mode, but may also result in faster WAN statistics measurements and better battery life conservation than the method 600. Therefore, the tracking device may execute the methods 500 and/or 600. As yet another example, during WAN conditions characterized as having slow out-of-network-service ping-ponging, the execution of method 600 or method 700 may result in better battery conservation and faster WAN statistics measurements than the method 500, but also may result in prematurely initiating power optimization mode. Therefore, the tracking device may execute the methods 600 and/or 700.

Figure 8:
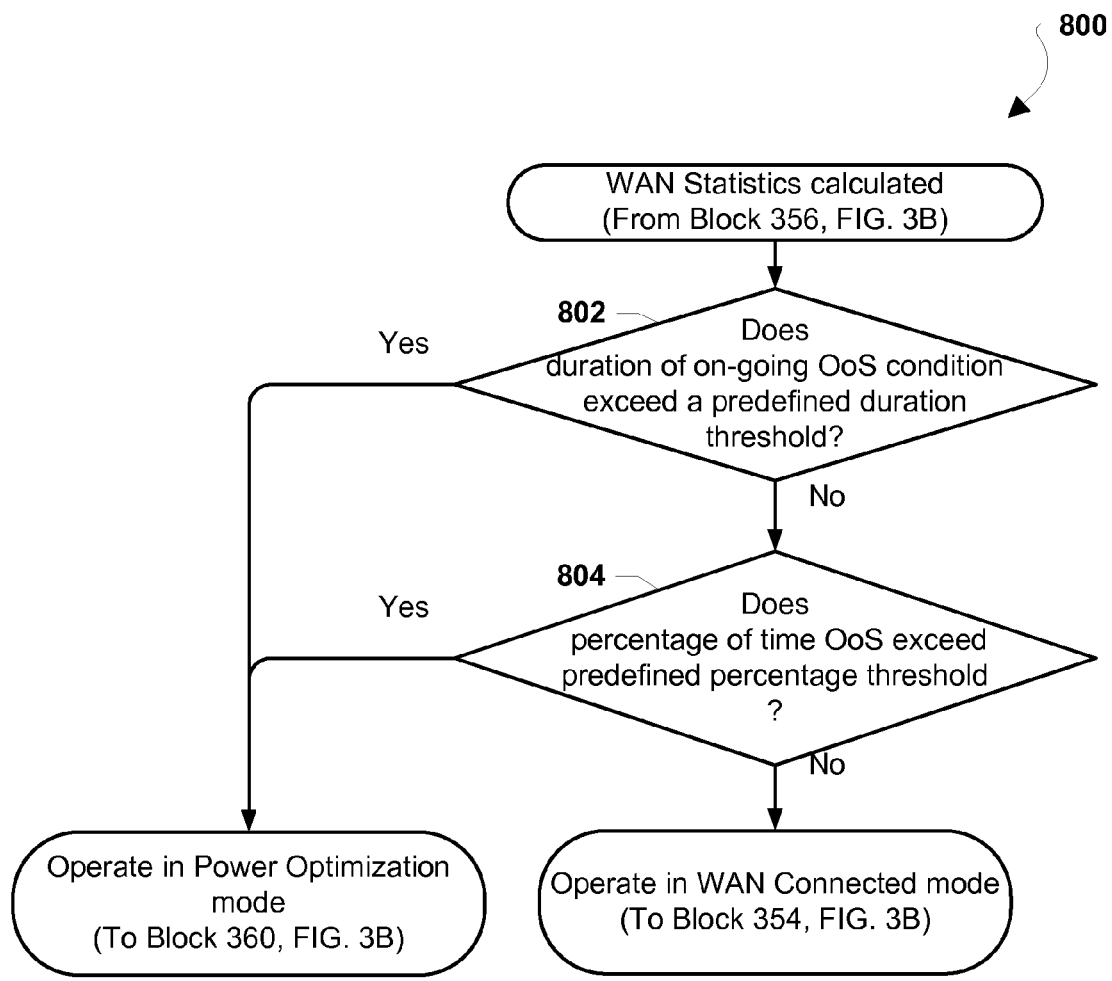
FIG. 8 is a process flow diagram illustrating an embodiment method for a tracking device determining whether to operate in a power optimization mode.

FIG. 8 illustrates an embodiment method 800 for a tracking device determining whether to operate in a power optimization mode. As described above, the tracking device may periodically gather information and generate WAN statistics based on the tracking device's communications with various communications networks. For example, the tracking device may generate WAN statistics describing how often within a period of time the tracking device was out-of-network-service for a particular cellular network. In particular, the tracking device may calculate OoSPercentage and currentOoSDuration values with the various methods 500, 600, and 700 described above with reference to FIGS. 5A, 6A, and 7A. For example, the tracking device may perform the method 600 to measure the percentage of time in a predefine evaluation period the tracking device is out-of-network-service (i.e., OoSPercentage) as well as the duration of an ongoing out-of-network-service condition (i.e., currentOoSDuration). Based on the WAN statistics, the tracking device may determine whether to be configured to operate in a higher power-consuming mode (i.e., WAN connected mode) or a power optimization mode (i.e., power optimization mode). In an embodiment, the method 800 may be performed by the tracking device in place of the operations in determination block 358 described above with reference to FIG. 3B.

In determination block 802 the tracking device may determine whether a duration of an on-going, out-of-network-service condition exceeds a predefined duration threshold. In other words, the tracking device may determine whether a calculated currentOoSDuration variable exceeds a duration threshold. For example, when the evaluation period concludes (e.g., a predefined duration elapsed as described above with reference to FIG. 6A), if the tracking device is in an out-of-network-service condition, the tracking device may compare the currentOoSDuration to the duration threshold. In an embodiment, the duration threshold value may be a number of seconds, such as sixty seconds. If the duration of the tracking device's ongoing out-of-network-service condition exceeds the duration threshold (i.e., determination block 802="Yes"), the tracking device may be configured to operate in power optimization mode.

If the duration of the tracking device's on-going out-of-service condition does not exceed the predefined duration threshold (i.e., determination block 802="No"), in determination block 804, the tracking device may determine whether a percentage of time the tracking device is out-of-network-service exceeds a predefined percentage threshold. In other words, the tracking device may determine whether it was out-of-network-service for more than a predefined percentage of time during an evaluation period. For example, the tracking device's measured OoSPercentage value may exceed the percentage threshold value when the OoSPercentage for the evaluation period is greater than 0.1. If the percentage of time out-of-network-service exceeds the predefined percentage threshold value (i.e., determination block 804="Yes"), the tracking device may be configured to operate in power optimization mode. For example, if the tracking device's OoSPercentage value is higher than a stored percentage threshold value, the tracking device may de-activate a long-range transceiver for a period of time. If the percentage of time out-of-network-service does not exceed the predefined percentage threshold value (i.e., determination block 804="No"), the tracking device may be configured to operate in WAN Connected mode. For example, the tracking device may activate or maintain activation of a long-range transceiver configured to exchange transmissions with a cellular network.

In an embodiment, the tracking device may calculate or otherwise define the duration threshold value and/or the percentage threshold value as a function of WAN out-of-network-service statistics, GPS environment (e.g., received GPS signal quality, position of GPS satellites in orbit above the tracking device, etc.), and a reachability cost function.

In various embodiments, the threshold values of the method 800 may be adjusted by the tracking device based on previous performances of the operations of method 800. For example, if the tracking device executes the operations of the method 800 several times over a particular period without changing operating modes (e.g., configuring to operate in power optimization mode from WAN Connected mode), the tracking device may lower or raise the various threshold values.

In another embodiment, the tracking device may also evaluate time-to-fix times for determining location via GPS coordinates during the evaluations the operations in method 800. The time-to-fix times may be defined as the amount of time the tracking device required to receive GPS coordinates from any GPS satellite. For example, the time-to-fix time may be a number of seconds (e.g., 90 seconds), minutes, or longer dependent upon the signal quality of received GPS signals from GPS satellites in orbit above the tracking device. In an embodiment, the tracking device may compare actual time-to-fix times to a time-to-fix threshold, and when the actual time-to-fix times exceed the threshold, the tracking device may dynamically adjust the percentage threshold and/or current out-of-network-service duration threshold to optimize the time spent in power optimization mode.

In another embodiment, the tracking device may record GPS fixes (e.g., coordinates) received from various GPS satellites while the tracking device is out-of-network-service and may store the GPS fixes for subsequent transmissions. For example, when the tracking device resumes cellular network service, the stored fixes gathered while the tracking device was out of WAN service may be transmitted via long-range transceiver to the cellular network.

Figure 9A:
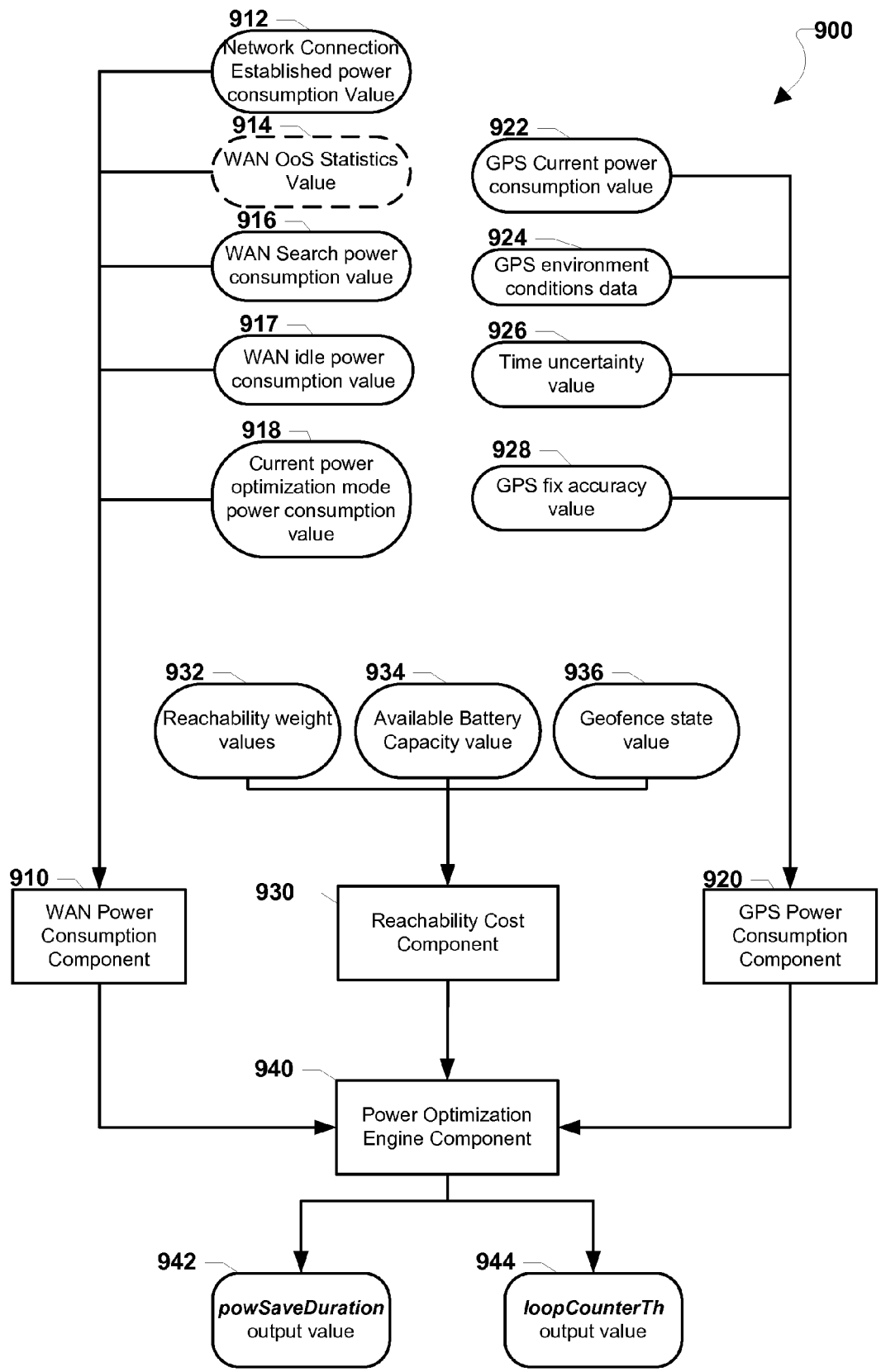
FIG. 9A is a component diagram illustrating embodiment tracking device components that utilize various input values to estimate information for use by a power optimization engine component to calculate a number of cycles and a duration for operating in a power save state.

FIG. 9A is a diagram 900 illustrating an embodiment tracking device's components that utilize various input values to estimate information for use in calculating a number of cycles and a duration for operating in a power save state. When in power optimization mode (e.g., the duration of an on-going out-of-network-service condition exceeds a predefined duration threshold and/or the percentage of time the tracking device experiences out-of-network-service conditions exceeds a predefined percentage threshold), the tracking device may operate in cycles of being in a power save state (e.g., a low power mode or "LPM") and an idle state. An illustration of an exemplary cycle is described below with reference to FIG. 9C. The tracking device may calculate the number of cycles to execute while operating in power optimization mode. In other words, the tracking device may calculate a loopCounterTh variable that stores a threshold value that a loop counter may not exceed. For example, for each cycle of operating in the power optimization mode, the tracking device may increment a loop counter and may cease operating in power optimization mode when the loop counter exceeds the value represented by the loopCounterTh variable. The tracking device may also calculate the duration for operating in the power save state. For example, for each cycle, the tracking device may operate in the power save state for a duration represented by a powSaveDuration variable.

A power optimization engine component 940 may calculate a first output value 942 stored in the powSaveDuration variable and a second output value 944 stored in the loopCounterTh variable. The output values 942, 944 may be calculated based on based on input information generated by a WAN power consumption component 910, a reachability cost component 930, and a GPS power consumption component 920.

The WAN power consumption component 910 may estimate the power consumption the tracking device may require to communicate via a wide area network, such as a cellular telephone network. In particular, the WAN power consumption component 910 may estimate power consumption information based on a network connection established power consumption value 912 that may be a fixed value corresponding to the power used to establish a network connection. For example, the network connection established power consumption value 912 may be based on a network connection established event that lasts for a few seconds (e.g., 2.25 seconds) and that has a power consumption of approximately 0.0435 mAh. In an embodiment, the WAN power consumption component 910 may also estimate power consumption information based on a WAN out-of-network-service statistics value 914, such as a current OoSPercentage, totalOoSDuration, and/or currentOoSDuration variables described above. The WAN power consumption component 910 may also estimate power consumption information based on a WAN search power consumption value 916 that may be a fixed value corresponding to the power used to search for available networks. For example, the WAN search power consumption value 916 may be approximately 69 mA. The WAN power consumption component 910 may also estimate power consumption information based on a WAN idle power consumption value 917 that may be a fixed value corresponding to the power used to idle with respect to WAN communications (e.g., operate in an idle state). For example, the WAN idle power consumption value 917 may be approximately 1.3 mA. The WAN power consumption component 910 may also estimate power consumption information based on a current power optimization mode power consumption value 918 that may corresponding to the power used to operate in a power save state (or low power mode). For example, the power optimization mode power consumption value 918 may be approximately 0.69 mA. In an embodiment, the power optimization mode power consumption value 918 may be estimated by the tracking device based on modem data. In an embodiment, the WAN power consumption component 910 may utilize all, a combination, or a weighted combination of the values 912-918 to estimate WAN power consumption information for use by the power optimization engine component 940. In an embodiment, the WAN power consumption component 910 may further utilize power consumption values corresponding to call manager events, such as an "off that may consume approximately 0.1 mAh.

The GPS power consumption component 920 may estimate the power consumption the tracking device may require when exchanging information via a GPS chip. In other words, the tracking device may estimate the power required to exchange and process GPS signals and generate location information. In particular, the GPS power consumption component 920 may estimate GPS power consumption information based on a GPS current power consumption value 922 that may be based on modem data. The GPS power consumption component 920 may also estimate GPS power consumption information based on GPS environment conditions data 924, such as information indicating whether GPS satellites are currently in orbit above the tracking device. The GPS power consumption component 920 may also estimate GPS power consumption information based on a time uncertainty value 926 that may be an indicator of timestamp availability. For example, the time uncertainty value 926 may indicate that time synchronism is lost during a period of the tracking device being out-of-network-service. The GPS power consumption component 920 may also estimate GPS power consumption information based on a GPS fix accuracy value 928 that may indicate a period of time required to acquire an accurate GPS fix (e.g., time-to-fix) from GPS satellites or alternatively an indicator of the accuracy of any GPS information received from current conditions. In an embodiment, the GPS power consumption component 920 may utilize all, a combination, or a weighted combination of the values 922-928 to estimate GPS power consumption information for use by the power optimization engine component 940.

The reachability cost component 930 may utilize information relevant to the reachability of the tracking device to estimate reachability cost information. Reachability cost information may include estimates of how long the tracking device may function given certain conditions, such as available power and the user's desired reachability for the tracking device over time. In various embodiments, the reachability cost component 930 may perform a function (e.g., a reachability cost function) or other equations to estimate reachability cost information. In particular, the reachability cost component 930 may estimate reachability cost information based on reachability weight values 932 that may be user-defined. For example, the user of the tracking device may store preference data that indicates the tracking device should be reachable for long periods of time. The reachability cost component 930 may also estimate reachability cost information based on an available battery capacity value 934 that may be a changing indication of the current battery service life remaining in the tracking device's battery. The reachability cost component 930 may also estimate reachability cost information based on a geofence state value 936 that may be a changing indicator of whether the tracking device is located within a predefined geofence. For example, the geofence state value 936 may be a positive indicator when the tracking device is within a known (or stored) geofence area and a negative indicator when outside of the known geofence area. In an embodiment, the reachability cost information estimated by the reachability cost component 930 may be packaged data, such as indicators, weights, equations, or variables, based on the values 932-936 and accessible by the power optimization engine component 940. In an embodiment, the reachability cost component 930 may utilize all, a combination, or a weighted combination of the values 932-936 to estimate reachability cost information for use by the power optimization engine component 940.

In an embodiment, the components illustrated in the diagram 900 may be software instructions, routines, operating threads, circuitry, modules, or any other component the tracking device may be configured to utilize. Additionally, the various components illustrated in the diagram 900 may be associated with or performed by the power optimization module 310 described above with reference to FIG. 3A. In another embodiment, the power optimization engine component 940 may utilize information from any or all of the other components 910, 920, 930 when calculating the powSaveDuration output value 942 and loopCounterTh output value 944. For example, the powSaveDuration output value 942 may be calculated based only on WAN power consumption information from the WAN power consumption component 910. The power optimization engine component 940 may utilize weights when evaluating the information from the various components 910, 920, 930. For example, the tracking device may base a powSaveDuration output value 942 more on GPS power consumption information than WAN power consumption information.

Figure 9B:
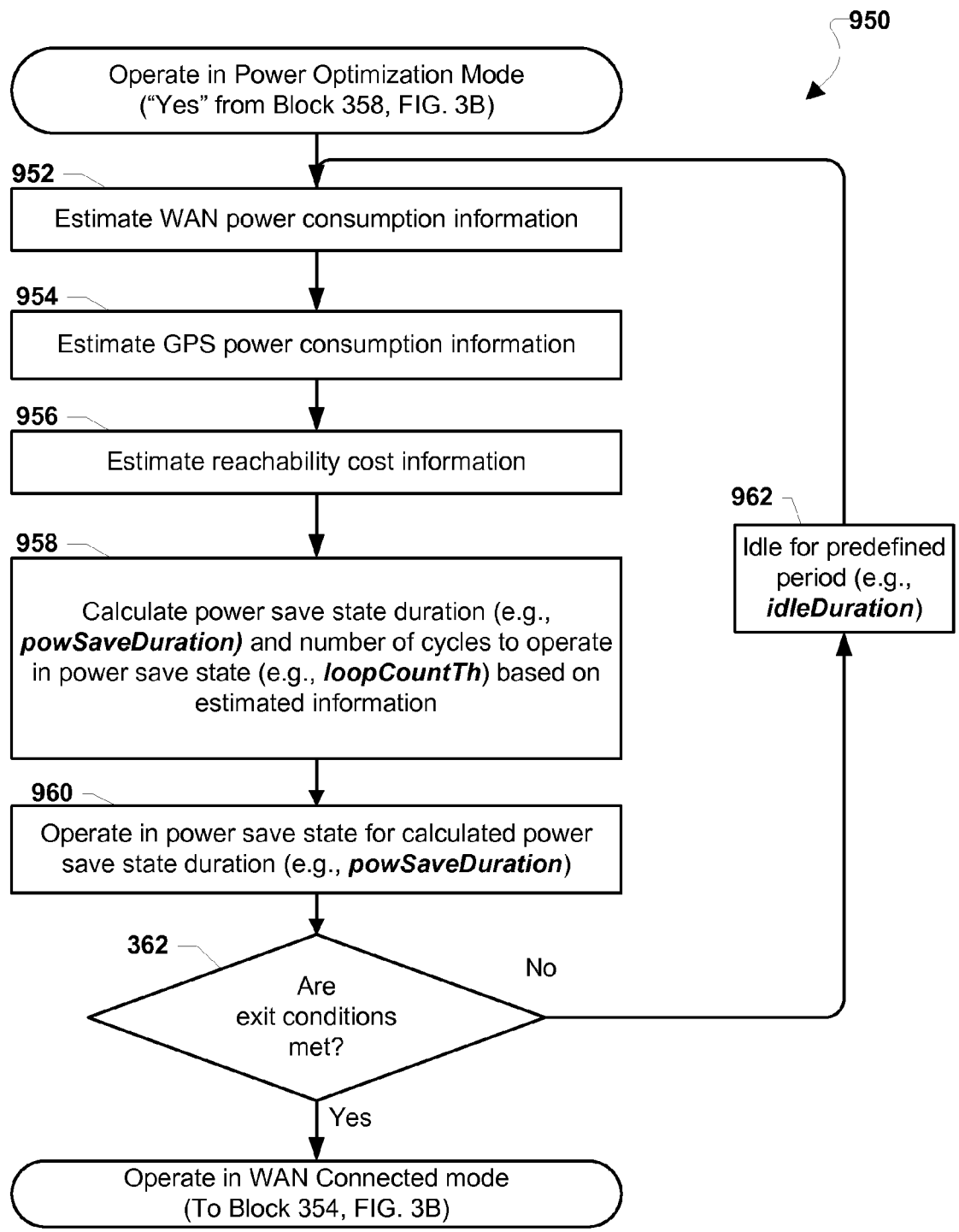
FIG. 9B is a process flow diagram illustrating an embodiment method performed by a tracking device while configured to operate in a power optimization mode.

FIG. 9B illustrates an embodiment method 950 performed by a tracking device while configured to operate in a power optimization mode. The method 950 may be performed by the tracking device in response to determining that generated or measured WAN statistics indicate that the tracking device is experiencing out-of-network-service conditions that exceed a threshold (i.e., determination block 358="Yes" from FIG. 3B). In other words, the tracking device may perform the method 950 when in power optimization mode. In an embodiment, the tracking device may utilize the components and information described above with reference to FIG. 9A when performing the various operations in the method 950.

In block 952, the tracking device may estimate WAN power consumption information. The tracking device may evaluate current WAN communications, such as WAN search signaling, to estimate or otherwise determine power consumption information and/or required battery use based on WAN conditions related to the tracking device. In an embodiment, the tracking device may utilize measured WAN statistics, such as OoSPercentage, to estimate WAN power consumption. The operations in block 952 are further described below with reference to FIG. 10A. In an embodiment, the operations in block 952 may be performed by the tracking device via a "WAN power consumption" component, module, software instructions, or circuitry, as described above with reference to FIG. 9A.

In block 954, the tracking device may estimate GPS power consumption information. The tracking device may evaluate current GPS signaling, such as signaling received from GPS satellites and processed by a on-board GPS chip, to estimate or otherwise determine power consumption information and/or required battery use based on GPS conditions related to the tracking device. The operations in block 954 are further described below with reference to FIG. 10B. In an embodiment, the operations in block 954 may be performed by the tracking device via a "GPS power consumption" component, module, software instructions, or circuitry, as described above with reference to FIG. 9A.

In block 956, the tracking device may estimate reachability cost information. The tracking device may evaluate current reachability settings, such as user settings indicating desired reachability of the tracking device over a period of time, to estimate or otherwise determine reachability cost information relevant to determining the number of cycles to perform and/or the duration of power save states in which the tracking device may operate during the power optimization mode. The operations in block 956 are further described below with reference to FIG. 10C. In an embodiment, the operations in block 956 may be performed by the tracking device via a "reachability cost" component, module, functions, software instructions, or circuitry, as described above with reference to FIG. 9A.

In block 958, the tracking device may calculate a power save state duration and a number of cycles to operate in the power save state based on estimated information, such as the estimated information from the operations in blocks 952-956. In other words, the tracking device may utilize the estimated WAN power consumption information, the estimated GPS power consumption information, and the estimated reachability cost information to calculate variables that define the period of time the tracking device may operate in the power save state for each cycle (i.e., powSaveDuration) and the threshold (or maximum) number of cycles (i.e., loopCounterTh) the tracking device may perform while in power optimization mode. In various embodiments, the tracking device may utilize a combination or a weighted combination of the various estimated information. For example, the tracking device may calculate the powSaveDuration value based on the estimated reachability cost information and the estimated WAN power consumption information, but not the estimated GPS power consumption information. As another example, the loopCounterTh value may be calculated based on all the estimated information (e.g., WAN power consumption information, GPS power consumption information, and reachability cost information), however the tracking device may emphasize the estimated reachability cost information more than the estimated WAN power consumption information when calculating the loopCounterTh variable.

In block 960, the tracking device may operate in the power save state for the calculated power save state duration. In other words, the tracking device may operate in the power save state for a period indicated by the powSaveDuration variable. As described above, the power save state may be a reduced or low power mode in which the tracking device is configured to refrain from utilizing substantial amounts of battery power (e.g., long-range transceiver communications may be limited or precluded). In determination block 362, the tracking device may determine whether the exit conditions are met. For example, the tracking device may determine whether it has operated in the power save state for a certain number of cycles, or alternatively stated, a number of cycles that exceeds the loopCounterTh threshold value. If the exit conditions are met (i.e., determination block 362="Yes"), the tracking device may be configured to operate in WAN Connected mode and continue with the operations in block 354 with reference to FIG. 3B. However, if the exit conditions are not met (i.e., determination block 362="No"), in block 962 the tracking device may idle for a predefined period. For example, the tracking device may operate in an idle state for a period of time indicated by an idleDuration variable. In an embodiment, the duration of the idling by the tracking device may be calculated during the operations of block 958 or alternatively may be a fixed duration stored within the tracking device. The tracking device may then continue with the operations in block 952.

Figure 9C:
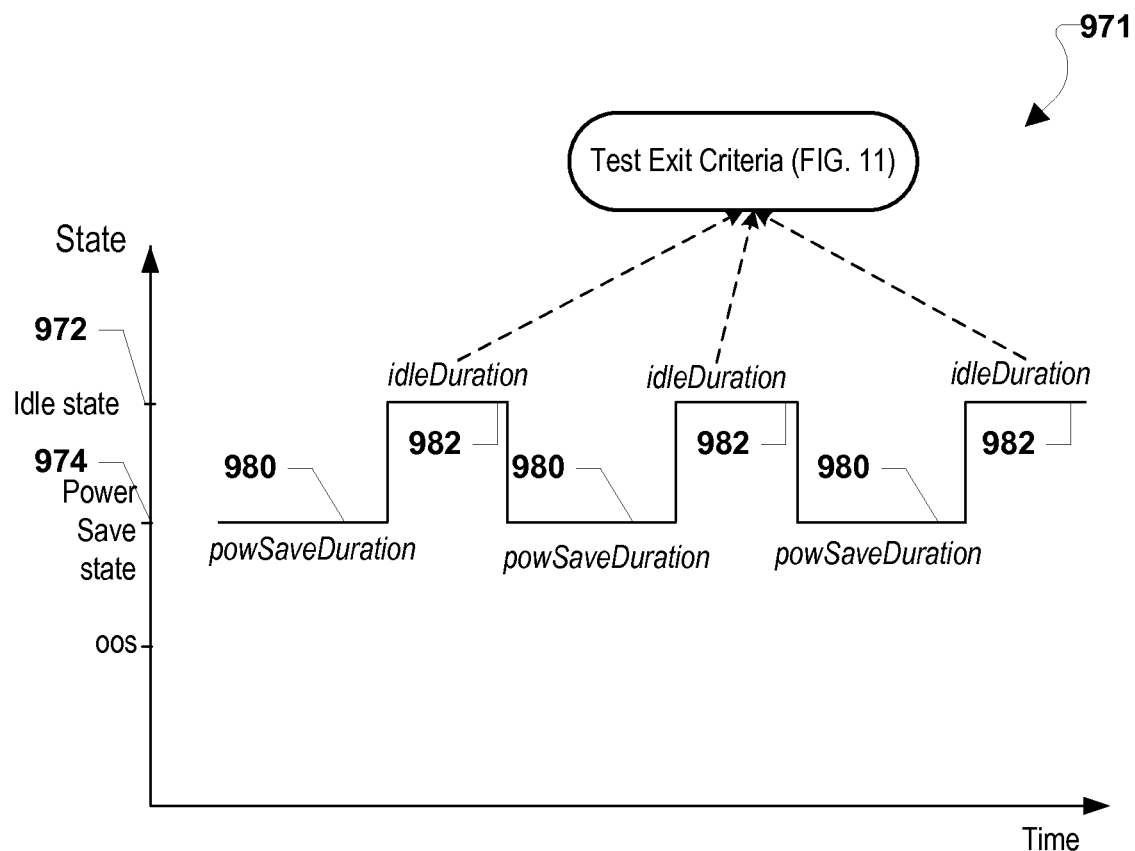
FIG. 9C is a diagram illustrating a tracking device modulating between various states when configured to operate in a power optimization mode.

FIG. 9C is a graph 971 showing an example of an embodiment tracking device modulating between various states when configured to operate in a power optimization mode. Once the tracking device is determined to be in an out-of-network-service condition based on the evaluations described above with reference to FIG. 8, the tracking device may be configured to operate in the power optimization mode that is comprised of cycles of operating in a power save state 974 and an idle state 972. In general, during the power save state 974, the tracking device may be configured to consume limited power. For example, when operating in the power save state 974, the tracking device may de-activate a cellular modem, a temperature-controlled crystal oscillator, turn off a demodulator, a modulator, a call manager, and/or various radio transceivers. As another example, the tracking device while operating in the power save state 974 may discontinue maintaining a WAN state (or state variable) as well as discontinue polling a SIM. When configured to operate in the idle state 972, the tracking device may evaluate exit conditions or criteria by performing the operations described above with reference to FIG. 11. For example, the tracking device may evaluate available battery service life during the idle state 972 of each cycle.

For the purpose of illustration: the graph 971 shows three cycles of the tracking device operating in the power save state 974 and the idle state 972. In other words, one cycle includes the tracking device operating in both the power save state 974 and idle state 972. For example, for the first cycle, the tracking device may operate in the power save state 974 for a predefined first period 980 represented by the variable powSaveDuration, and the tracking device may operate in the idle state 972 for a predefined second period 982 represented by the variable idleDuration. For the second cycle, the tracking device may operate in the power save state 974 for the first period 980 and the tracking device may operate in the idle state 972 for the second period 982. For the third cycle, the tracking device may operate in the power save state 974 for the first period 980 and the tracking device may operate in the idle state 972 for the second period 982. In an embodiment, the predefined periods 980 and 982 may elapse after a number of seconds (e.g., the idleDuration may represent the time value of approximately thirty seconds, the powSaveDuration may represent a time value of several seconds or minutes, etc.).

Figure 10A:
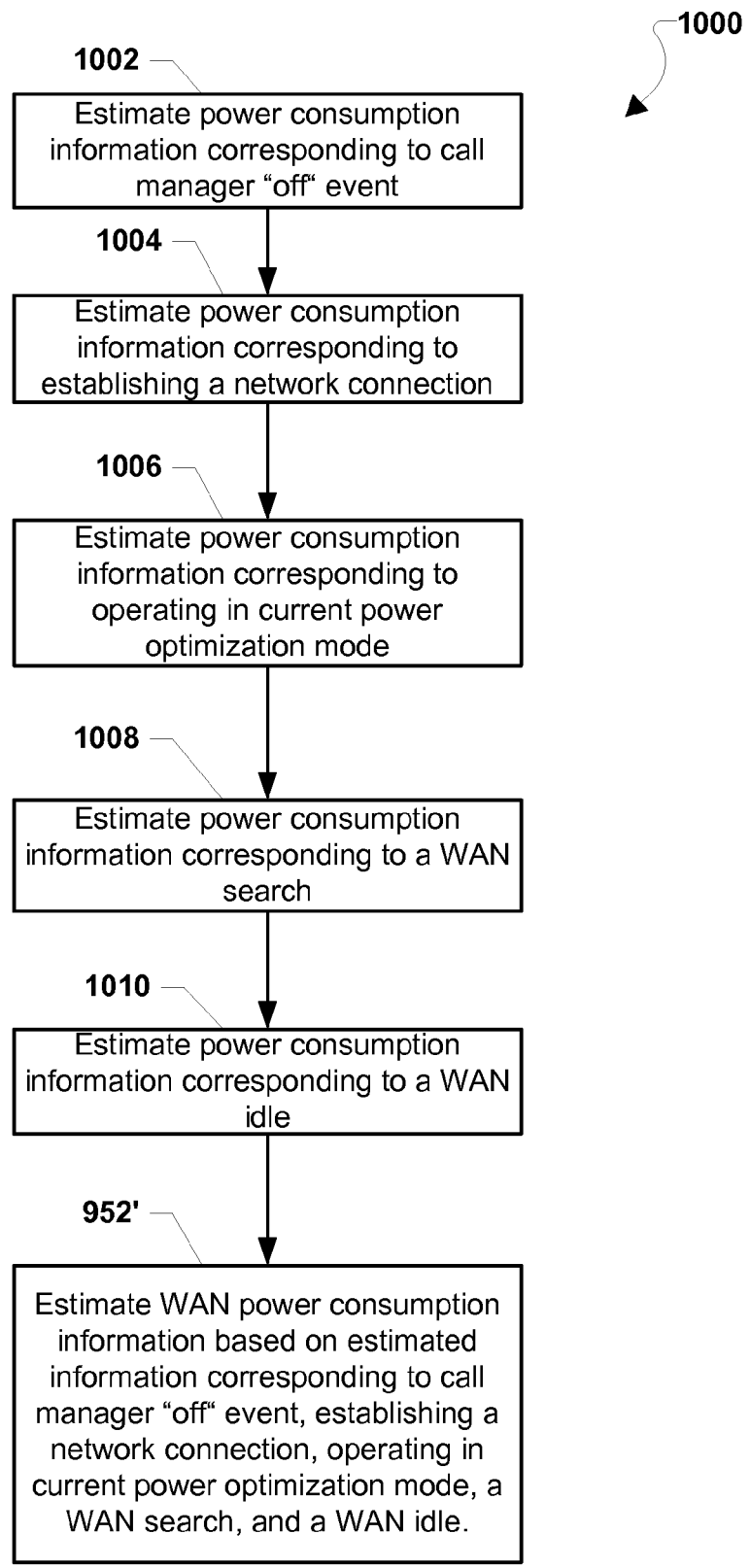
FIGS. 10A-10C are process flow diagrams illustrating embodiment methods for generating information used by a tracking device to calculate a number of cycles and a duration for operating in a power save state.
Figure 10B:
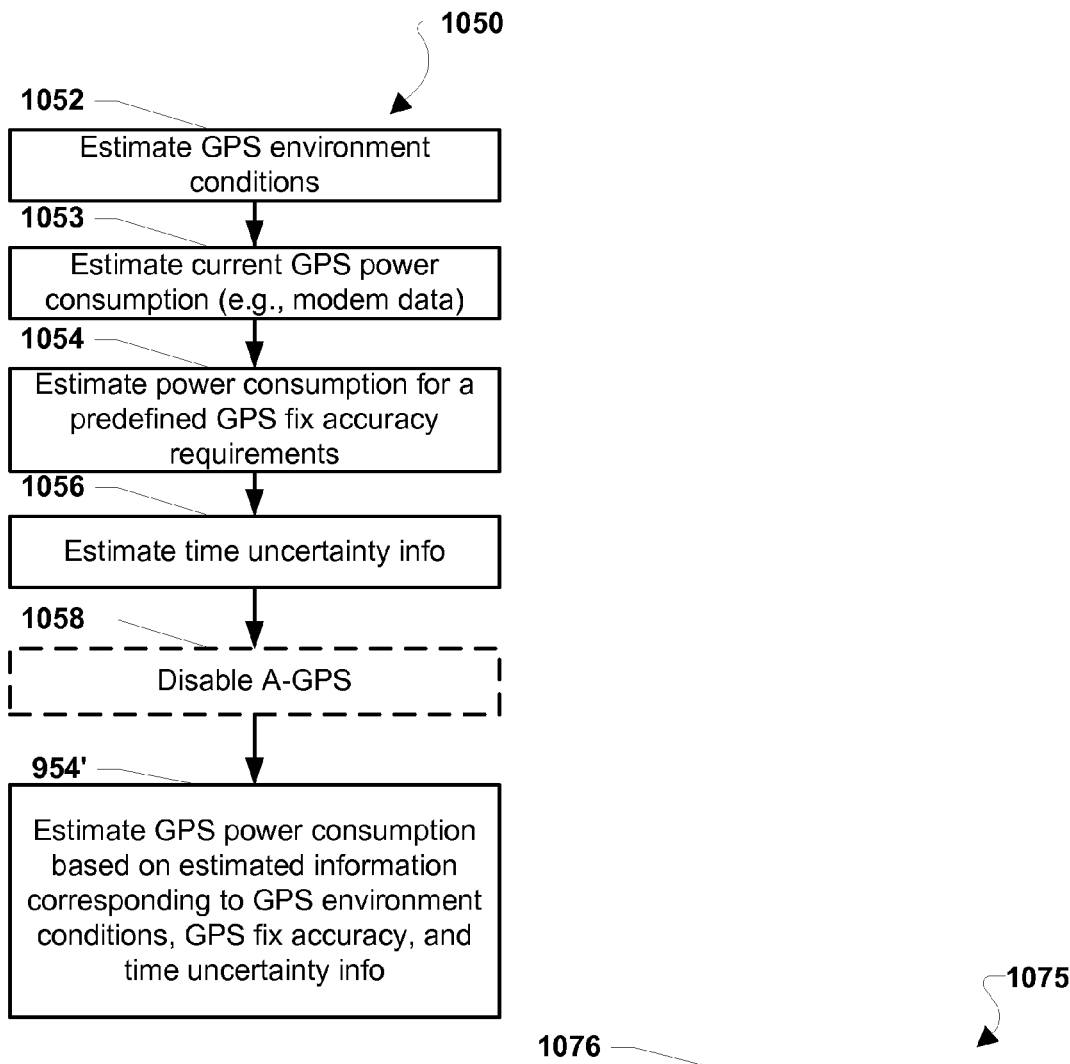
Figure 10C:
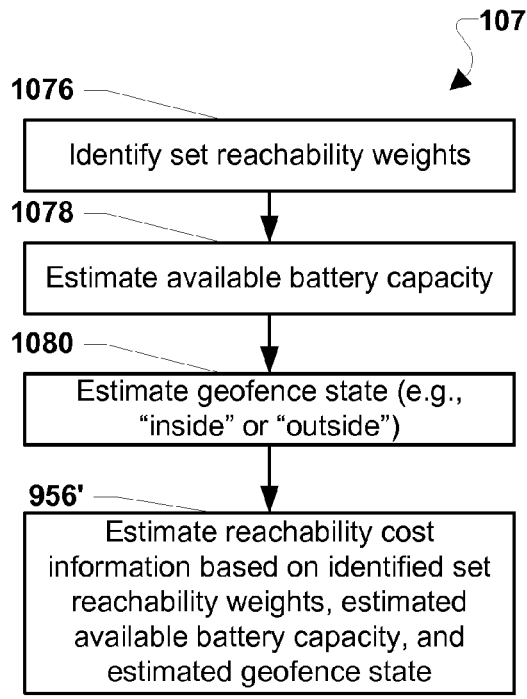

FIGS. 10A-10C illustrate embodiment methods 1000, 1050, 1075 for estimating information used by a tracking device to calculate a number of cycles and a duration for operating in a power save state. In an embodiment, the tracking device may perform the operations in the methods 1000, 1050, 1075 via components described above with reference to FIG. 9A. For example, the method 1000 may be performed by a WAN power consumption component, the method 1050 may be performed by a GPS power consumption component, and the method 1075 may be performed by a reachability cost component. In another embodiment, the methods 1000, 1050, 1075 may be performed by the tracking device to generate various values or power consumption information represented in FIG. 9B. For example, the tracking device may perform the method 1000 to generate the values 912-918 described above with reference to FIG. 9B.

FIG. 10A illustrates an embodiment method 1000 for a tracking device to estimate WAN power consumption. As described above, the tracking device may estimate the amount of power required to perform regular functions when communicating over a wide area network, such as a cellular network. For example, the tracking device may estimate future power needs based on previous use of long-range transceivers and/or current coverage conditions of proximate wide area networks. In an embodiment, the operations of the method 1000 may be performed by the tracking device in place of the operations of block 952 described above with reference to FIG. 9B.

In block 1002, the tracking device may estimate power consumption information corresponding to a call manager "off" event. For example, based on stored information, the tracking device may estimate the power consumption required to process a call manager "off" event may require approximately 0.1 mAh. In block 1004, the tracking device may estimate power consumption information corresponding to establishing a network connection. In an embodiment, establishing a network connection may include the tracking device processing a network connection established event that may require approximately 0.0435 mAh. In block 1006, the tracking device may estimate power consumption information corresponding to operating in the current power optimization mode. For example, the tracking device may determine the power requirements to operate in a power save state (and idle state). In an embodiment, the tracking device may estimate power consumption information based on stored data corresponding to previous operations in the power optimization mode. For example, the tracking device may evaluate historical information related to a previous period in which the tracking device operated in power optimization mode. In block 1008, the tracking device may estimate power consumption information corresponding to a WAN search. For example, the tracking device may determine that performing operations to search for available WAN signals may require approximately 69 mA. In an embodiment, the tracking device may further estimate power consumption information based on a projected number of times the tracking device may perform WAN searches within a certain period. In block 1010, the tracking device may estimate power consumption information corresponding to a WAN idle. For example, the tracking device may determine that performing idling operations may require approximately 1.3 mA. In an embodiment, the tracking device may further estimate power consumption information based on a projected number of times the tracking device may perform WAN idling within a certain period.

Similar to the operations in block 952 described above with reference to FIG. 9B, in block 952', the tracking device may estimate WAN power consumption information based on estimated information corresponding to call manager "off" event, establishing a network connection, operating in current power optimization mode, a WAN search, and a WAN idle. In other words, the tracking device may estimate total WAN power consumption and generate WAN power consumption information for use in calculating the duration for operating in the power save state (e.g., powSaveDuration) as well as for use in calculating the maximum number of cycles to operate in the power save state (e.g., loopCounterTh). In an embodiment, the tracking device may combine the estimated power consumption information from the operations in blocks 1002-1010 to estimate the overall WAN power consumption information. Alternatively, the tracking device may weight or otherwise emphasize the various estimated power consumption information from any of the operations in blocks 1002-1010.

FIG. 10B illustrates an embodiment method 1050 for a tracking device to estimate GPS power consumption. As described above, the tracking device may estimate the amount of power required to perform regular functions when using a GPS chip to determine a location of the tracking device. For example, the tracking device may estimate future power needs based on previous use of the GPS chip in processing signals received from GPS satellites. In general, operations performed by the tracking device to acquire location information, such as GPS coordinates and/or whether the tracking device is within/outside of a geofence, may drain a significant amount of power from the tracking device's battery. For example, obtaining A-GPS fixes may use significant amounts of battery service life, especially when the tracking device encounters false alarms (e.g., inaccurate determinations of relative position with reference to a geofence). In an embodiment, the operations of the method 1050 may be performed by the tracking device in place of the operations of block 954 described above with reference to FIG. 9B.

In block 1052, the tracking device may estimate GPS environment conditions, such as GPS satellite signal availability. In an embodiment, the tracking device may estimate the operational environment for utilizing its GPS chip and/or related circuitry based on time-to-fix information stored within the tracking device. For example, the tracking device may store information that indicates that time-to-fix for the tracking device may be between two seconds for an open-sky environment and 120 seconds for an indoor environment. In other words, the amount of time and thus power required to obtain a GPS fix may be greater when the tracking device is located within a structure or underground as opposed to when the tracking device is located outside with unobstructed access to GPS satellite signals.

In an embodiment, the tracking device may further utilize WAN connectivity information, such as the availability of a wireless wide area network and/or a wireless local area network and power consumption requirements related to communicating via a WAN or LAN, to estimate power consumption information corresponding to A-GPS fixes. For example, the tracking device may estimate a power requirement for exchanging signals with a remote device to obtain A-GPS fixes.

In block 1053, the tracking device may estimate current GPS power consumption. The current GPS power consumption may be estimated based on modem data. In block 1054, the tracking device may estimate the power consumption for a predefined GPS fix accuracy requirements, such as indicated by predefined parameters. For example, the tracking device may process received GPS signals to determine positioning accuracy indicated by a positioning application. In block 1056, the tracking device may estimate time uncertainty information. In particular, the tracking device may determine the availability of timestamp information from decoded GPS or WAN signals. In optional block 1058, the tracking device may disable A-GPS. For example, the tracking device may modify configurations and modules associated with the GPS chip to disable A-GPS communications. This may decrease power consumption as the tracking device may lose the WAN coverage.

Similar to the operations in block 954 described above with reference to FIG. 9B, in block 954' the tracking device may estimate GPS power consumption based on estimated information corresponding to GPS environment conditions, GPS fix accuracy requirements, and time uncertainty. In other words, the tracking device may estimate total GPS power consumption and generate GPS power consumption information for use in calculating the duration for operating in the power save state (e.g., powSaveDuration) as well as for use in calculating the maximum number of cycles to operate in the power save state (e.g., loopCounterTh). In an embodiment, the tracking device may combine the estimated power consumption information from the operations in blocks 1052-1056 to estimate the overall GPS power consumption information. Alternatively, the tracking device may weight (or place emphasis on) the various estimated power consumption information from the operations in blocks 1052-1056.

FIG. 10C illustrates an embodiment method 1075 for a tracking device to estimate reachability cost information. As described above, the tracking device may estimate the amount of power required (or power cost) to operate based on various reachability considerations. Reachability may be a function of estimated available battery capacity (e.g., 0% to 100%), estimated geofence states (e.g., "inside" or "outside"), and reachability weights that are set and stored within the tracking device (e.g., user configuration or profile data indicating a desired period of time for the tracking device to maintain reachability).

In block 1076, the tracking device may identify set reachability weights. In particular, the tracking device may store configuration data, preference information, or other data that are set via user inputs that indicate periods of time the user desires the tracking device to be available for providing location information. For example, the tracking device may store preference information that indicates the user desires the tracking device to be reachable only for a few minutes each hour in order to increase the overall time the tracking device may function on remaining battery power. In block 1078, the tracking device may estimate available battery capacity. The battery capacity may be an indication of the amount of battery service life remaining in the tracking device's battery, and may be a percentage, such as 90% remaining battery capacity. In an embodiment, the tracking device may utilize an operating system that regularly evaluates the available battery capacity and stores data describing the current remaining battery capacity. In block 1080, the tracking device may estimate a geofence state. In general, the tracking device may store geofence information (e.g., GPS coordinates defining a perimeter) that indicates known locations, areas, or places. For example, the tracking device may store geofence information that defines the area of a safe zone, such as the tracking device's owner's house, place of business, or hometown. Based on the known geofence areas, the tracking device may determine whether the tracking device is currently located outside of the geofence area. For example, the tracking device may compare the GPS coordinates of the tracking device's last measured location (e.g., GPS coordinates received via the tracking device's GPS chip) to the stored coordinates of a geofence area corresponding to an area known as the regular operating environment of the tracking device and/or the tracking device's user. When the tracking device is not within the geofence area, the geofence state may be estimated as "outside," and the geofence state may be "inside" when the tracking device is within a known geofence area. In various embodiments, the tracking device may store information related to multiple geofence areas and may estimate the geofence state based on comparisons of current location information to any or all of these multiple geofence areas. For example, the tracking device may store coordinates for several "safe zone" geofence areas. In another embodiment, the geofence may correspond to a particular cellular network site, such as the area around known cellular towers. In an embodiment, the geofence state may be an indicator of whether or not the tracking device is located within a city, a store, a house, a building, or any other area having a defined perimeter or area.

Similar to the operations in block 956 described above with reference to FIG. 9B, in block 956' the tracking device may estimate reachability cost information based on detected set reachability weights, estimated available battery capacity, and the estimated geofence state. In other words, the tracking device may estimate a reachability cost information for use in calculating the duration for operating in the power save state (e.g., powSaveDuration) as well as for use in calculating the maximum number of cycles to operate in the power save state (e.g., loopCounterTh).

In an embodiment, the tracking device may combine the detected and estimated information from the operations in blocks 1076-1080 to estimate the overall reachability cost information for the tracking device at a given period. Alternatively, the tracking device may weight or otherwise emphasize the various reachability cost information from any of the operations in blocks 1076-1080.

In various embodiments, the tracking device may calculate the powSaveDuration and the loopCounterTh variables to represent shorter or longer values based on whether the tracking device is within the geofence. For example, when the tracking device determines that its GPS coordinates are within the geofence, the tracking device may be more aggressive and may set a shorter powSaveDuration value. For illustration purposes, reachability cost information indicating an available battery capacity of 90% and a geofence state of "inside" (i.e., the tracking device is within a known geofence area) may be used by the tracking device to calculate a power save state duration (i.e., powSaveDuration) of five minutes and three cycles (i.e., the loopCounterTh may be calculated as three) as the maximum number of cycles to perform the power save state (and idle state). As another example, reachability cost information indicating an available battery capacity of 90% and a geofence state of "outside" (i.e., the tracking device is not within a known geofence area) may be used by the tracking device to calculate a power save state duration of three minutes and one cycle as the maximum number of cycles to perform the power save state (and idle state). As another example, reachability cost information indicating an available battery capacity of 30% and a geofence state of "outside" may be used by the tracking device to calculate a power save state duration of ten minutes and two cycles as the maximum number of cycles to perform the power save state (and idle state).

Figure 11:
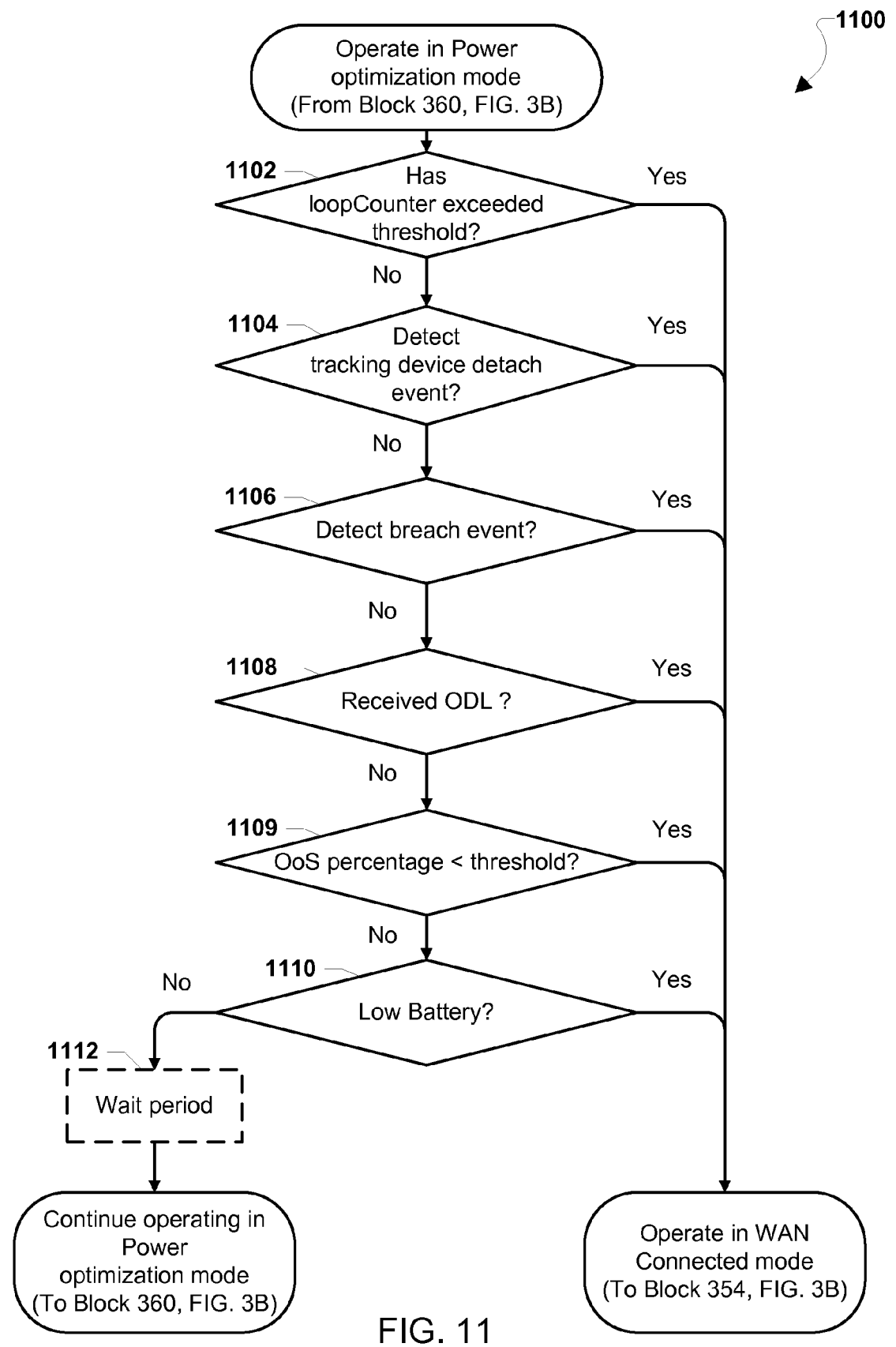
FIG. 11 is a process flow diagram illustrating an embodiment method for a tracking device determining whether to exit a power optimization mode.

FIG. 11 illustrates an embodiment method 1100 that may be implemented in a processor of a tracking device for determining whether to exit a power optimization mode. While operating in power optimization mode, the tracking device may periodically evaluate various conditions (or exit criteria) that indicate when the tracking device may exit the power optimization mode. For example, when the tracking device determines an internal battery has low power, the tracking device may exit the power optimization mode and enter WAN Connected mode, in which the long-range transceiver is activated. In the various embodiments, the tracking device may be configured to periodically perform the various evaluations of the exit criteria based on a predefined schedule, such as a clock timer managed by the tracking device.

When the tracking device is performing the operations in determination blocks 1102-1110, the tracking device may be configured to operate in an idle state of the power optimization mode, as described above. Alternatively, when configured to be in power optimization mode and not executing the operations in determination blocks 1102-1110, the tracking device may be configured to operate in a power save state, as described above. The WAN idle and power save states as applied to the exit criteria evaluations are described above with reference to FIG. 9C.

In an embodiment, the tracking device may utilize preference data, configuration information, and/or other input from a user that the tracking device may use to configure the periodicity of the performance of the method 1100 once configured to operate in power optimization mode. In other words, based on user data indicating the tracking device should maintain a certain period of reachability (e.g., the tracking device must not deplete the internal battery for a certain number of hours, days, weeks, months, etc.), available battery service life, WAN power consumption information, and/or GPS power consumption information, the tracking device may evaluate the exit criteria with a particular periodicity. For example, a business user may configure a tracking device on a piece of construction equipment to evaluate the exit criteria every few days while in power optimization mode to maintain short periods of reachability, prolonging the tracking device battery life. As another example, a parent user may configure a tracking device worn by a child or pet to evaluate the exit criteria every few seconds while in power optimization mode to maintain a longer immediate period of reachability. A user may tailor the periodicity of the exit criteria evaluations (and therefore the potential duration of the tracking device operates in power optimization mode) and may balance the amount of time the tracking device may have battery power in the future with the urgency with which the user intends to communicate with the tracking device outside of a predefined geofence area.

Returning to FIG. 11, the tracking device may evaluate various exit conditions, any of which may cause the tracking device to exit the power optimization mode when found to exist by the tracking device. Accordingly, in determination block 1102, the tracking device may determine whether a loop counter exceeds a predefined loop counter threshold. The tracking device may maintain the loop counter to track the number of cycles of the tracking device operating in save power and idle states while configured to operate in power optimization mode. For example, the tracking device may maintain a loop counter variable (e.g., loopCounter) that is incremented for every cycle of the tracking device operating in the power save state and idle state. As another example, the tracking device may store a loop counter threshold that indicates that the power optimization mode should be exited when the tracking device operates in a cycle of power and idle states more than three times. In an embodiment, the predefined loop counter threshold may be the loopCounterTh variable calculated with the method 950 described above with reference to FIG. 9B. In various embodiments, the power save and idle states may have various durations which may be based on previous periods of the tracking device operating in those states during the power optimization mode configuration.

If the loop counter exceeds the loop counter threshold (i.e., determination block 1102="Yes"), the tracking device may exit the power optimization mode and be configured to operate in the WAN Connected mode. However, if the loop counter does not exceed the loop counter threshold (i.e., determination block 1102="No"), in determination block 904 the tracking device may determine whether a tracking device detach event has been detected. As described below with reference to FIGS. 14A-14B, the tracking device may be configured to detect when the tracked device is removed, detached, disconnected, or otherwise dislocated from a tracked asset. For example, the tracking device attached to a collar may detect when the collar is removed from a tracked pet. If a detach event has been detected (i.e., determination block 1104="Yes"), the tracking device may exit the power optimization mode and be configured to operate in the WAN Connected mode.

If a detach event has not been detected (i.e., determination block 1104="No"), in determination block 1106 the tracking device may determine whether a breach event has been detected. Breach events occur when the tracking device leaves the safe zone defined by the beacon or the boundary of a geofence. For example, based on GPS coordinates determined by the GPS receiver, the tracking device may determine that a breach event occurred when it detects that tracking device is located outside of a particular geofence area. If a breach event is detected (i.e., determination block 1106="Yes"), the tracking device may exit the power optimization mode and begin operating in the WAN connected mode.

If no breach event is detected (i.e., determination block 1106="No"), in determination block 1108 the tracking device may determine whether an on-demand localization communication is received. If an on-demand localization communication is received (i.e., determination block 1108="Yes"), the tracking device may exit the power optimization mode and be configured to operate in the WAN Connected mode. In an embodiment, the tracking device may determine whether a cellular telephone communication is received in addition to or instead of an on-demand localization communication. In another embodiment, the tracking device may determine whether a "check-in" event is detected in addition to or instead of an on-demand localization communication. For example, the tracking device may execute a scheduling routine via the tracking device's operating system that indicates when particular communication should be made by the tracking device (e.g., check-in transmissions to a central server, an owner's smartphone, etc.).

If an on-demand localization communication is not received (i.e., determination block 1108="No"), the tracking device may determine whether an out-of-network-service percentage (e.g., OoSPercentage variable) is below a threshold. In other words, the tracking device may calculate a percentage of the time the tracking device is out-of-network-service while configured to operate in the idle state while in power optimization mode. If the percentage is less than a predefined threshold, the tracking device may exit the power optimization mode. For example, the tracking device may receive an out-of-network-service event while the tracking device is configured to operate in power optimization mode and may determine that the tracking device is experiencing out-of-network-service conditions for a percentage of time that is less than a predefined threshold value. In an embodiment, the tracking device may periodically activate the long-range transceiver while in an idle state to monitor for WAN service. If WAN service is available, the tracking device may exit the power optimization mode. If the out-of-network-service percentage is below a threshold is below the threshold (i.e., determination block 1109="Yes"), the tracking device may exit the power optimization mode and be configured to operate in the WAN Connected mode.

If the out-of-network-service percentage is not below a threshold is below the threshold (i.e., determination block 1109="No"), in determination block 1110 the tracking device may determine whether the tracking device's battery is low. In other words, the tracking device may determine whether the available service life or battery capacity of the tracking device's battery is below a predefined threshold. For example, the tracking device may determine whether the battery has a certain percentage of power remaining (e.g., less than a half, a quarter, a tenth, etc.). Alternatively, the tracking device may determine whether a low-battery message, flag, or other indicator has recently been generated by a battery observation module within the tracking device. For example, the tracking device may continuously run a battery observation routine via the tracking device's operating system executing on the processor that may set a system variable when the available battery power is less than the threshold value. If the battery is low (i.e., determination block 1110="Yes"), the tracking device may exit the power optimization mode and be configured to operate in the WAN Connected mode. However, if the battery is not low (i.e., determination block 1110="No"), in optional block 1112 the tracking device may wait for a period of time before continuing to operate in power optimization mode.

In an embodiment, the tracking device may be configured to operate in the power save state during the operations in optional block 1112. For example, when the tracking device is not evaluating the exit conditions or criteria with the operations in determination blocks 1102-1110, the tracking device may be configured to operate in the power save state.

In an embodiment, the tracking device may be configured to exit the power optimization mode when the tracking device is de-activated. For example, when a user turns off the tracking device, the tracking device may exit the power optimization mode and subsequently de-activate. In various embodiments, the tracking device may perform a graceful shutdown or alternatively an immediate de-activation, in either event the tracking device may no longer operate in the power optimization mode.

Figure 12:
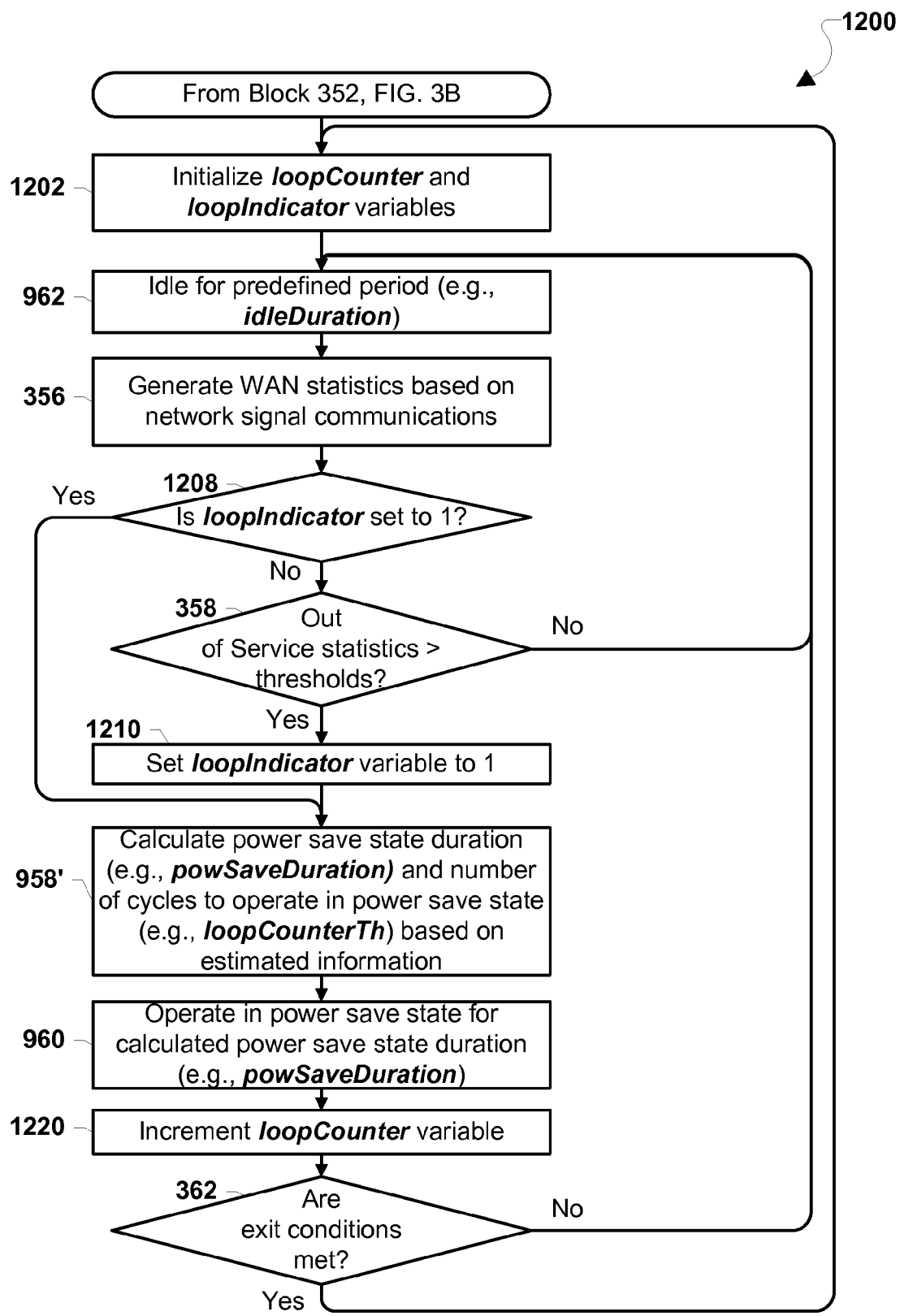
FIG. 12 is a process flow diagram illustrating an embodiment method for a tracking device executing a power optimization algorithm.

FIG. 12 illustrates an embodiment method 1200 for a tracking device executing a power optimization algorithm. Similar to the operations in blocks 354-362 of method 350 as described above with reference to FIG. 3B, the method 1200 may be performed by the tracking device when experiencing out-of-network-service conditions to maintain power and reachability via a wide area network. For example, based on the operations of the method 1200, the tracking device may be configured to cycle in between power-conserving and power-consuming operating modes. FIG. 12 includes references to individual variables the tracking device may utilize during the execution of the optimization algorithm with the method 1200. For example, the tracking device may store a loopIndicator variable for indicating when the tracking device has determined an out-of-network-service condition. In particular, the method 1200 may utilize the variables powSaveDuration and loopCounterTh that defines the amount of time and maximum number of cycles the tracking device may operate in the power save state when configured to be in power optimization mode (e.g., operate with limited power consumption, de-activated components, minimal communications actions, etc.). As described above, the powSaveDuration and loopCounterTh values may be modified by the tracking device based on many factors, including recently evaluated current WAN conditions (e.g., fast ping-ponging, etc.), the power consumption of various tracking device components (e.g., the amount of power required by the GPS chip to gather coordinate fixes, etc.), and the intended reachability of the tracking device (e.g., user configuration files may indicate the tracking device should conserve power to stay operational for a number of days, weeks, months, etc.).

In block 1202, the tracking device may initialize a loopCounter variable and a loopIndicator variable. For example, the loopCounter and loopIndicator variables may be set to zero. The loopCounter variable may be a representation of the number of cycles in which the tracking device has operated in a power save state. The loopIndicator variable may be a flag, semaphore, or other indicator that the tracking device is configured to operate in a power optimization mode. In an embodiment, the tracking device may perform the operations in block 1202 based on a determination that entry conditions exist, as describe above with reference to FIG. 3B.

In block 962, the tracking device may idle for a predefined period. In other words, the tracking device may be configured to operate in an idle state for the predefined period. In an embodiment, the tracking device operating in the idle state for the predefined period may be similar to the operations in optional block 359 with reference to FIG. 3B. For example, the tracking device may utilize a refresh mechanism to cause the tracking device to wait before measuring WAN statistics with the method 1200. In an embodiment, the tracking device may not idle for the predefined period on an initial execution of the operations of the method 1200. For example, after determining that entry conditions have been met, the tracking device may not enter the idle state until WAN statistics have been measured at least one time. In an embodiment, the tracking device may be configured to operate in the idle state for a period of seconds (e.g., thirty seconds) represented by an idleDuration variable, as described above.

In block 356, the tracking device may generate WAN statistics based on network signal communications. During the operations of block 356, the tracking device may determine values for the variables OoSPercentage and currentOoSDuration, as described above. For example, the tracking device may execute the method 600 to generate OoSPercentage and currentOoSDuration values.

In determination block 1208, the tracking device may determine whether the loopIndicator variable is set to '1' (i.e., a non-zero value). If the loopIndicator is not set to '1' (i.e., determination block 1208="No"), in determination block 358 the tracking device may determine whether out-of-network-service statistics exceed a predefined out-of-network-service threshold. For example, the tracking device may compare WAN statistics variables OoSPercentage and currentOoSDuration to respective threshold values, as discussed above regarding the operations of method 800. If the out-of-network-service statistics are evaluated to not be more than the respective threshold values (i.e., determination block 358="No"), the tracking device may continue with the operations in block 962. In other words, the tracking device may operate in WAN Connected mode. In an embodiment, the tracking device may execute in an idle state for a predefined period (e.g., wait for a refresh period). However, if the out-of-network-service statistics are evaluated to be more than the respective threshold values (i.e., determination block 358="Yes"), in block 1210 the tracking device may set the loopIndicator variable to a non-zero value. For example, the loopIndicator may be set to '1', indicating the tracking device may be configured to operate in power optimization mode.

If the loopIndicator is set to '1' (i.e., determination block 1208="Yes"), or the loopIndicator variable is set to '1' in the operations in block 1210, the tracking device may operate in power optimization mode. Accordingly, in determination block 958' the tracking device may calculate a power save state duration (i.e., the variable powSaveDuration) and the maximum number of cycles to operate in the power save state (i.e., the variable loopCounterTh) based on estimated information. In other words, the tracking device may perform operations to calculate the powSaveDuration variable and the loopCounterTh variable based on estimated values, such as estimated GPS power consumption values, estimated WAN power consumption values, and reachability cost information, as described above with reference to FIGS. 9A-9B. In block 960, the tracking device may operate in the power save state for the calculated power save state duration, for instance the duration indicated in the powSaveDuration variable. In block 1220, the tracking device may increment the loopCounter variable. For example, the loopCounter may increase the value represented by the loopCounter variable by one. In determination block 362, as described above, the tracking device may determine whether exit criteria conditions are met. For example, the tracking device may compare the current value of the loopCounter variable to a threshold variable, such as the loopCounterTh variable, to determine whether the tracking device has operated in power save and idle states for a predefined number of cycles. If exit criteria conditions are met (i.e., determination block 362="Yes"), the tracking device may continue with the operations in block 1202. For example, the tracking device may exit the power optimization mode, operate in WAN Connected mode, and reset the values for the loopCounter and loopIndicator variables.

However, if exit criteria conditions are not met (i.e., determination block 362="Yes"), the tracking device may continue with the operations in block 962. For example, the tracking device may operate in the idle state. In an embodiment, the tracking device may be configured to operate in the idle state while the tracking device evaluates the exit criteria with the operations in determination block 362. For example, the tracking device may operate in the idle state, evaluate the exit criteria, and continue to operate in the idle state.

Figure 13A:
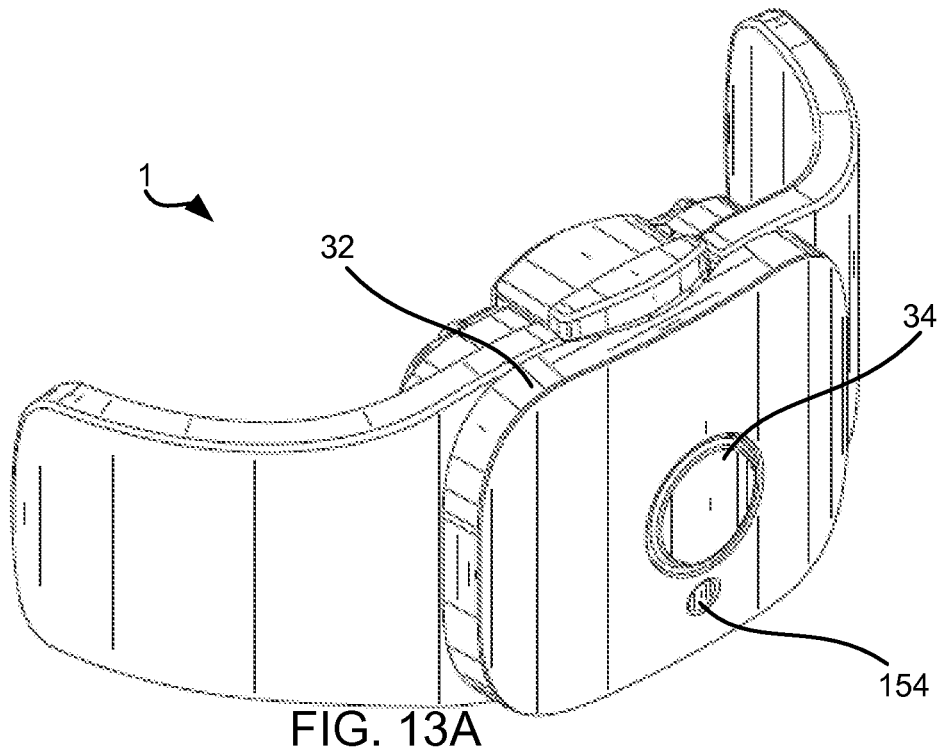
FIG. 13A is a perspective view of a tracking device according to an embodiment.
Figure 13B:
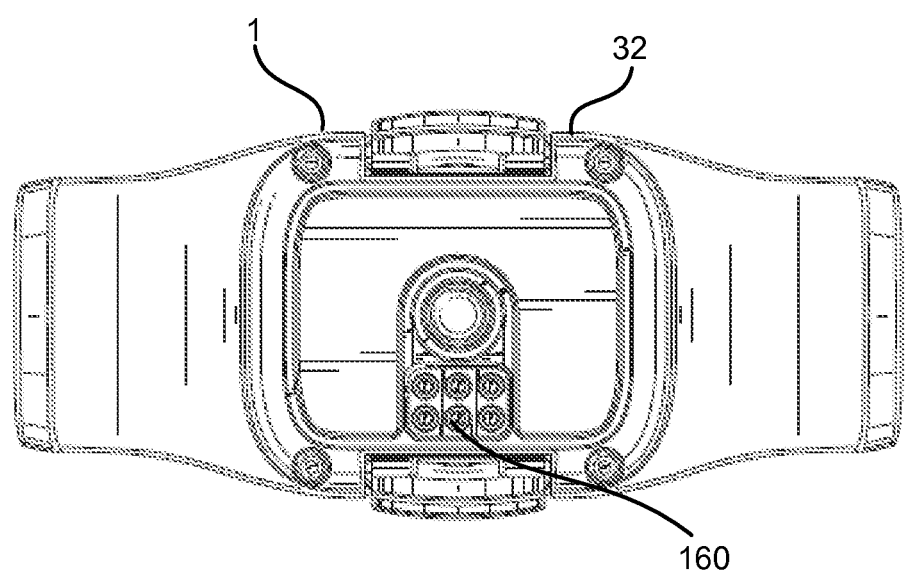
FIG. 13B is a bottom view of the embodiment tracking device illustrated in FIG. 11A.

FIGS. 13A and 13B illustrate a tracking device 1 in the form of a dog collar or bracelet according to an embodiment. FIG. 13A is a perspective view of the tracking device 1 while FIG. 13B illustrates the bottom of the tracking device 1. The tracking device 1 includes a user input mechanism 34 and an indicator 154. The user input mechanism 34 may be, for example, a push button, a miniature keypad or another type of switch whose actuation may be sensed by a processor of the device. For additional security, the user input mechanism may be a keypad for entering a security code, such as a personal identification number (PIN). Alternatively, the user input mechanism 34 may be a transceiver configured to detect a radio frequency identification (RFID) tag or chip. For example, the RFID tag or chip may be located inside a leash close to where it attaches to a collar. In this example, when the lease is attached to the collar, the RFID tag or chip is close enough in proximity to the tracking device 1 to activate the user input mechanism 34 that triggers a processor of the tracking device to enter an operating mode, such as a safe-zone operating mode (e.g., base low-power mode or portable low-power mode).

The indicator 154 may inform the user of numerous states/modes relevant to the tracking device 1, such as tracking device 1 activation state (e.g., on/off/sleep, etc.), that a breach event has occurred, and that an alarm message is being/has been transmitted. The indicator 154 may produce a visual or audible indication or combination thereof. For example, the indicator may include one or more light emitting diodes (LEDs). A first LED may indicate that the tracking device has been activated, while a second LED may indicate that the tracking device 1 is in portable low-power mode. Alternatively, the indicator 154 may be a speaker that emits one or more beeps. In an embodiment, the tracking device 1 may include multiple indicators 154, including speakers, LED lights, and display screens.

The tracking device 1 also includes a housing 32 that houses the electronics of the device, including but not limited to, a transceiver, a processor, a memory, and a battery as described in more detail below. The housing 32 may be waterproof and shock resistant to protect the electronics from the environment. The housing 32 is configured so that the electronics can be serviced, such that worn or damaged parts may be replaced or repaired. Also shown in FIG. 13B are sockets 160 configured to receive pins from a charging station. In this manner, the internal battery may be recharged by connecting it to a charging station, which may also enclose the RF beacon transmitter. The sockets 160 may also be configured to enable a user to configure operating parameters of the tracking device through connections with a computer or other form of user interface, such as to set the time or durations of the first and second timers. As described below, in an alternative embodiment, the tracking device includes an inductive coil for recharging. In this embodiment, the sockets 160 may be omitted.

Figure 14A:
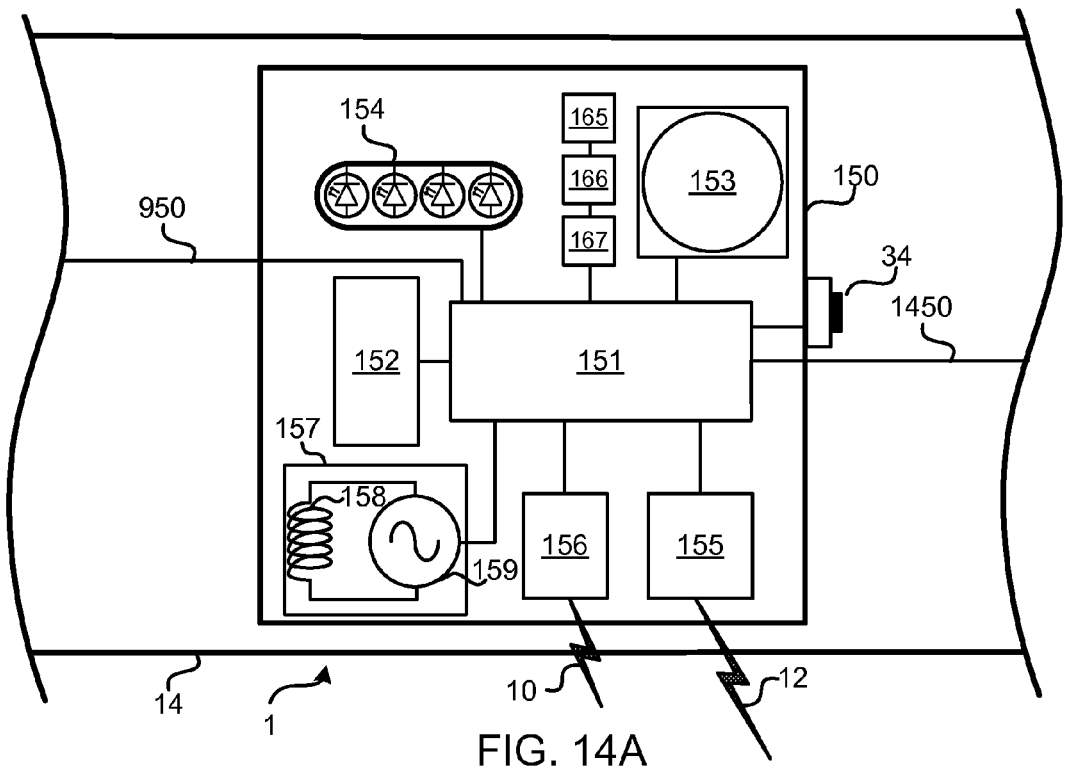
FIGS. 14A and 14B are component block diagrams of alternative embodiments of a tracking device with alternative components for recharging the tracking device with power.
Figure 14B:
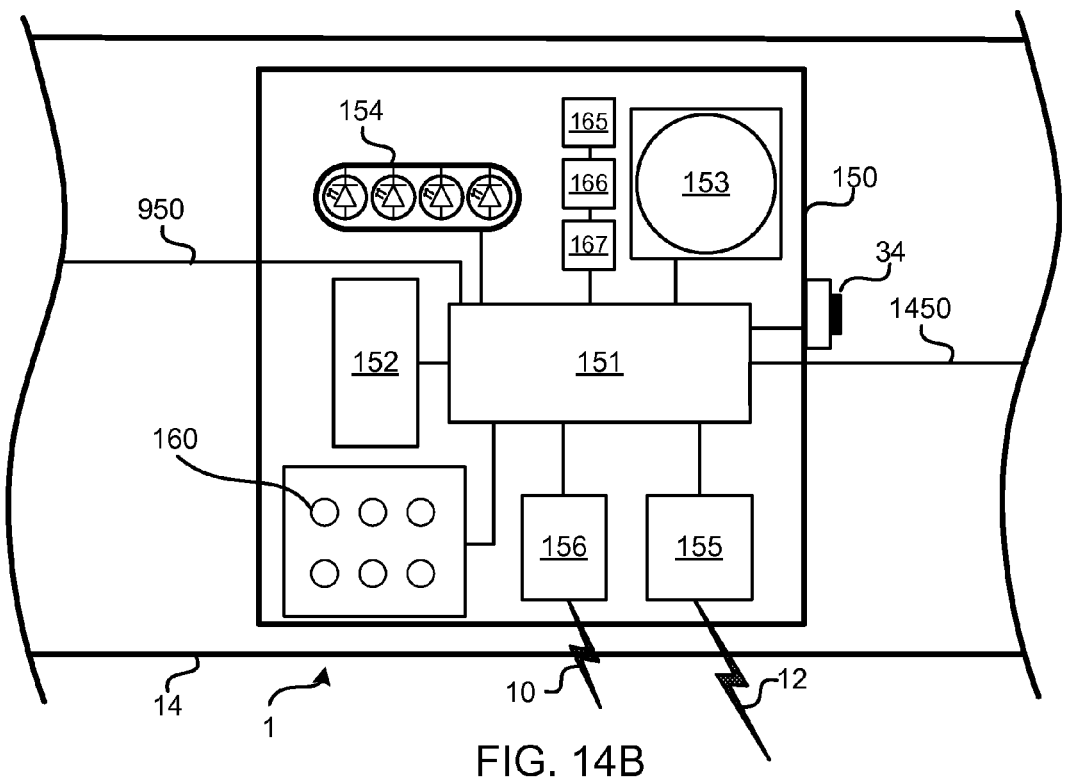

Example embodiments of tracking devices 1 are illustrated in FIGS. 14A and 14B. In the various embodiments, the tracking device 1 may include a tracking circuitry 150 that is sealed within a housing 32. The housing 32 may made of any suitable material such as plastic, rubber, stainless steel, etc. The tracking circuitry 150 may include a processor 151 coupled to memory 152 and a power source, such as a battery 153. In an embodiment, the tracking circuitry 150 may also include one or more light emitting diodes (LEDs) 154 that may be used to communicate operational status information. A long-range transceiver 155 or high-power radio, such as a cellular data transceiver, may be coupled to the processor 151 and configured to establish a data link 10 with a long-range wireless network, such as a cellular data network 4. A short range radio transceiver 156 is also coupled to the processor 151 and configured to receive communication signals from RF beacons.

The tracking circuitry 150 may also include a user input mechanism 34 coupled to the processor 151, such as a button, small keypad or a switch. The processor 151 may be configured with processor-executable instructions to receive user inputs from the input mechanism and interpret the inputs (e.g., button press, entry of a PIN number, movement of a switch, etc.) as control inputs, such as a user input indicative of expected departure of the tracking device from a safe-zone. In an embodiment, the user input mechanism 34 may be an RFID tag or chip that can receive an RFID query signal.

The tracking circuitry 150 may also include an induction charging circuit element 157 so that the battery 153 may be recharged by placing the tracking device 1 in close proximity to an induction charging system. This embodiment enables the asset tracking device to be hermetically sealed. Such an induction charging circuit element 157 may include an induction coil 158 coupled to a rectifier circuit 159. When an alternating magnetic field is applied to the coil 158, alternating electrical currents are induced in the coil and are rectified by the rectifier circuit 159 to output a charging voltage. The charging voltage may be regulated by the processor 151 and used to charge the battery 153. In an alternative embodiment illustrated in FIG. 14B, the induction charging circuit element 157 is replaced with electrical sockets 160 that are configured to accept pins to establish electrical connections with a charging station.

In an embodiment, the long-range transceiver 155 (or high-power radio) may be a cellular data network transceiver. In another embodiment, the long-range transceiver 155 may be configured to communicate with either or both wireless local-area networks (e.g., WiFi) and cellular telephone wireless wide-area networks. In another embodiment, the tracking device 1 may include both a long-range transceiver 155 and a cellular telephone transceiver, which is not shown separately but may be represented in a similar manner in a component block diagram.

In addition to the processor 151, memory 152, and transceivers 155, 156, the tracking device 1 may include a mechanism for reliably determining when it is removed from an asset 9. A variety of removal detection mechanisms may be used.

In an example embodiment illustrated in FIG. 14A, a conductor 1450 is provided that extends completely around the asset 9 (e.g., a wire embedded in a dog collar) and connects to two inputs of the processor 151. In this embodiment, the processor 151 may detect when the conductor 1450 is severed, as may be required to remove the tracking device 1 from the asset. For example, as illustrated in FIG. 14A, the processor 151 may apply a positive voltage to one end of the conductor 1450 coupled to the processor 151 as an output and test the voltage of the other end that is connected as an input to the processor 151. If the input voltage from the conductor 1450 falls to near zero, this indicates that the conductor 1450 has been severed as occurs when the tracking device 1 is removed from an asset 9. Such a conductor 1450 may be in the form of a wire, a conductive trace, or a conductive ribbon that extends around a portion of the asset 9. For example, the conductor 1450 may be in the form of a conductive trace within a dog collar that connects to the tracking device 1 in a manner that provides both an electrical connection on either end to the processor 151 and a physical strap that holds the tracking device 1 around the dog's neck.

In an embodiment, the tracking device may include various sensor units that may be connected to the processor 151 and memory 152 and configured to measure biometric and/or environmental attributes. For example, the tracking device may include sensors configured to measure physical accelerations, gravity indicators, or any other metrics of physical motion, such as an accelerometer 165 and a gyroscope 166. In another embodiment, the tracking device may also include physiological measurement units, such as a body temperature sensor 167, as well as devices configured to determine positional information (e.g., GPS coordinates) based on satellite communications.

In the various devices, the processor 151 used in a tracking device 1 may be any programmable microprocessor, microcomputer, or multiple processor chip or chips that may be configured by software instructions to perform a variety of operations, including the operations of the various embodiments described above. In an embodiment, the tracking device 1 may execute an operating system. In an embodiment, the processor 151 may be a part of one of the internal radios, such as the processor within a cellular network transceiver. Typically, software instructions may be stored in the internal memory 152 before they are accessed and loaded into the processor 151. In some devices, the processor 151 may include internal memory 152 sufficient to store the software instructions. Memory within the processor 151 or internal memory 152 may also be used to store bits or other logical values for tracking operating modes of the device, such as in a control register that may store operating mode bits and/or flags. For the purposes of this description, the term "memory" refers to all memory accessible by the processor 151, including connected memory 152 and memory within the processor 151 itself. In many devices, the memory 152 may be a volatile or nonvolatile memory, such as flash memory, or a mixture of both.

Figure 15:
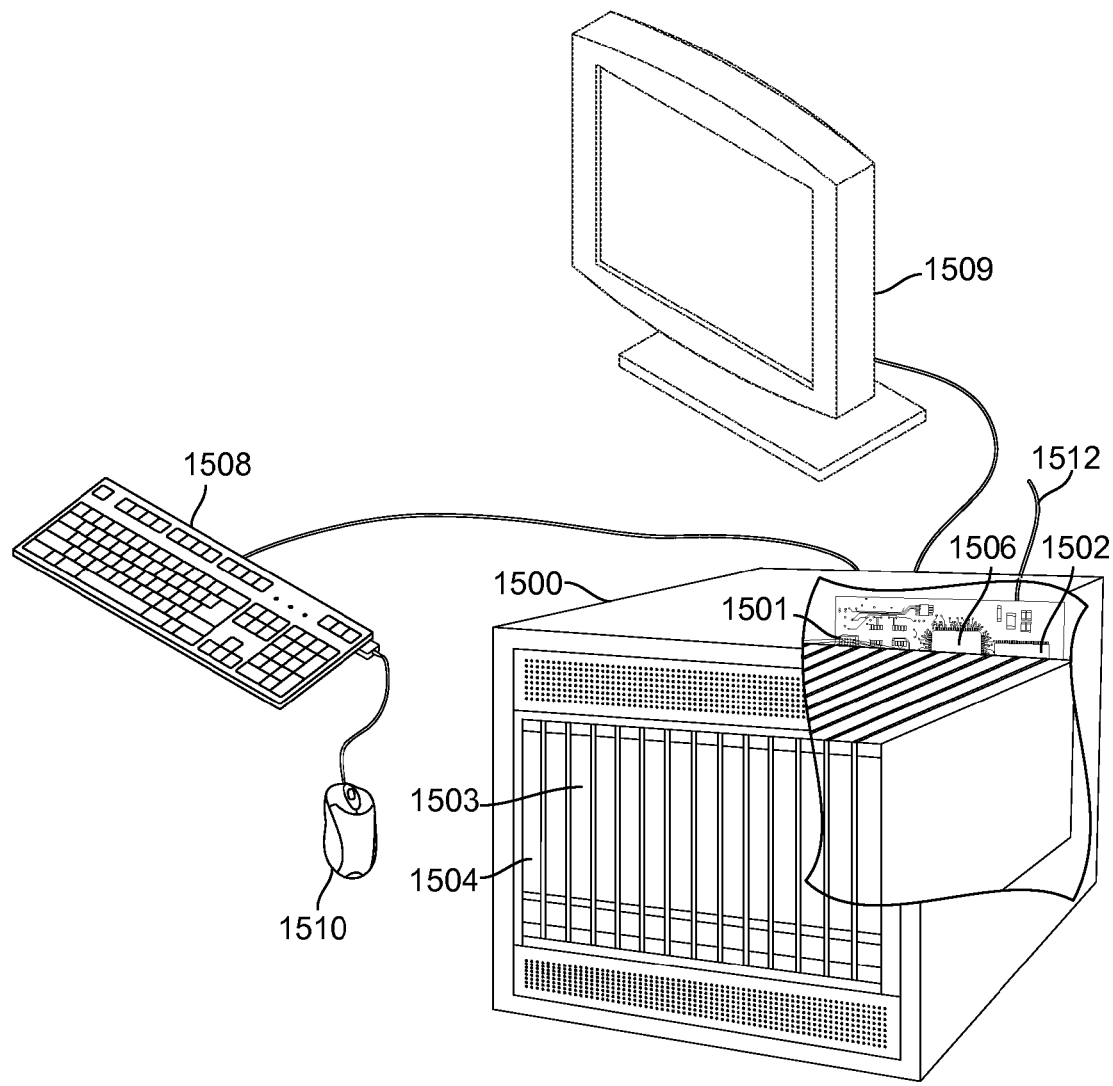
FIG. 15 is a component block diagram of a central server that may be used with the embodiments of the system.

FIG. 15 illustrates an embodiment of a central server that may be used with the embodiments discussed above. A central server 1500 typically includes a processor 1501 coupled to volatile memory 1502 and a large capacity nonvolatile memory, such as a disk drive 1503. The server 1500 may also include a floppy disc drive, compact disc (CD) or DVD disc drive 1504 coupled to the processor 1501. The server 1500 may also include network access ports 1506 coupled to the processor 1501 for establishing data connections with a network 1512, such as a local area network coupled to other broadcast system computers and servers. Servers 1500 may also include operator interfaces, such as a keyboard 1508, pointer device (e.g., a computer mouse 1510, and a display 1509).

The processor 1501 may be any programmable microprocessor, microcomputer or multiple processor chip or chips that can be configured by software instructions (i.e., applications) to perform a variety of functions, including the functions of the various aspects described above. In some devices, multiple processors may be provided, such as one processor dedicated to wireless communication functions and one processor dedicated to running other applications. Typically, software applications may be stored in the internal memory 1502 before they are accessed and loaded into the processor 1501. The processor 1501 may include internal memory sufficient to store the application software instructions. In many devices the internal memory may be a volatile or nonvolatile memory, such as flash memory, or a mixture of both. For the purposes of this description, a general reference to memory refers to memory accessible by the processor 1501 including internal memory or removable memory plugged into the device and memory within the processor 1501.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (digital signal processor), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a digital signal processor and a microprocessor, a plurality of microprocessors, one or more microprocessors in conjunction with a digital signal processor core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a non-transitory computer-readable storage medium. Non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory machine readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for a tracking device affixed to an asset to maintain reachability by reducing power consumption based on measured wide area network (WAN) conditions, comprising:

determining whether entry conditions for performing a power optimization algorithm are met by determining whether the tracking device has been activated for a predefined period of time, determining whether the tracking device has experienced an out-of-network-service condition for at least a predefined duration, determining whether the tracking device is engaged in an ongoing communication session, and determining whether the tracking device has received an on-demand localization communication within a predefined period;

generating statistics characterizing out-of-network-service conditions experienced during a period of time in response to determining the entry conditions are met;

determining whether the generated statistics characterizing out-of-network-service conditions experienced during the period of time indicate a predefined out-of-network-service condition by comparing the generated statistics characterizing out-of-network-service conditions experienced during the period of time to a predefined threshold value; and operating in a power optimization mode by operating the tracking device in a power save state and an idle state for a number of cycles when the generated statistics characterizing out-of-network-service conditions experienced during the period of time indicate that the predefined out-of-network-service condition exists.

2. The method of claim 1, wherein generating statistics characterizing out-of-network-service conditions experienced during the period of time comprises:

determining whether a predefined number of out-of-network-service events have occurred;

measuring a first duration from an occurrence of a first out-of-network-service event and an occurrence of a final out-of-network-service event, wherein the first and final out-of-network-service events are within a set including the predefined number of out-of-network-service events;

calculating a second duration corresponding to a total amount of time the tracking device experienced the predefined number of out-of-network-service events during the first duration;

calculating a percentage value corresponding to a time the tracking device experienced out-of-network-service events based on the first duration and the second duration; and calculating a third duration corresponding to the tracking device experiencing an ongoing out-of-network-service event.

3. The method of claim 1, wherein generating statistics characterizing out-of-network-service conditions experienced during the period of time comprises:

determining whether a first duration has elapsed;

calculating a second duration corresponding to a total amount of time the tracking device experienced out-of-network-service events occurring during the first duration;

calculating a first percentage value corresponding to a time the tracking device experienced out-of-network-service events based on the first duration and the second duration; and calculating a third duration corresponding to the tracking device experiencing an ongoing out-of-network-service event.

4. The method of claim 3, further comprising:

determining whether a predefined number of out-of-network-service events have occurred before the first duration has elapsed;

measuring a fourth duration corresponding to an occurrence of a first out-of-network-service event and an occurrence of a final out-of-network-service event in response to determining that the predefined number of out-of-network-service events have occurred before the first duration has elapsed, wherein the first and final out-of-network-service events are within a set including the predefined number of out-of-network-service events;

calculating a fifth duration corresponding to a total amount of time the tracking device experienced the predefined number of out-of-network-service events during the fourth duration; and calculating a second percentage value corresponding to the time the tracking device experienced out-of-network-service events based on the fourth duration and the fifth duration.

5. The method of claim 1, wherein operating in the power optimization mode by operating the tracking device in the power save state and the idle state for the number of cycles when the generated statistics characterizing out-of-network-service conditions experienced during the period of time indicate that the predefined out-of-network-service condition exists comprises:

calculating a first duration corresponding to the power save state and the number of cycles based on estimated information;

configuring components within the tracking device to operate with reduced power consumption for the first duration corresponding to the power save state; and evaluating exit conditions during a second duration corresponding to the idle state.

6. The method of claim 5, wherein calculating the first duration corresponding to the power save state and the number of cycles based on estimated information comprises:

estimating WAN power consumption information;

estimating GPS power consumption information;

estimating reachability cost information; and calculating the first duration corresponding to the power save state and the number of cycles based on at least one of the estimated WAN power consumption information, the estimated GPS power consumption information, and the estimated reachability cost information.

7. The method of claim 6, wherein estimating WAN power consumption information comprises:

estimating information corresponding to at least one of a call manager off event, establishing a network connection, the tracking device operating in a current power optimization mode, a WAN search, a WAN idle; and estimating WAN power consumption information based on the estimated information.

8. The method of claim 6, wherein estimating GPS power consumption information comprises:

estimating information corresponding to at least one of GPS environment conditions, current GPS power consumption information based on modem data, GPS fix accuracy information, and time uncertainty information; and estimating GPS power consumption information based on the estimated information.

9. The method of claim 6, wherein estimating reachability cost information comprises:

identifying set reachability weights;

estimating available battery capacity;

estimating a geofence state, wherein the geofence state is an indicator of the tracking device being inside or outside a geofence area; and estimating reachability cost information based on at least one of the identified set reachability weights, the estimated available battery capacity, and the estimated geofence state.

10. The method of claim 5, further comprising:
  determining whether the exit conditions are met during the second duration corresponding to the idle state by:
    determining whether the tracking device has operated in the power save state and the idle state for the number of cycles;
    determining whether a tracking device detach event is detected;
    determining whether a breach event is detected;
    determining whether another on-demand localization communication is received; and
    determining whether battery service life is below a certain level; and
  discontinuing operating in the power optimization mode when the tracking device determines that the exit conditions are met during the second duration corresponding to the idle state.

11. The method of claim 5, wherein configuring components within the tracking device to operate with reduced power consumption for the first duration corresponding to the power save state comprises deactivating at least one of a modem, a temperature-controlled crystal oscillator, a demodulator, a modulator, a call manager, a long-range transceiver, RF radios, firmware, firmware updating routines.

12. The method of claim 5, wherein configuring components within the tracking device to operate with reduced power consumption for the first duration corresponding to the power save state comprises discontinuing at least one of maintenance of a WAN state and polling of a subscriber identity module.

13. A tracking device, comprising:
  means for determining whether entry conditions for performing a power optimization algorithm are met by determining whether the tracking device has been activated for a predefined period of time, determining whether the tracking device has experienced an out-of-network-service condition for at least a predefined duration, determining whether the tracking device is engaged in an ongoing communication session, and determining whether the tracking device has received an on-demand localization communication within a predefined period;
  means for generating statistics characterizing out-of-network-service conditions experienced during a period of time in response to determining the entry conditions are met;
  means for determining whether the generated statistics characterizing out-of-network-service conditions experienced during the period of time indicate a predefined out-of-network-service condition by comparing the generated statistics characterizing out-of-network-service conditions experienced during the period of time to a predefined threshold value; and
  means for operating in a power optimization mode by operating the tracking device in a power save state and an idle state for a number of cycles when the generated statistics characterizing out-of-network-service conditions experienced during the period of time indicate that the predefined out-of-network-service condition exists.

14. The tracking device of claim 13, wherein means for generating statistics characterizing out-of-network-service conditions experienced during the period of time comprises:
  means for determining whether a predefined number of out-of-network-service events have occurred;
  means for measuring a first duration from an occurrence of a first out-of-network-service event and an occurrence of a final out-of-network-service event, wherein the first and final out-of-network-service events are within a set including the predefined number of out-of-network-service events;
  means for calculating a second duration corresponding to a total amount of time the tracking device experienced the predefined number of out-of-network-service events during the first duration;
  means for calculating a percentage value corresponding to a time the tracking device experienced out-of-network-service events based on the first duration and the second duration; and
  means for calculating a third duration corresponding to the tracking device experiencing an ongoing out-of-network-service event.

15. The tracking device of claim 13, wherein means for generating statistics characterizing out-of-network-service conditions experienced during the period of time comprises:
  means for determining whether a first duration has elapsed;
  means for calculating a second duration corresponding to a total amount of time the tracking device experienced out-of-network-service events occurring during the first duration;
  means for calculating a first percentage value corresponding to a time the tracking device experienced out-of-network-service events based on the first duration and the second duration; and
  means for calculating a third duration corresponding to the tracking device experiencing an ongoing out-of-network-service event.

16. The tracking device of claim 15, further comprising:
  means for determining whether a predefined number of out-of-network-service events have occurred before the first duration has elapsed;
  means for measuring a fourth duration corresponding to an occurrence of a first out-of-network-service event and an occurrence of a final out-of-network-service event in response to determining that the predefined number of out-of-network-service events have occurred before the first duration has elapsed, wherein the first and final out-of-network-service events are within a set including the predefined number of out-of-network-service events;
  means for calculating a fifth duration corresponding to a total amount of time the tracking device experienced the predefined number of out-of-network-service events during the fourth duration; and
  means for calculating a second percentage value corresponding to the time the tracking device experienced out-of-network-service events based on the fourth duration and the fifth duration.

17. The tracking device of claim 13, wherein means for operating in the power optimization mode by operating the tracking device in the power save state and the idle state for the number of cycles when the generated statistics characterizing out-of-network-service conditions experienced during the period of time indicate that the predefined out-of-network-service condition exists comprises:
  means for calculating a first duration corresponding to the power save state and the number of cycles based on estimated information;
  means for configuring components within the tracking device to operate with reduced power consumption for the first duration corresponding to the power save state; and
  means for evaluating exit conditions during a second duration corresponding to the idle state.

18. The tracking device of claim 17, wherein means for calculating the first duration corresponding to the power save state and the number of cycles based on estimated information comprises:
  means for estimating WAN power consumption information;
  means for estimating GPS power consumption information;
  means for estimating reachability cost information; and
  means for calculating the first duration corresponding to the power save state and the number of cycles based on at least one of the estimated WAN power consumption information, the estimated GPS power consumption information, and the estimated reachability cost information.

19. The tracking device of claim 18, wherein means for estimating WAN power consumption information comprises:
  means for estimating information corresponding to at least one of a call manager off event, establishing a network connection, the tracking device operating in a current power optimization mode, a WAN search, a WAN idle; and
  means for estimating WAN power consumption information based on the estimated information.

20. The tracking device of claim 18, wherein means for estimating GPS power consumption information comprises:
  means for estimating information corresponding to at least one of GPS environment conditions, current GPS power consumption information based on modem data, GPS fix accuracy information, and time uncertainty information; and
  means for estimating GPS power consumption information based on the estimated information.

21. The tracking device of claim 18, wherein means for estimating reachability cost information comprises:
  means for identifying set reachability weights;
  means for estimating available battery capacity;
  means for estimating a geofence state, wherein the geofence state is an indicator of the tracking device being inside or outside a geofence area; and
  means for estimating reachability cost information based on at least one of the identified set reachability weights, the estimated available battery capacity, and the estimated geofence state.

22. The tracking device of claim 17, further comprising:
  means for determining whether the exit conditions are met during the second duration corresponding to the idle state comprising:
    means for determining whether the tracking device has operated in the power save state and the idle state for the number of cycles;
    means for determining whether a tracking device detach event is detected;
    means for determining whether a breach event is detected;
    means for determining whether another on-demand localization communication is received; and
    means for determining whether battery service life is below a certain level; and
  means for discontinuing operating in the power optimization mode when the exit conditions are met during the second duration corresponding to the idle state.

23. The tracking device of claim 17, wherein means for configuring components within the tracking device to operate with reduced power consumption for the first duration corresponding to the power save state comprises means for deactivating at least one of a modem, a temperature-controlled crystal oscillator, a demodulator, a modulator, a call manager, a long-range transceiver, RF radios, firmware, firmware updating routines.

24. The tracking device of claim 17, wherein means for configuring components within the tracking device to operate with reduced power consumption for the first duration corresponding to the power save state comprises means for discontinuing at least one of maintenance of a WAN state and polling of a subscriber identity module.

25. A tracking device, comprising:
  a memory;
  a wireless transceiver; and
  a processor coupled to the memory and the wireless transceiver, wherein the processor is configured with processor-executable instructions to:
    determine whether entry conditions for performing a power optimization algorithm are met by determining whether the tracking device has been activated for a predefined period of time, determining whether the tracking device has experienced an out-of-network-service condition for at least a predefined duration, determining whether the tracking device is engaged in an ongoing communication session, and determining whether the tracking device has received an on-demand localization communication within a predefined period;
    generate statistics characterizing out-of-network-service conditions experienced during a period of time in response to determining the entry conditions are met;
    determine whether the generated statistics characterizing out-of-network-service conditions experienced during the period of time indicate a predefined out-of-network-service condition by comparing the generated statistics to a predefined threshold value; and
    operate in a power optimization mode by operating the tracking device in a power save state and an idle state for a number of cycles when the generated statistics characterizing out-of-network-service conditions experienced during the period of time indicate that the predefined out-of-network-service condition exists.

26. The tracking device of claim 25, wherein the processor is configured with processor-executable instructions to generate the statistics characterizing out-of-network-service conditions experienced during the period of time by:
  determining whether a predefined number of out-of-network-service events have occurred;
  measuring a first duration from an occurrence of a first out-of-network-service event and an occurrence of a final out-of-network-service event, wherein the first and final out-of-network-service events are within a set including the predefined number of out-of-network-service events;
  calculating a second duration corresponding to a total amount of time the tracking device experienced the predefined number of out-of-network-service events during the first duration;
  calculating a percentage value corresponding to a time the tracking device experienced out-of-network-service events based on the first duration and the second duration; and
  calculating a third duration corresponding to the tracking device experiencing an ongoing out-of-network-service event.

27. The tracking device of claim 25, wherein the processor is configured with processor-executable instructions to generate the statistics characterizing out-of-network-service conditions experienced during the period of time by:

53 determining whether a first duration has elapsed;
calculating a second duration corresponding to a total amount of time the tracking device experienced out-of-network-service events occurring during the first duration;
calculating a first percentage value corresponding to a time the tracking device experienced out-of-network-service events based on the first duration and the second duration; and
calculating a third duration corresponding to the tracking device experiencing an ongoing out-of-network-service event.

28. The tracking device of claim 27, wherein the processor is further configured with processor-executable instructions to:
determine whether a predefined number of out-of-network-service events have occurred before the first duration has elapsed;
measure a fourth duration corresponding to an occurrence of a first out-of-network-service event and an occurrence of a final out-of-network-service event in response to determining that the predefined number of out-of-network-service events have occurred before the first duration has elapsed, wherein the first and final out-of-network-service events are within a set including the predefined number of out-of-network-service events;
calculate a fifth duration corresponding to a total amount of time the tracking device experienced the predefined number of out-of-network-service events during the fourth duration; and
calculate a second percentage value corresponding to the time the tracking device experienced out-of-network-service events based on the fourth duration and the fifth duration.

29. The tracking device of claim 25, wherein the processor is configured with processor-executable instructions to operate in the power optimization mode by operating the tracking device in the power save state and the idle state for the number of cycles when the generated statistics indicate that the predefined out-of-network-service condition exists by:
calculating a first duration corresponding to the power save state and the number of cycles based on estimated information;
configuring components within the tracking device to operate with reduced power consumption for the first duration corresponding to the power save state; and
evaluating exit conditions during a second duration corresponding to the idle state.

30. The tracking device of claim 29, wherein the processor is configured with processor-executable instructions to calculate the first duration corresponding to the power save state and the number of cycles based on estimated information by:
estimating WAN power consumption information;
estimating GPS power consumption information;
estimating reachability cost information; and
calculating the first duration corresponding to the power save state and the number of cycles based on at least one of the estimated WAN power consumption information, the estimated GPS power consumption information, and the estimated reachability cost information.

31. The tracking device of claim 30, wherein the processor is configured with processor-executable instructions to estimate WAN power consumption information by:
estimating information corresponding to at least one of a call manager off event, establishing a network connection, the tracking device operating in a current power optimization mode, a WAN search, a WAN idle; and

54 estimating WAN power consumption information based on the estimated information.

32. The tracking device of claim 30, wherein the processor is configured with processor-executable instructions to estimate GPS power consumption information by:
estimating information corresponding to at least one of GPS environment conditions, current GPS power consumption information based on modem data, GPS fix accuracy information, and time uncertainty information; and
estimating GPS power consumption information based on the estimated information.

33. The tracking device of claim 30, wherein the processor is configured with processor-executable instructions to estimate reachability cost information by:
identifying set reachability weights;
estimating available battery capacity;
estimating a geofence state, wherein the geofence state is an indicator of the tracking device being inside or outside a geofence area; and
estimating reachability cost information based on at least one of the identified set reachability weights, the estimated available battery capacity, and the estimated geofence state.

34. The tracking device of claim 29, wherein the processor is further configured with processor-executable instructions to:
determine whether the exit conditions are met during the second duration corresponding to the idle state by:
determining whether the tracking device has operated in the power save state and the idle state for the number of cycles;
determining whether a tracking device detach event is detected;
determining whether a breach event is detected;
determining whether another on-demand localization communication is received; and
determining whether battery service life is below a certain level; and
discontinuing operating in the power optimization mode when the tracking device determines that the exit conditions are met during the second duration corresponding to the idle state.

35. The tracking device of claim 29, wherein the processor is configured with processor-executable instructions to configure components within the tracking device to operate with reduced power consumption for the first duration corresponding to the power save state by deactivating at least one of a modem, a temperature-controlled crystal oscillator, a demodulator, a modulator, a call manager, a long-range transceiver, RF radios, firmware, firmware updating routines.

36. The tracking device of claim 29, wherein the processor is configured with processor-executable instructions to configure components within the tracking device to operate with reduced power consumption for the first duration corresponding to the power save state by discontinuing at least one of maintenance of a WAN state and polling of a subscriber identity module.

37. A non-transitory processor-readable storage medium having stored thereon processor-executable software instructions configured to cause a tracking device processor in a tracking device to perform operations comprising:
determining whether entry conditions for performing a power optimization algorithm are met by determining whether the tracking device has been activated for a predefined period of time, determining whether the tracking device has experienced an out-of-network-service condition for at least a predefined duration, determining whether the tracking device is engaged in an ongoing communication session, and determining whether the tracking device has received an on-demand localization communication within a predefined period;

generating statistics characterizing out-of-network-service conditions experienced during a period of time in response to determining the entry conditions are met;

determining whether the generated statistics indicate a predefined out-of-network-service condition by comparing the generated statistics to a predefined threshold value; and operating in a power optimization mode by operating in a power save state and an idle state for a number of cycles when the generated statistics indicate that the predefined out-of-network-service condition exists.

38. The non-transitory processor-readable storage medium of claim 37, wherein the stored processor-executable software instructions are configured to cause a tracking device processor to perform operations such that generating statistics characterizing out-of-network-service conditions experienced during the period of time comprises:

determining whether a predefined number of out-of-network-service events have occurred;

measuring a first duration from an occurrence of a first out-of-network-service event and an occurrence of a final out-of-network-service event, wherein the first and final out-of-network-service events are within a set including the predefined number of out-of-network-service events;

calculating a second duration corresponding to a total amount of time the tracking device experienced the predefined number of out-of-network-service events during the first duration;

calculating a percentage value corresponding to a time the tracking device experienced out-of-network-service events based on the first duration and the second duration; and calculating a third duration corresponding to the tracking device experiencing an ongoing out-of-network-service event.

39. The non-transitory processor-readable storage medium of claim 37, wherein the stored processor-executable software instructions are configured to cause a tracking device processor to perform operations such that generating statistics characterizing out-of-network-service conditions experienced during the period of time comprises:

determining whether a first duration has elapsed;

calculating a second duration corresponding to a total amount of time the tracking device experienced out-of-network-service events occurring during the first duration;

calculating a first percentage value corresponding to a time the tracking device experienced out-of-network-service events based on the first duration and the second duration; and calculating a third duration corresponding to the tracking device experiencing an ongoing out-of-network-service event.

40. The non-transitory processor-readable storage medium of claim 39, wherein the stored processor-executable software instructions are configured to cause a tracking device processor to perform operations further comprising:

determining whether a predefined number of out-of-network-service events have occurred before the first duration has elapsed;

measuring a fourth duration corresponding to an occurrence of a first out-of-network-service event and an occurrence of a final out-of-network-service event in response to determining that the predefined number of out-of-network-service events have occurred before the first duration has elapsed, wherein the first and final out-of-network-service events are within a set including the predefined number of out-of-network-service events;

calculating a fifth duration corresponding to a total amount of time the tracking device experienced the predefined number of out-of-network-service events during the fourth duration; and calculating a second percentage value corresponding to the time the tracking device experienced out-of-network-service events based on the fourth duration and the fifth duration.

41. The non-transitory processor-readable storage medium of claim 37, wherein the stored processor-executable software instructions are configured to cause a tracking device processor to perform operations such that operating in the power optimization mode by operating in the power save state and the idle state for the number of cycles when the generated statistics indicate that the predefined out-of-network-service condition exists comprises:

calculating a first duration corresponding to the power save state and the number of cycles based on estimated information;

configuring components within the tracking device to operate with reduced power consumption for the first duration corresponding to the power save state; and evaluating exit conditions during a second duration corresponding to the idle state.

42. The non-transitory processor-readable storage medium of claim 41, wherein the stored processor-executable software instructions are configured to cause a tracking device processor to perform operations such that calculating the first duration corresponding to the power save state and the number of cycles based on estimated information comprises:

estimating WAN power consumption information;

estimating GPS power consumption information;

estimating reachability cost information; and calculating the first duration corresponding to the power save state and the number of cycles based on at least one of the estimated WAN power consumption information, the estimated GPS power consumption information, and the estimated reachability cost information.

43. The non-transitory processor-readable storage medium of claim 42, wherein the stored processor-executable software instructions are configured to cause a tracking device processor to perform operations such that estimating WAN power consumption information comprises:

estimating information corresponding to at least one of a call manager off event, establishing a network connection, the tracking device operating in a current power optimization mode, a WAN search, a WAN idle; and estimating WAN power consumption information based on the estimated information.

44. The non-transitory processor-readable storage medium of claim 42, wherein the stored processor-executable software instructions are configured to cause the processor to perform operations such that estimating GPS power consumption information comprises:

estimating information corresponding to at least one of GPS environment conditions, current GPS power consumption information based on modem data, GPS fix accuracy information, and time uncertainty information; and estimating GPS power consumption information based on the estimated information.

45. The non-transitory processor-readable storage medium of claim 42, wherein the stored processor-executable software instructions are configured to cause a tracking device processor to perform operations such that estimating reachability cost information comprises:
identifying set reachability weights;
estimating available battery capacity;
estimating a geofence state, wherein the geofence state is an indicator of the tracking device being inside or outside a geofence area; and
estimating reachability cost information based on at least one of the identified set reachability weights, the estimated available battery capacity, and the estimated geofence state.

46. The non-transitory processor-readable storage medium of claim 41, wherein the stored processor-executable software instructions are configured to cause a tracking device processor to perform operations further comprising:
determining whether the exit conditions are met during the second duration corresponding to the idle state by:
determining whether the tracking device has operated in the power save state and the idle state for the number of cycles;
determining whether a tracking device detach event is detected;
determining whether a breach event is detected;
determining whether another on-demand localization communication is received; and
determining whether battery service life is below a certain level; and
discontinuing operating in the power optimization mode when the tracking device determines that the exit conditions are met during the second duration corresponding to the idle state.

47. The non-transitory processor-readable storage medium of claim 41, wherein the stored processor-executable software instructions are configured to cause a tracking device processor to perform operations such that configuring components within the tracking device to operate with reduced power consumption for the first duration corresponding to the power save state comprises deactivating at least one of a modem, a temperature-controlled crystal oscillator, a demodulator, a modulator, a call manager, a long-range transceiver, RF radios, firmware, firmware updating routines.

48. The non-transitory processor-readable storage medium of claim 41, wherein the stored processor-executable software instructions are configured to cause a tracking device processor to perform operations such that configuring components within the tracking device to operate with reduced power consumption for the first duration corresponding to the power save state comprises discontinuing at least one of maintenance of a WAN state and polling of a subscriber identity module.

* * * * *